US012620652B2

(12) United States Patent
Lee et al.

(10) Patent No.: US 12,620,652 B2
(45) Date of Patent: May 5, 2026

(54) ELECTRODE STRUCTURE, ELECTRODE STRUCTURE FOR POSITIVE ELECTRODE OF METAL-AIR BATTERY COMPRISING SAME, AND METHODS FOR MANUFACTURING SAME

(71) Applicant: FLEXOLYTE, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: FLEXOLYTE, Ansan-Si (KR)

( * ) Notice: Subject to any disclaimer, the term of this patent is extended or adjusted under 35 U.S.C. 154(b) by 580 days.

(21) Appl. No.: 17/798,424

(22) PCT Filed: Feb. 22, 2021

(86) PCT No.: PCT/KR2021/002215
§ 371 (c)(1),
(2) Date: Aug. 9, 2022

(87) PCT Pub. No.: WO2021/167432
PCT Pub. Date: Aug. 26, 2021

(65) Prior Publication Data
US 2022/0407149 A1     Dec. 22, 2022

(30) Foreign Application Priority Data

Feb. 20, 2020  (KR) ........................ 10-2020-0021252
Feb. 20, 2020  (KR) ........................ 10-2020-0021253
(Continued)

(51) Int. Cl.
*H01M 12/06*     (2006.01)
*H01M 4/58*      (2010.01)
*H01M 4/90*      (2006.01)

(52) U.S. Cl.
CPC ............. *H01M 12/06* (2013.01); *H01M 4/58* (2013.01); *H01M 4/581* (2013.01); *H01M 4/5825* (2013.01); *H01M 4/9041* (2013.01)

(58) Field of Classification Search
CPC ............. H01M 4/5825; H01M 4/9041; H01M 4/0457; H01M 4/0471; H01M 4/136;
(Continued)

(56) References Cited

U.S. PATENT DOCUMENTS 4,049,879 A * 9/1977 Thompson ........ H01M 10/0569
                                                429/231.9
6,001,507 A    12/1999 Ono et al.
(Continued)

FOREIGN PATENT DOCUMENTS

CN       103441300 A    12/2013
CN       105733004 A     7/2016
(Continued)

OTHER PUBLICATIONS

Minakshi, Manickam, et al. "Synthesis and characterization of olivine LiNiPO4 for aqueous rechargeable battery." Electrochimica Acta 56.11 (2011): 4356-4360. (Year: 2011).*
(Continued)

*Primary Examiner* — Helen Oi K Conley
*Assistant Examiner* — Amanda Rosenbaum
(74) *Attorney, Agent, or Firm* — Finch & Maloney PLLC

(57) ABSTRACT

An electrode structure for a positive electrode of a metal-air battery is provided. The electrode structure for a positive electrode of a metal-air battery is formed of a compound of copper, phosphorus, and sulfur and it can comprise a membrane in which a plurality of fibrillated fibers form a network.

8 Claims, 68 Drawing Sheets

(30) Foreign Application Priority Data

| | | |
|---|---|---|
| Feb. 21, 2020 | (KR) | 10-2020-0021894 |
| Nov. 30, 2020 | (KR) | 10-2020-0164654 |
| Nov. 30, 2020 | (KR) | 10-2020-0164655 |

(58) Field of Classification Search
CPC ............. H01M 4/1397; H01M 4/5805; H01M 4/5815; H01M 4/58

See application file for complete search history.

(56) References Cited

U.S. PATENT DOCUMENTS

| | | | | |
|---|---|---|---|---|
| 7,629,080 | B1 * | 12/2009 | Allen | H01M 4/5825 |
| | | | | 429/231.95 |
| 8,257,849 | B2 | 9/2012 | Uchida | |
| 8,277,966 | B2 | 10/2012 | Yoon et al. | |
| 8,716,168 | B2 | 5/2014 | Yoo et al. | |
| 9,362,567 | B2 | 6/2016 | Kim et al. | |
| 9,751,078 | B2 | 9/2017 | Yoo et al. | |
| 9,954,231 | B2 | 4/2018 | Kim et al. | |
| 10,026,966 | B2 | 7/2018 | Kakehata et al. | |
| 10,199,692 | B2 | 2/2019 | Kim et al. | |
| 10,566,670 | B2 | 2/2020 | Choi | |
| 2010/0068461 | A1 | 3/2010 | Wallace et al. | |
| 2011/0031935 | A1 * | 2/2011 | Miyoshi | H01M 4/74 |
| | | | | 429/246 |
| 2014/0227595 | A1 * | 8/2014 | Upreti | H01M 4/48 |
| | | | | 429/218.1 |
| 2014/0248539 | A1 | 9/2014 | Liu | |
| 2015/0050556 | A1 | 2/2015 | Liu et al. | |
| 2015/0140452 | A1 | 5/2015 | Park et al. | |
| 2016/0322684 | A1 | 11/2016 | Choi | |
| 2016/0322685 | A1 | 11/2016 | Choi | |
| 2017/0141429 | A1 | 5/2017 | Lee et al. | |
| 2017/0373320 | A1 | 12/2017 | Choi et al. | |
| 2018/0114967 | A1 | 4/2018 | Kim et al. | |
| 2019/0067737 | A1 | 2/2019 | Zhi et al. | |
| 2019/0134609 | A1 * | 5/2019 | Yamauchi | B01J 35/33 |
| 2019/0181520 | A1 | 6/2019 | Baik et al. | |
| 2019/0273297 | A1 | 9/2019 | Weisenstein et al. | |
| 2019/0309426 | A1 * | 10/2019 | Jin | C25B 11/075 |
| 2020/0112050 | A1 | 4/2020 | Hu et al. | |
| 2021/0408567 | A1 | 12/2021 | Lee et al. | |
| 2022/0059888 | A1 | 2/2022 | Iwata et al. | |

FOREIGN PATENT DOCUMENTS

| | | | |
|---|---|---|---|
| CN | 107565159 | A | 1/2018 |
| CN | 110227454 | A | 9/2019 |
| CN | 106784611 | B | 10/2019 |
| EP | 2395588 | A1 | 12/2011 |
| EP | 3089258 | A1 | 11/2016 |
| JP | 2005154710 | | 6/2005 |
| JP | 2006156041 | | 6/2006 |
| JP | 2009541198 | | 11/2009 |
| JP | 2015504568 | A2 | 2/2015 |
| JP | 2015198056 | A2 | 11/2015 |
| JP | 5924731 | B2 | 5/2016 |
| JP | 6041813 | | 12/2016 |
| JP | 2017516274 | | 6/2017 |
| JP | 6303278 | B2 | 4/2018 |
| KR | 1020070110568 | A | 11/2007 |
| KR | 1020110083940 | A | 7/2011 |
| KR | 10-2012-0094249 | A | 8/2012 |
| KR | 10-2012-0139066 | A | 12/2012 |
| KR | 10-2013-0064019 | A | 6/2013 |
| KR | 10-1281772 | B1 | 7/2013 |
| KR | 10-2013-0118582 | A | 10/2013 |
| KR | 10-2014-0046213 | A | 4/2014 |
| KR | 10-2014-0137427 | A | 12/2014 |
| KR | 1020150031213 | A | 3/2015 |
| KR | 10-1572545 | B1 | 11/2015 |
| KR | 1020160122009 | A | 10/2016 |
| KR | 10-2016-0128164 | A | 11/2016 |
| KR | 10-1733492 | B1 | 5/2017 |
| KR | 101734301 | | 5/2017 |
| KR | 10-2018-0000941 | A | 1/2018 |
| KR | 1020180004407 | A | 1/2018 |
| KR | 10-1827155 | B1 | 2/2018 |
| KR | 10-2019-0139911 | A | 12/2019 |
| KR | 10-2019-0142669 | A | 12/2019 |
| KR | 1020190139586 | A | 12/2019 |
| WO | 2014/200198 | | 12/2014 |

OTHER PUBLICATIONS

Xu, Tianyi, et al. "Sulfur-doped Cu3P| S electrocatalyst for hydrogen evolution reaction." Materials Research Express 6.7 (2019): 075501. (Year: 2019).*

Li, Yang, Zihao Dong, and Lifang Jiao. "Multifunctional transition metal-based phosphides in energy-related electrocatalysis." Advanced Energy Materials 10.11 (2020): 1902104. (Year: 2020).*

Muhmed et al., "Emerging chitosan and cellulose green materials for ion exchange membrane fuel cell: a review", Energ. Ecol. Environ., https://doi.org/10.1007/s40974-019-00127-4 (Jul. 22, 2019).

Written Opinion for International Patent Application PCT/KR2021/002215, mailed May 27, 2021 (3 pages).

U.S. Appl. No. 17/800,913 (English translation of originally-filed application papers), application filing date Aug. 19, 2022 (119 pages).

U.S. Appl. No. 17/800,926 (English translation of originally-filed application papers), application filing date Aug. 19, 2022 (132 pages).

U.S. Appl. No. 17/800,915 (English translation of originally-filed application papers), application filing date Aug. 19, 2022 (79 pages).

Kibsgaard et al., "Molybdenum Phosphosulfide: An Active, Acid-Stable, Earth-Abundant Catalyst for the Hydrogen Evolution Reaction", Angew. Chem. Int. Ed., 53, 1-6 (2014).

Kotatha et al., "Preparation and characterization of gel electrolyte with bacterial cellulose coated with alternating layers of chitosan and alginate for electric double-layer capacitors", Res Chem Intermed., 44:4971-4987, https://doi.org/10.1007/s11164-018-3348-6 (2018).

Luo et al., "Characterization of TEMPO-oxidized bacterial cellulose scaffolds for tissue engineering applications", Materials Chemistry and Physics, http://dx.doi.org/10.1016/j.matchemphys.2013.09.012 (2013).

Patel et al., "Electrochemically active and robust cobalt doped copper phosphosulfide electrocatalysts for hydrogen evolution reaction in electrolytic and photoelectrochemical water splitting", International Journal of Hydrogen Energy, https://doi.org/10.1016/j.ijhydene.2018.02.147 (2018).

Yue et al., "Sulfonated bacterial cellulose/polyaniline composite membrane for use as gel polymer electrolyte", Composites Science and Technology, 145 122-131 (2017).

International Search Report for PCT Application No. PCT/KR2021/002215 dated May 27, 2021, 4 pages.

Fernandes et al., "Novel transparent nanocomposite films based on chitosan and bacterial cellulose", Green Chem., 11, 2023-2029 (2009).

Lai et al., "Nanocomposite films based on TEMPO-mediated oxidized bacterial cellulose and chitosan", Cellulose, 21:2757-2772 (2014).

Das et al., "Quaternized cellulose and graphene oxide crosslinked polyphenylene oxide based anion exchange membrane" and "Electronic Supplementary Information", Scientific Reports, vol. 9, 18 pages (2019).

Kim, Hyeyun et al., ACS Applied Energy Materials, "Lithium Ion Battery Separators Based on Carboxylated Cellulose Nanofibers from Wood", 2019, vol. 2, pp. 1241-1250 (Year: 2019).

Kim, Jaehwan et al., J. Polym. Res., "Preparation and characterization of a Bacterial cellulose/Chitosan composite for potential biomedical application", 2011, vol. 18, pp. 739-744 (Year: 2011).

Phisalaphong, Muenduen et al., Carbohydrate Polymers, "Biosynthesis and characterization of bacteria cellulose-chitosan film", 2008, vol. 74, pp. 482-488 (Year: 2008).

(56)             References Cited

OTHER PUBLICATIONS

Torres, F.G. et al., Materials Science & Engineering C, "Bacterial cellulose nanocomposites: An all-nano type of material", 2019, vol. 98, pp. 1277-1293 (Year: 2019).

Xu et al., "Sulfur-doped Cu3P | S electrocatalyst for hydrogen evolution reaction", Materials Research Express, vol. 6, No. 7, p. 75501 (doi: 10.1088/2053-1591/ab1293) (2019).

Extended European Search Report, Europe Patent Application EP 21 756 882 (search report dated Apr. 9, 2025) (6 pages).

Foresti et al., "Applications of bacterial cellulose as precursor of carbon and composites with metal oxide, metal sulfide and metal nanoparticles: A review of recent advances", Carbohydrate Polymers, 157, 447-467 (2017).

Das et al., "A bionanocomposite based on 1,4-diazabicyclo-[2.2.2]-octane cellulose nanofiber cross-linked-quaternary polysulfone as an anion conducting membrane", Journal of Materials Chemistry A, 4, pp. 15554-15564 (doi:10.1039/C6TA05611C) (2016).

U.S. Appl. No. 17/418,304, Notice of Allowance dated Jun. 4, 2025 (11 pages).

* cited by examiner (a)

ELECTRODE STRUCTURE, ELECTRODE STRUCTURE FOR POSITIVE ELECTRODE OF METAL-AIR BATTERY COMPRISING SAME, AND METHODS FOR MANUFACTURING SAME

CROSS REFERENCE TO RELATED APPLICATION

This application is the National Stage of International Application PCT/KR2021/002215 (filed 22 Feb. 2021), which claims the benefit of Republic of Korea Patent Application 10-2020-0021252 (filed 20 Feb. 2020), Republic of Korean Patent Application 10-2020-0021253 (filed 20 Feb. 2020), Republic of Korean Patent Application 10-2020-0021894 (filed 21 Feb. 2020), Republic of Korea Patent Application 10-2020-0164654 (filed 30 Nov. 2020), and Republic of Korea Patent Application 10-2020-0164655 (filed 30 Nov. 2020). The entire contents of all of these priority applications is hereby incorporated by reference herein.

BACKGROUND OF THE INVENTION

1. Field of the Invention

The present application relates to an electrode structure and a method of fabricating the same, and more particularly, to an electrode structure including a membrane formed of a plurality of fibers, an electrode structure for a positive electrode of a metal-air battery including the same, and a fabrication method thereof.

2. Description of the Prior Art

As mid-to-large high-energy applications such as electric vehicles and energy storage systems (ESS) are rapidly growing beyond the existing secondary batteries for small devices and home appliances, the market value of the secondary battery industry was only about 22 billion dollars in 2018, but is expected to grow to about 118 billion dollars by 2025. As such, in order for secondary batteries to be used as medium and large-sized energy storage media, price competitiveness, energy density and stability that are significantly improved more than a current level are required.

According to the technical needs, various electrodes for secondary batteries have been developed.

For example, Korean Unexamined Patent Publication No. 10-2019-0139586 discloses an electrode for a lithium-air battery, which includes a carbon nanotube and $RuO2$ deposited on a surface of the carbon nanotube, in which the $RuO2$ is deposited on a defective surface site of the carbon nanotube; the $RuO2$ has a particle size of 1.0 to 4.0 nm; and the $RuO2$ inhibits carbon decomposition at a surface defect site of the carbon nanotube and promotes the decomposition of $Li2O2$ formed on the surface of the carbon nanotube.

SUMMARY OF THE INVENTION

One technical object of the present application is to provide an electrode structure and a method of fabricating the same.

Another technical object of the present application is to provide an electrode structure with low fabrication costs and a simple fabrication process, and a method of fabricating the same.

Still another technical object of the present application is to provide an electrode structure with enhanced ORR, OER, and HER properties, and a method of fabricating the same.

Still another technical object of the present application is to provide an electrode structure with long life and high stability, and a method of fabricating the same.

Still another technical object of the present application is to provide an electrode structure for a positive electrode of a metal-air battery, and a method of fabricating the same.

Still another technical object of the present application is to provide an electrode structure for a positive electrode of a metal-air battery with low fabrication costs and a simple fabrication process, and a method of fabricating the same.

Still another technical object of the present application is to provide an electrode structure for a positive electrode of a metal-air battery with enhanced ORR, OER, and HER properties, and a method of fabricating the same.

Still another technical object of the present application is to provide an electrode structure for a positive electrode of a metal-air battery with long life and high stability, and a method of fabricating the same.

The technical objects of the present application are not limited to the above.

To solve the above technical objects, the present application may provide an electrode structure.

According to one embodiment, the electrode structure may include: a compound of a transition metal, phosphorus and a chalcogen element, in which a peak value corresponding to a crystal plane 101 has a maximum value compared with a peak value corresponding to another crystal plane as a result of XRD analysis; and a membrane formed of a plurality of fibers.

According to one embodiment, a peak value corresponding to the crystal plane 101 may be observed in a range of $2\theta$ values of 19° to 21°.

According to one embodiment, the transition metal may include at least any one of copper, magnesium, manganese, cobalt, iron, nickel, titanium, zinc, aluminum, or tin, and the chalcogen element may include at least one of sulfur, oxygen, selenium, or tellurium.

To solve the above technical objects, the present application may provide an electrode structure for a positive electrode of a metal-air battery.

According to one embodiment, in the electrode structure for a positive electrode of a metal-air battery, the electrode structure may be formed of a compound of copper, phosphorus and sulfur and may include a membrane in which a plurality of fibrillated fibers form a network.

According to one embodiment, the plurality of fibers formed of a compound of copper, phosphorus and sulfur may include a plurality of stems, and a plurality of branches branched off from the plurality of stems.

According to one embodiment, the plurality of stems and the plurality of branches may be fabricated in different processes from each other.

According to one embodiment, the membrane of the electrode structure may have a sponge structure and be flexible.

According to one embodiment, a lattice spacing of the membrane of the electrode structure observed by HRTEM may be reversibly increased or decreased according to a state of charge and discharge of the metal-air battery.

To solve the above technical objects, the present application may provide a metal-air battery.

According to one embodiment, the metal-air battery may include the electrode structure according to the embodiments described above, and may include a positive electrode using oxygen as a positive electrode active material, a negative electrode on the positive electrode, and an electrolyte between the positive electrode and the negative electrode.

According to one embodiment, a lattice spacing may be 0.466 nm as a result of HRTEM analysis of the membrane of the electrode structure in a discharged state of the metal-air battery.

According to one embodiment, a lattice spacing may be 0.478 nm as a result of HRTEM analysis of the membrane of the electrode structure in a charged state of the metal-air battery.

According to one embodiment, a reference peak may be observed in a range of $2\theta$ values of $18.5°$ to $19.5°$ as a result of XRD analysis of the membrane of the electrode structure, and the $2\theta$ value at which the reference peak is observed may be gradually decreased in a range of $2\theta$ values of $19°$ to $21°$ as the metal-air battery is charged from a discharged state.

According to one embodiment, the reference peak may be divided into two as the metal-air battery is charged from a discharged state.

According to one embodiment, phosphorus included in the membrane may have an oxidation number of $2-$ in a discharged state of the metal-air battery, and phosphorus included in the membrane may have an oxidation number of $2-$ and $n-(2<n<3)$ in a discharged state of the metal-air battery.

To solve the above technical objects, the present application may provide a method of fabricating an electrode structure.

According to one embodiment, the method of fabricating an electrode structure may include:

preparing a first precursor having a chalcogen element, a second precursor having phosphorus, and a third precursor having a transition metal;

mixing the first precursor, the second precursor, and the third precursor, and adding a first reducing agent to prepare a mixture; co-precipitating the mixture to prepare an intermediate product having a plurality of stems; and branching a plurality of branches off from the plurality of stems according to a method of adding a second reducing agent to the intermediate product and performing heat treatment under pressure, to prepare a plurality of fibrillated fibers including the transition metal, the chalcogen element, and phosphorus.

According to one embodiment, the first precursor may include at least any one of dithiooxamide, dithiobiuret, dithiouracil, acetylthiourea, thiourea, N-methylthiourea, bis(phenylthio)methane, 2-imino-4-thiobiuret, N,N'-dimethylthiourea, ammonium sulfide, methyl methanesulfonate, sulfur powder, sulphates, N,N-dimethylthioformamide, or davy reagent methyl; the second precursor may include at least any one of tetradecylphosphonic acid, ifosfamide, octadecylphosphonic acid, hexylphosphonic acid, trioctylphosphine, phosphoric acid, triphenylphosphine, ammonium phosphide, pyrophosphates, davy reagent methyl, cyclophosphamide monohydrate, phosphorus trichloride, phosphorus(V) oxychloride, thiophosphoryl chloride, phosphorus pentachloride, or phosphorus pentasulfide; and the third precursor may include at least any one of copper chloride, copper(II) sulfate, copper(II) nitrate, copper selenide, copper oxychloride, cupric acetate, copper carbonate, copper thiocyanate, copper sulfide, copper hydroxide, copper naphthenate, or copper(II) phosphate.

According to one embodiment, the method of fabricating an electrode structure may include: a chalcogen element source having a chalcogen element is further added along with the second reducing agent.

According to one embodiment, the second reducing agent may be added in a cooled state.

According to one embodiment, the first reducing agent may include at least any one of ammonium hydroxide, ammonium chloride, or tetramethylammonium hydroxide, and the second reducing agent may include at least any one of triton X-165, triton X-102, triton X-45, triton X-114, triton X-405, triton X-101, trimesic acid, diamide, peroxynitrite, formaldehyde, thimerosal, or chloramine-T.

According to one embodiment, the chalcogen element may be sulfur and the transition metal may be copper.

According to an embodiment of the present application, a method of fabricating an electrode structure may include: preparing a first precursor having a chalcogen element, a second precursor having phosphorus, and a third precursor having a transition metal; mixing the first precursor, the second precursor, and the third precursor, and adding a first reducing agent to prepare a mixture; co-precipitating the mixture to prepare an intermediate product having a plurality of stems; and branching a plurality of branches off from the plurality of stems according to a method of adding a second reducing agent to the intermediate product and performing heat treatment under pressure, to prepare a plurality of fibrillated fibers including the transition metal, the chalcogen element, and phosphorus.

Accordingly, the process of fabricating the electrode structure can be simplified, and the electrode structure can be easily fabricated at low cost.

Alternatively, the electrode structure may consist of a membrane in which the plurality of fibers form a network, have a flexible sponge structure, and have high ORR, OER and HER properties. Due to the high electrochemical properties of the electrode structure, the charge/discharge capacity and life property of a metal-air battery, which uses the electrode structure as the positive electrode, may be improved.

BRIEF DESCRIPTION OF THE DRAWINGS

FIG. 16 is a view showing an EXAFS k2χ(k) R space Fourier transform of electrode structures according to Experimental Example 1, 3 and 4, and copper foil.

FIG. 29 is a linear sweep voltammetry (LSV) graph for explaining ORR properties of electrode structures according to Experimental Examples 1 to 4 of the present application, Pt/C electrode and carbon fiber.

DETAILED DESCRIPTION OF THE EXEMPLARY EMBODIMENTS

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

Further, in the various embodiments of the present specification, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions or configurations incorporated herein will be omitted when it may make the subject matter of the present invention unnecessarily unclear.

Figure 1:
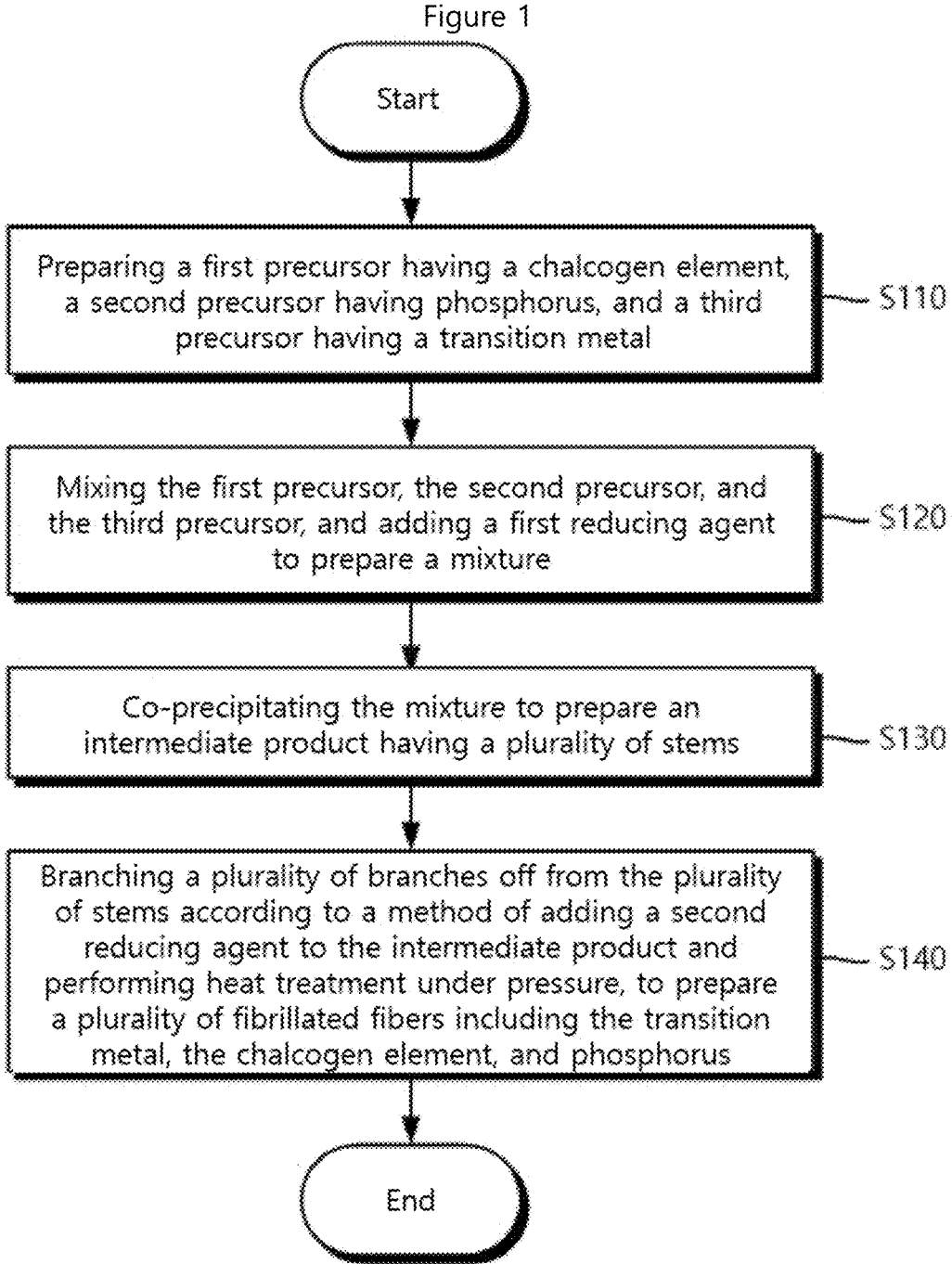
FIG. 1 is a flowchart for explaining a method of fabricating an electrode structure for a positive electrode of a zinc-air battery according to an embodiment of the present application.
Figure 2:
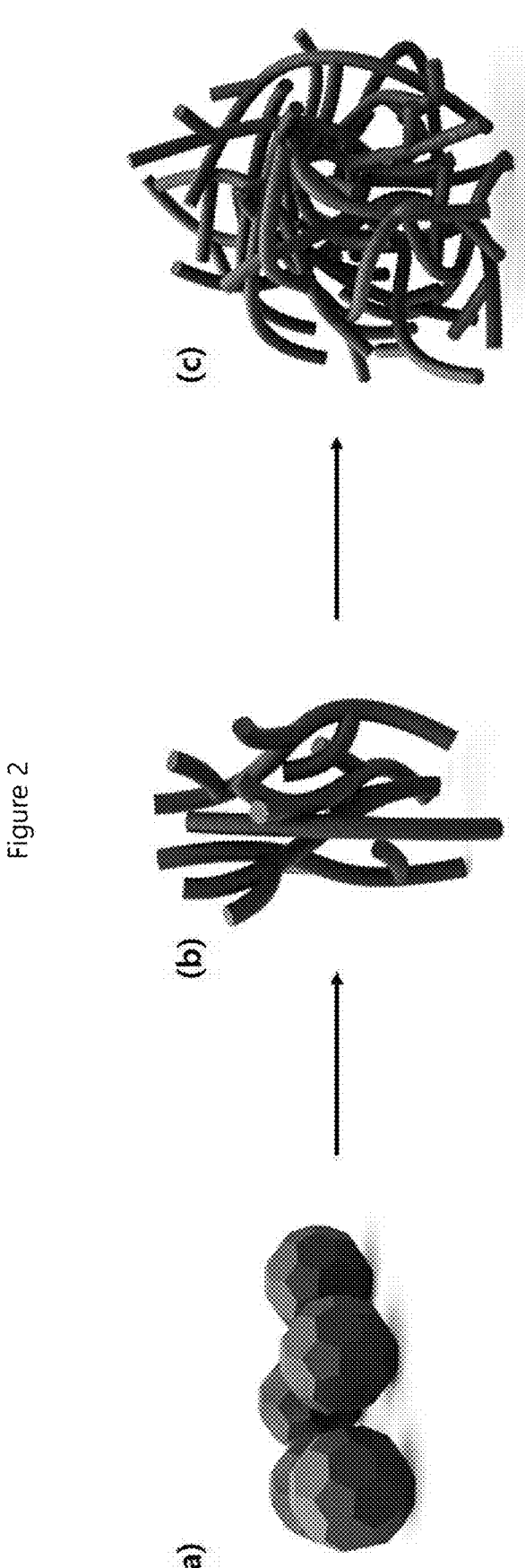
FIG. 2 is a view for explaining a process of fabricating an electrode structure for a positive electrode of a zinc-air battery according to an embodiment of the present application.

FIG. 1 is a flowchart for explaining a method of fabricating an electrode structure according to an embodiment of the present application, and FIG. 2 is a view for explaining a process of fabricating an electrode structure according to an embodiment of the present application.

Referring to FIGS. 1 and 2, a first precursor having a chalcogen element, a second precursor having phosphorus, and a third precursor having a transition metal may be prepared.

According to one embodiment, the chalcogen element may include phosphorus. In this case, for example, the first precursor may include at least any one of dithiooxamide, dithiobiuret, dithiouracil, acetylthiourea, thiourea, N-methylthiourea, bis(phenylthio)methane, 2-imino-4-thiobiuret, N,N' ammonium sulfide, methyl methanesulfonate, sulfur powder, sulphates, N,N-dimethylthioformamide, or davy reagent methyl.

Alternatively, according to another embodiment, the chalcogen element may include at least any one of oxygen, selenium, or tellurium.

For example, the second precursor may include at least any one of tetradecylphosphonic acid, ifosfamide, octadecylphosphonic acid, hexylphosphonic acid, trioctylphosphine, phosphoric acid, triphenylphosphine, ammonium phosphide, pyrophosphates, davy reagent methyl, cyclophosphamide monohydrate, phosphorus trichloride, phosphorus(V) oxychloride, thiophosphoryl chloride, phosphorus pentachloride, or phosphorus pentasulfide.

According to one embodiment, different heterogeneous types including phosphorus may be used as the second precursor. For example, a mixture of tetradecylphosphonic acid and ifosfamide at a ratio of 1:1 (M %) may be used as the second precursor. Accordingly, a stoichiometric ratio of the transition metal, phosphorus, and the chalcogen element may be controlled to 1:1:1. As a result, as will be described later, the positive electrode according to an embodiment of the present application may have a covellite structure, and the electrochemical properties of the positive electrode may be improved.

According to one embodiment, the transition metal may include copper. In this case, for example, the third precursor may include at least any one of copper chloride, copper(II) sulfate, copper(II) nitrate, copper selenide, copper oxychloride, cupric acetate, copper carbonate, copper thiocyanate, copper sulfide, copper hydroxide, copper naphthenate, or copper(II) phosphate.

Alternatively, according to another embodiment, the transition metal may include at least any one of copper, magnesium, manganese, cobalt, iron, nickel, titanium, zinc, aluminum, or tin.

A mixture may be prepared by mixing the first precursor, the second precursor, and the third precursor, and adding a first reducing agent.

The first precursor, the second precursor, and the third precursor may be mixed in solvent and the first reducing agent may be added. For example, the solvent may be a mixture of ethanol and ethylenediamine. Alternatively, for example, the solvent may be a mixture of ethanol and toluene.

According to one embodiment, the direction of the crystal plane of the electrode structure to be described later may be controlled according to the type and mixing ratio of the solvent. In other words, according to the type and mixing ratio of the solvent, whether the crystal plane 101 is developed or not in the electrode structure may be controlled, and thus the electrochemical properties of the electrode structure may be controlled.

According to an embodiment of the present application, the solvent may be selected (for example, mixing ethanol and ethylenediamine at a volume ratio of 1:3) so that a crystal plane may be developed in the electrode structure 101, thereby improving the electrochemical properties (for example, ORR, OER, HER) of the electrode structure.

After the first precursor, the second precursor, and the third precursor are mixed in the solvent, nucleation and crystallization may proceed as shown in (a) of FIG. 2.

For example, the first reducing agent may include at least any one of ammonium hydroxide, ammonium chloride, or tetramethylammonium hydroxide.

An intermediate product including a plurality of stems may be prepared by co-precipitating the mixture including the first precursor, the second precursor, the third precursor, the first reducing agent, and the solvent (S130).

The mixture may be heat treated to form an intermediate product, as shown in (b) of FIG. 1. The intermediate product may have a plurality of stems, and the plurality of stems may form a network with each other.

For example, the mixture to which the first reducing agent is added may be heat treated under reflux at 120° C., and then washed with deionized water and ethanol.

The first reducing agent may maintain pH and increase a reaction rate while performing a function of the reducing agent during heat treatment. Accordingly, the intermediate product having the plurality of stems may be easily absorbed. For example, when the transition metal is copper and the chalcogen element is sulfur, the intermediate structure may be CuPS having a covellite crystal structure.

A plurality of branches may branch off from the plurality of stems according to a method of adding a second reducing agent to the intermediate product and performing heat treatment under pressure, so as to prepare a plurality of fibrillated fibers including the transition metal, the chalcogen element, and phosphorus.

According to one embodiment, the intermediate product and the second reducing agent may be added to deionized water, and then a pressure heat treatment process may be performed.

For example, the second reducing agent may include at least any one of triton X-165, triton X-102, triton X-45, triton X-114, triton X-405, triton X-101, trimesic acid, diamide, peroxynitrite, formaldehyde, thimerosal, or chloramine-T.

According to one embodiment, a chalcogen element source having the chalcogen element may be further added along with the second reducing agent. Accordingly, the chalcogen element lost in the reaction process may be supplemented by the chalcogen element source, and the electrode structure having a sponge structure in which a plurality of fibrillated fibers to be described later form a network may be easily formed.

For example, when the chalcogen element is sulfur, the chalcogen element source may include at least any one of sodium bisulfite, sodium sulfate, sodium sulfide, sodium thiosulfate, sodium thiomethoxide, sodium ethanethiolate, or sodium methanethiolate.

A process of mixing the intermediate product and the second reducing agent in deionized water may be performed in a cooled state. The reaction rate may be prevented from excessively increasing due to the heat generated in the process of adding the second reducing agent, thereby improving the electrochemical properties of the electrode structure to be described later.

As described above, a plurality of branches may branch off from the plurality of stems as shown in (c) of FIG. 2 by adding a second reducing agent to the intermediate product and performing heat treatment under pressure, and thus the electrode structure having a sponge structure in which a plurality of fibers form a network may be formed.

The electrode structure having a sponge structure may be immersed in liquid nitrogen after being washed with deionized water and ethanol. Accordingly, mechanical properties and flexibility of the electrode structure of the sponge structure may be improved.

In addition, after being immersed in liquid nitrogen, the electrode structure of the sponge structure may be freeze-dried, and the remaining solvents may be removed to minimize a secondary reaction.

The electrode structure may include a membrane of a sponge structure, in which a plurality of branches branch off from the plurality of stems and a plurality of fibers form a network as described above. Accordingly, the electrode structure may have a porous structure in which a plurality of pores having a size of 1 to 2 nm are provided, and may be flexible.

In addition, as described above, the type and ratio of the solvent mixed with the first precursor, the second precursor, and the third precursor may be controlled and thus a crystal plane 101 may be developed in the electrode structure. Accordingly, upon the XRD analysis of the electrode structure, a peak value corresponding to a crystal plane 101 may have a maximum value compared with a peak value corresponding to another crystal plane. Upon the XRD measurement, a peak value corresponding to a crystal plane 101 may be observed in a range of 2θ values of 19° to 21°.

The plurality of fibers forming the electrode structure may include a compound of the transition metal, phosphorus, and the chalcogen element. For example, when the transition metal is copper and the chalcogen element is oxygen, the fiber may be represented by the following <Formula 1>.

$$CuP_xS_y \qquad\qquad\qquad \text{<Formula 1>}$$

When the fiber forming the electrode structure is represented as above <Formula 1>, it may be x+y=1, $0.3 \leq x \leq 0.7$, $0.3 \leq y \leq 0.7$.

If, in above <Formula 1>, x is less than 0.3 or more than 0.7 and y is less than 0.3 or more than 0.7, ORR, OER, and HER properties of the electrode structure may be deteriorated, and thus the electrode structure may not react reversibly in a process of charging/discharging of a metal-air battery including as a positive electrode, accordingly.

However, according to an embodiment of the present application, when the electrode structure is represented by $CuP_xS_y$, a composition ratio of P may be 0.3 or more and 0.7 or less and a composition ratio of S may be 0.3 or more and 0.7 or less. Accordingly, the ORR, OER, and HER properties of the electrode structure may be improved, and the charge/discharge property and life property of a metal-air battery, which includes the electrode structure as the positive electrode, may be improved.

Alternatively, unlike the above, according to one modified example, the electrode structure may be a compound of the transition metal and the chalcogen element (for example, sulfur). Alternatively, according to another modified example, the electrode structure may be a compound of the transition metal and phosphorus.

When the metal-air battery including the electrode structure as a positive electrode performs charging and discharging, a lattice spacing of the fibers included in the electrode structure may be reversibly changed. Specifically, when the metal-air battery is charged, the lattice spacing may be 0.478 nm, and when the metal-air battery is discharged, the lattice spacing may be 0.466 nm. The lattice spacing of the fibers may be confirmed by the HRTEM.

According to an embodiment of the present application, the electrode structure having a membrane shape in which the plurality of fibrillated fibers form a network according to a method of mixing the first precursor having the chalcogen element, the second precursor having phosphorus, and the third precursor having the transition metal.

The electrode structure having high electrochemical properties may be prepared by an inexpensive method.

In addition, the electrode structure may be fabricated by co-precipitation and heat treatment under pressure, and thus may be easily mass-produced and subjected to a simple fabrication process, thereby providing the electrode structure for a positive electrode of a metal-air battery.

Hereinafter, a metal-air battery including the electrode structure according to an embodiment of the present application described above will be described.

The metal-air battery may include a positive electrode, a negative electrode, and an electrolyte between the positive electrode and the negative electrode.

The negative electrode may include zinc. Alternatively, the negative electrode may include lithium.

The electrolyte may be a solid electrolyte. According to one embodiment, as will be described later, the electrolyte may be a membrane in which composite fibers including bacterial cellulose and chitonic acid bound to the bacterial cellulose form a network. Alternatively, the electrolyte may be an oxide-based, sulfide-based, or polymer-based electrolyte.

The positive electrode may include the electrode structure described with reference to FIGS. 1 and 2, and oxygen may be used as a positive electrode active material.

Hereinafter, will be described the results of evaluating the properties of an electrode structure according to a specific experimental embodiment of the present invention and a metal-air battery including the same.

Fabrication of electrode structure and secondary battery according to Experimental Example 1

Dithiooxamide was prepared as a first precursor having sulfur, a mixture of tetradecylphosphonic acid and ifosfamide (1:1 M %) was prepared as a second precursor having phosphorus, copper chloride was prepared as a third precursor having copper, and a mixture of ethanol and ethylenediamine (1:3 v/v %) was prepared as a solvent.

The first to third precursors were added to the solvent and stirred to prepare a suspension.

After that, 2.5 M % ammonium hydroxide was added as a first reducing agent, stirred for two hours, and heat treated at 120° C. for six hours, after which an intermediate product was obtained, washed with deionized water and ethanol, and dried under vacuum at 50° C.

In an ice bath, the intermediate product was mixed and stirred in 20 ml of deionized water with Triton X-165 as a secondary reducing agent and sodium bisulfite as an elemental sulfur source. After that, heat treatment was performed under pressure at 120° C. for 24 hours to prepare a membrane which is formed of a compound of copper, phosphorus, and sulfur and in which a plurality of fibrillated fibers form a network.

The membrane was washed with deionized water and ethanol to adjust to neutral pH, stored at −70° C. for two hours, immersed in liquid nitrogen, and freeze-dried in vacuum, so as to prepare a CuPS electrode structure according to Experimental Example 1 in which a crystal plane 101 is developed.

In the process of fabricating the electrode structure according to Experimental Example 1, a ratio of the first precursor having sulfur and the second precursor having phosphorus was controlled to adjust a ratio of P and S in CuPS at 0.1:0.9, 0.2:0.8, 03:0.7, 0.5:0.5, 0.7.0.3, and 0.9:0.1, respectively.

A zinc-air battery according to Experimental Example 1 was fabricated by using the CuPS electrode structure according to Experimental Example 1 as a positive electrode, laminating a solid electrolyte according to Experimental Example to be described later, and a patterned zinc negative electrode.

Fabrication of Electrode Structure According to Experimental Example 2

The same method as in Experimental Example 1 described above was performed, except for using a mixture of ethanol and toluene (1:1 v/v %) as a solvent, and then a pressure heat treatment was performed at 150° C. for 24 hours, thereby fabricating a CuPS electrode structure according to Experimental Example 2.

In the process of fabricating the electrode structure according to Experimental Example 1, a ratio of the first precursor having sulfur and the second precursor having phosphorus was controlled to adjust a ratio of P and S in CuPS at 0.1:0.9, 0.2:0.8, 03:0.7, 0.5:0.5, 0.7.0.3, and 0.9:0.1, respectively.

Fabrication of Electrode Structure According to Experimental Example 3

The same method as in Experimental Example 2 described above was performed, except for omitting the second precursor having phosphorus, thereby fabricating a CuPS electrode structure according to Experimental Example 3.

Fabrication of Electrode Structure According to Experimental Example 4

The same method as in Experimental Example 2 described above was performed, except for omitting the first precursor having sulfur, thereby fabricating a CP electrode structure according to Experimental Example 4.

Fabrication of Solid Electrolyte According to Experimental Example

*Acetobacter xylinum* was provided as a bacterial strain, and a chitosan derivative was provided. The chitosan derivative was prepared by dissolving 1 g of chitosan chloride in 1% (v/v) aqueous acetic acid, treating with 1 M glycidyltrimethylammonium chloride at 65° C. for 24 hours in an $N_2$ atmosphere, precipitating, filtering multiple times with ethanol.

A Hestrin-Schramm (HS) culture medium containing pineapple juice (2% w/v), yeast (0.5% w/v), peptone (0.5% w/v), disodium phosphate (0.27% w/v), citric acid (0.015% w/v), and chitosan derivative (2% w/v) was prepared and steam-sterilized at 121° C. for 20 minutes. In addition, *Acetobacter xylinum* was activated in a pre-cultivation Hestrin-Schramm (HS) culture medium at 30° C. for 24 hours, and acetic acid was added to maintain pH 6.

After that, *Acetobacter xylinum* was cultured in the Hestrin-Schramm (HS) culture medium at 30° C. for seven days.

The harvested bacterial pellicle was washed with deionized water to neutralize the pH of the supernatant and dehydrated in vacuum at 105° C. The resulting cellulose was demineralized by using 1 N HCl for 30 minutes (a mass ratio of 1:15, w/v) to remove an excessive amount of reagent, and then was purified plurality of times by centrifugation with deionized water until the supernatant reached a neutral pH. Finally, all solvents were evaporated at 100° C. to prepare a base composite fiber (chitosan-bacterial cellulose (CBC)).

2 g of the base composite fiber dispersed in a 2 mM TEMPO aqueous solution was reacted with NaBr (1.9 mM). 5 mM NaClO was used as an oxidizing agent.

The reaction suspension was stirred with ultrasonic waves, and the reaction was allowed to proceed at room temperature for three hours. The pH of the suspension was maintained at 10 by successive addition of 0.5M NaOH solution. Then, 1N HCL was added to the suspension to keep the pH neutral for three hours. The oxidized pulp produced in the suspension was washed three times with 0.5 N HCl, and the supernatant was brought to a neutral pH with deionized water.

The washed pulp was exchanged with acetone and toluene for 30 minutes and dried to evaporate the solvent, and finally a first composite fiber (oCBC) fiber was obtained.

1 g of the base composite fiber dispersed in N,N-dimethylacetamide (35 ml) solution was reacted with LiBr (1.25 g) suspension while being stirred for 30 minutes. N-bromosuccinimide (2.1 g) and triphenylphosphine (3.2 g) were used as a coupling agent. The two reaction mixtures were stirred for 10 minutes and reacted at 80° C. for 60 minutes.

Then, the reaction suspension was cooled to room temperature, added to deionized water, filtered, rinsed with deionized water and ethanol, and freeze-dried to obtain a brominated base composite (bCBC) fiber.

The brominated base composite fiber was dissolved in 100 ml of N,N-dimethylformamide and reacted with 1.2 g of 1,4-diazabicyclo[2.2.2]octane coupling agent.

After that, the mixture was subjected to ultrasonic treatment for 30 minutes, and then reacted at room temperature for 24 hours. The resulting solution was mixed with diethyl ether, washed five times with diethyl ether/ethyl acetate, and freeze-dried to obtain a second composite fiber (covalently quaternized CBC (qCBC)).

The first composite fiber (oCBC) and the second composite fiber (qCBC) were dissolved in a mixture of methylene chloride, 1,2-propanediol and acetone (8:1:1 v/v/v %) at the same weight ratio by using ultrasonic waves, and then 1 wt % of glutaraldehyde as a crosslinking agent and 0.3 wt % of N,N-diethyl-N-methyl-N-(2-methoxyethyl)ammonium bis(trifluoromethanesulfonyl)imide were added as an initiator.

A vacuum chamber (200 Pa) was used to remove air bubbles from the gel suspension and cast on glass at 60° C. for six hours. A composite fiber membrane was peeled off while being coagulated with deionized water, rinsed with deionized water, and vacuum dried.

Solid electrolyte (CBCs) was prepared through ion exchange with 1 M KOH aqueous solution and 0.1 M ZnTFSI at room temperature for six hours, respectively. After that, washing and immersion processes were performed with deionized water in an $N_2$ atmosphere in order to avoid a reaction with $CO_2$ and a carbonate formation.

Figure 3:
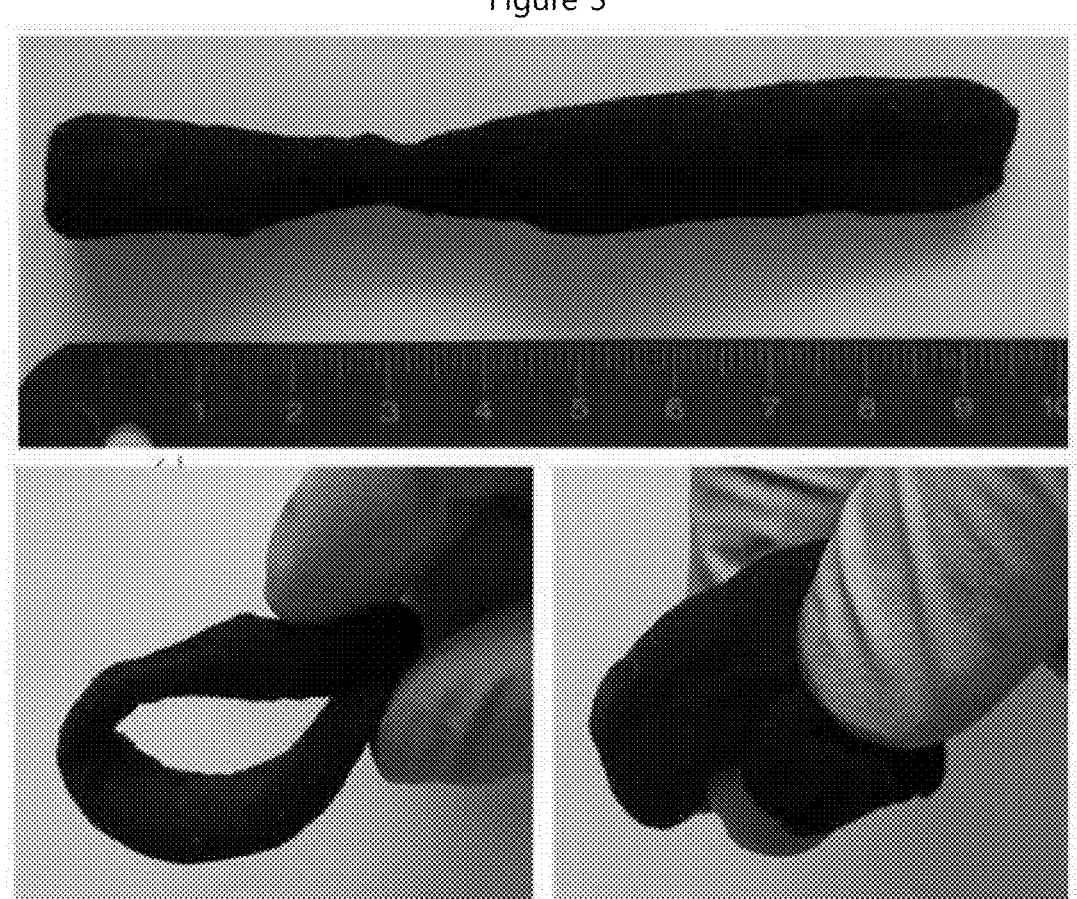
FIG. 3 is a view showing pictures of an electrode structure fabricated according to Experimental Example 1 of the present application.
Figure 4:
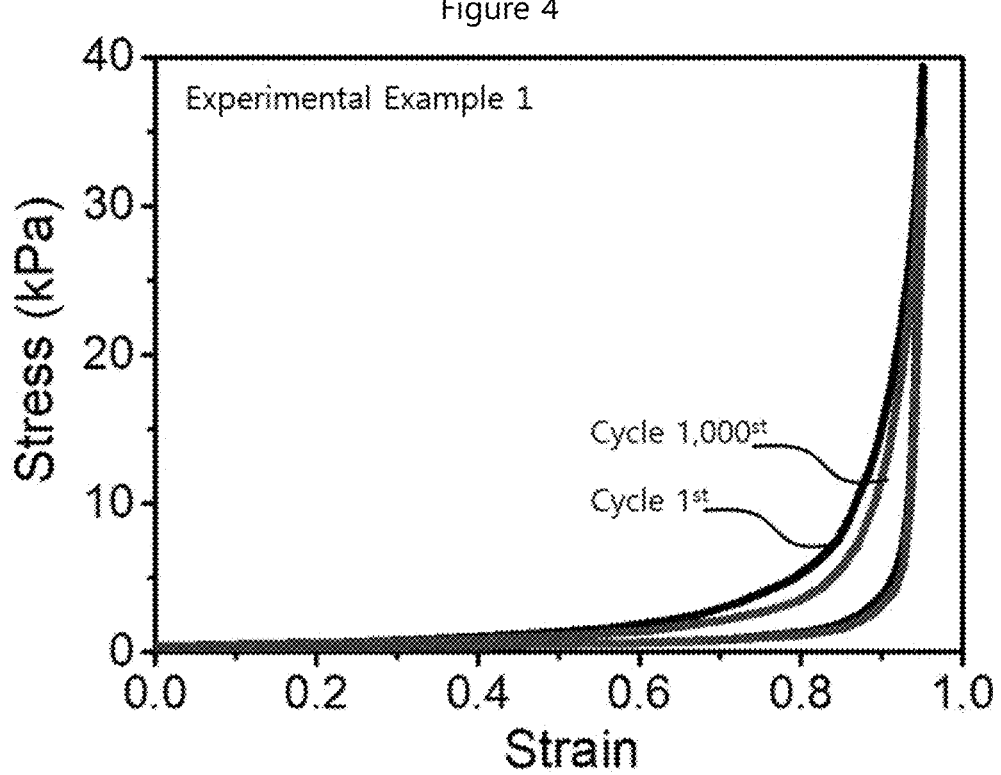
FIG. 4 is a stress-strain graph of an electrode structure fabricated according to Experimental Example 1 of the present application.

FIG. 3 is a view showing pictures of an electrode structure fabricated according to Experimental Example 1 of the present application, and FIG. 4 is a stress-strain graph of an electrode structure fabricated according to Experimental Example 1 of the present application.

Referring to FIGS. 3 and 4, the electrode structure ($CuP_{0.5}S_{0.5}$) fabricated according to Experimental Example 1 described above was photographed, and stress-strain was measured under the conditions of relative humidity of about 40% and room temperature.

As shown in FIG. 3, it can be confirmed that the electrode structure according to Experimental Example 1 has a length of about 10 cm and is flexible.

In addition, as shown in FIG. 4, it can be confirmed that the electrode structure according to Experimental Example 1 has a high recovery rate of about 94% and has high flexibility, compressibility, and elasticity even after applying stress for 1000 times.

Figure 5:
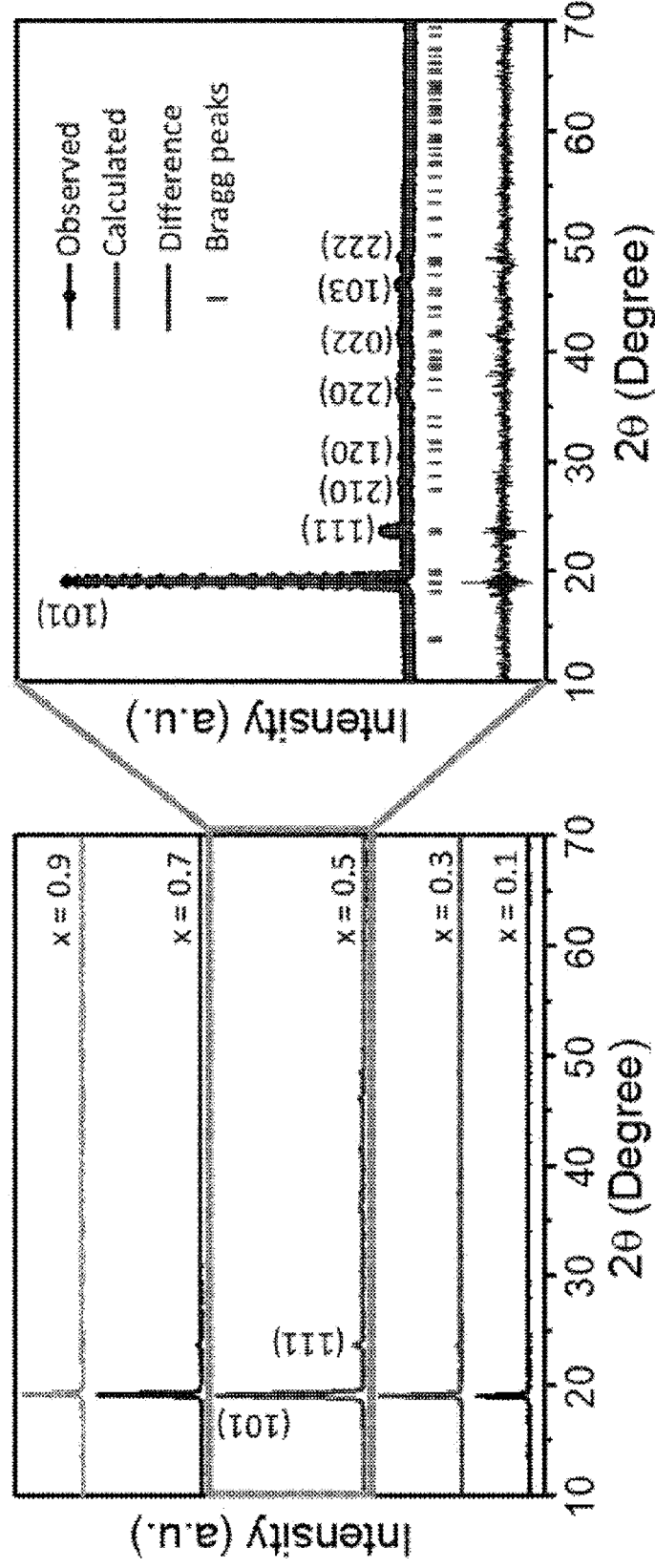
FIG. 5 is an XRD graph of an electrode structure fabricated according to Experimental Example 1 of the present application.
Figure 6:
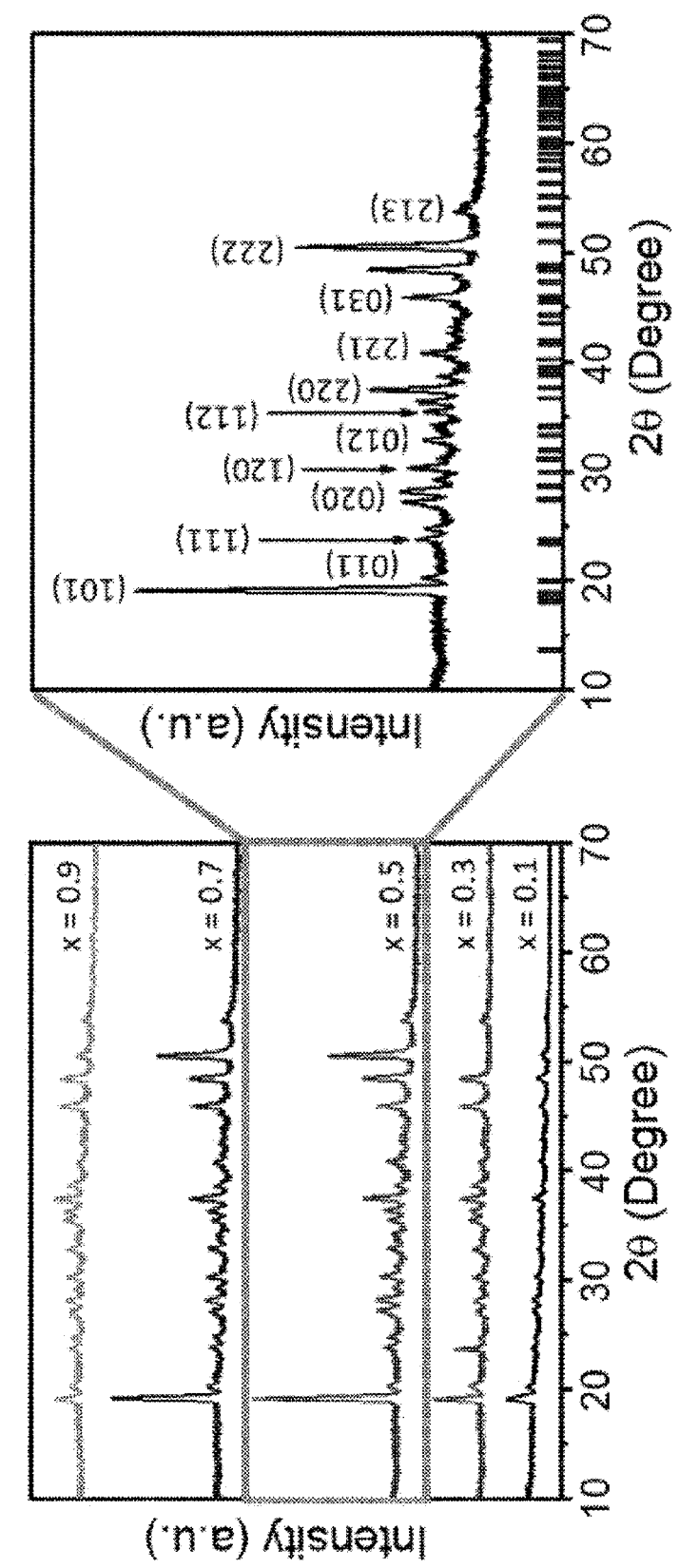
FIG. 6 is an XRD graph of an electrode structure fabricated according to Experimental Example 2 of the present application.
Figure 7:
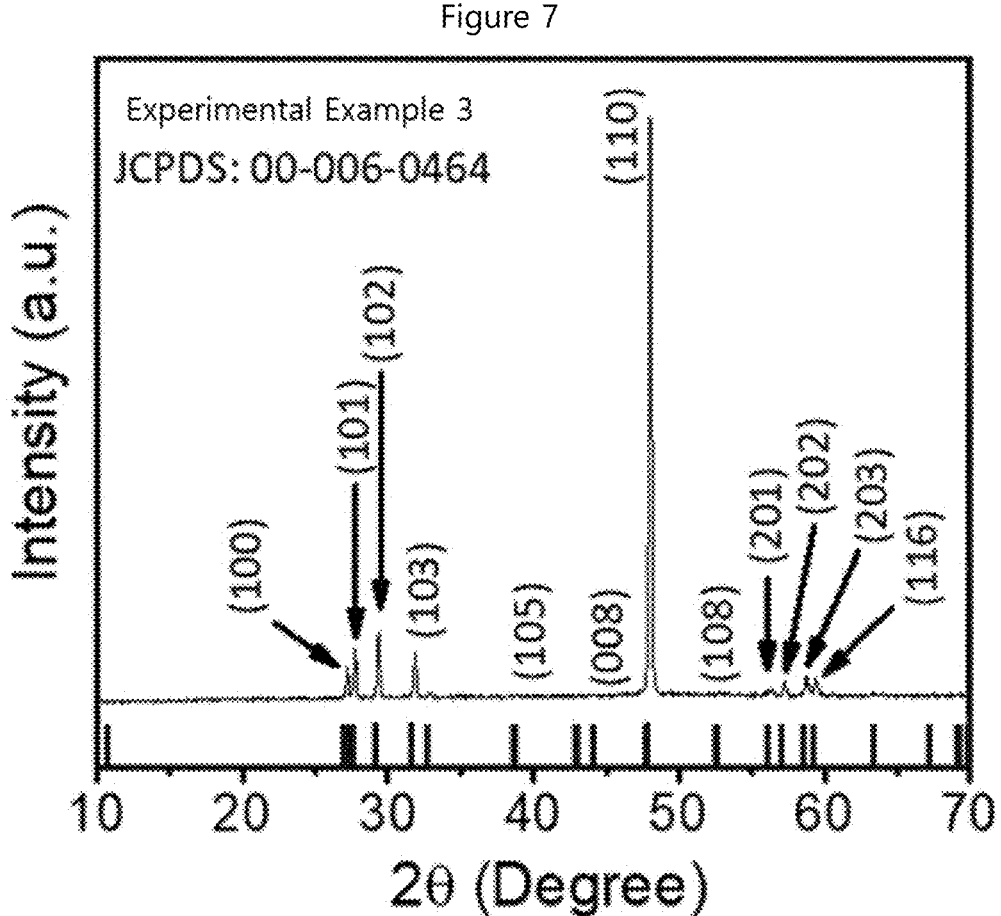
FIG. 7 is an XRD graph of an electrode structure fabricated according to Experimental Example 3 of the present application.
Figure 8:
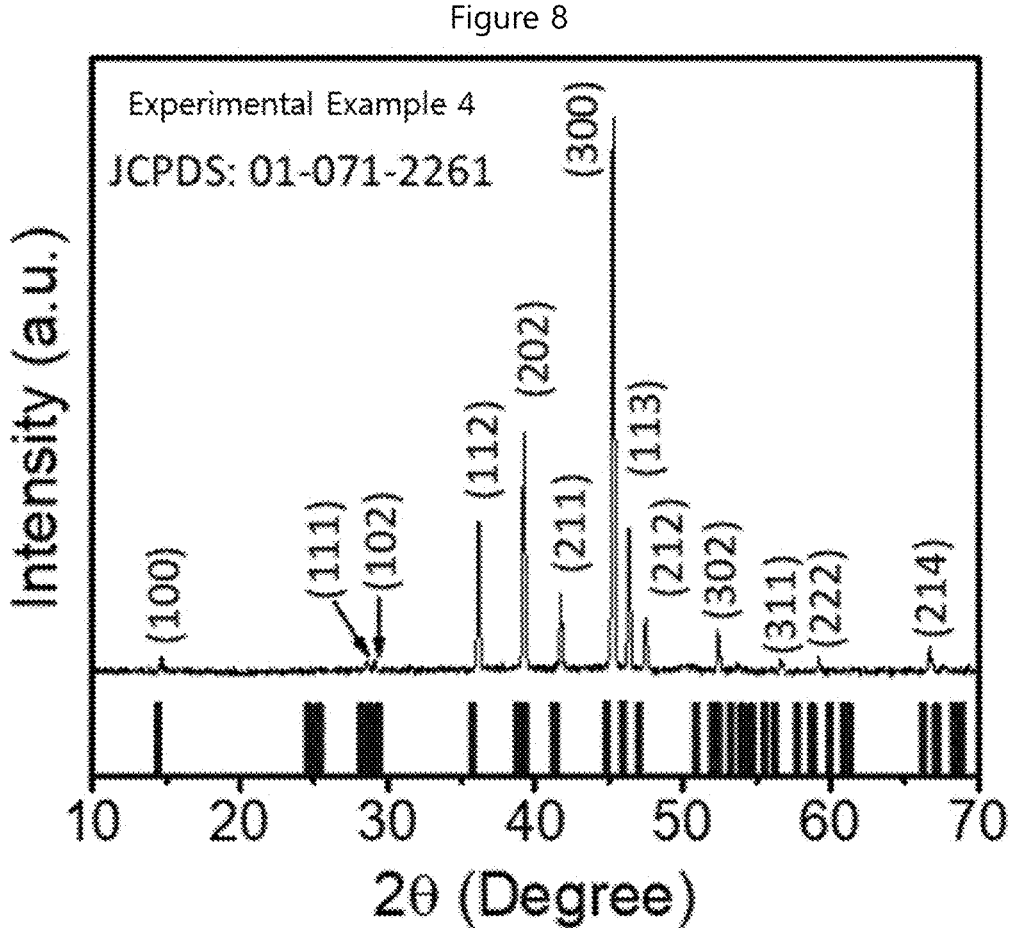
FIG. 8 is an XRD graph of an electrode structure fabricated according to Experimental Example 4 of the present application.

FIG. 5 is an XRD graph of an electrode structure fabricated according to Experimental Example 1 of the present application, FIG. 6 is an XRD graph of an electrode structure fabricated according to Experimental Example 2 of the present application, FIG. 7 is an XRD graph of an electrode structure fabricated according to Experimental Example 3 of the present application, and FIG. 8 is an XRD graph of an electrode structure fabricated according to Experimental Example 4 of the present application.

Referring to FIGS. 5 to 8, an XRD measurement was performed for a CuPS electrode structure having various P and S composition ratios according to Experimental Example 1, a CuPS electrode structure having various P and S composition ratios according to Experimental Example 2, and CS and CP electrode structures according to Experimental Examples 3 and 4.

As can be confirmed from FIGS. 5 and 6, it can be confirmed that a pattern changes according to a composition ratio of P and S in the CuPS electrode structures according to Experimental Examples 1 and 2, and it can be seen that a size of a peak corresponding to the crystal plane 101 is larger than a size of a peak corresponding to another crystal plane.

In addition, in the case of the CuPS electrode structure according to Experimental Example 1 in which a crystal plane 101 is developed compared with the CuPS electrode structure according to Experimental Example 2 of FIG. 6, it can be confirmed that a size of a peak corresponding to the crystal plane 101 is remarkably high compared with peak values corresponding to another crystal plane other than the crystal plane 101.

As can be understood from FIGS. 7 and 8, in the case of CuS and CuP electrode structures according to Experimental Examples 3 and 4, unlike the CuPS electrode structures of Experimental Examples 1 and 2, a peak corresponding to the crystal plane 101 was not large, or a peak corresponding to the crystal plane 101 was not observed.

In addition, it can be seen that the CuPS electrode structures of Experimental Examples 1 and 2 have a covellite phase as an orthorhombic crystal structure Pnm21 space group, and it can be confirmed that the CuS electrode structure of Experimental Example 3 has a hexagonal crystal structure P63/mmc space group and the CuP electrode structure of Experimental Example 4 has a hexagonal crystal structure P63 cm space group.

Figure 9:
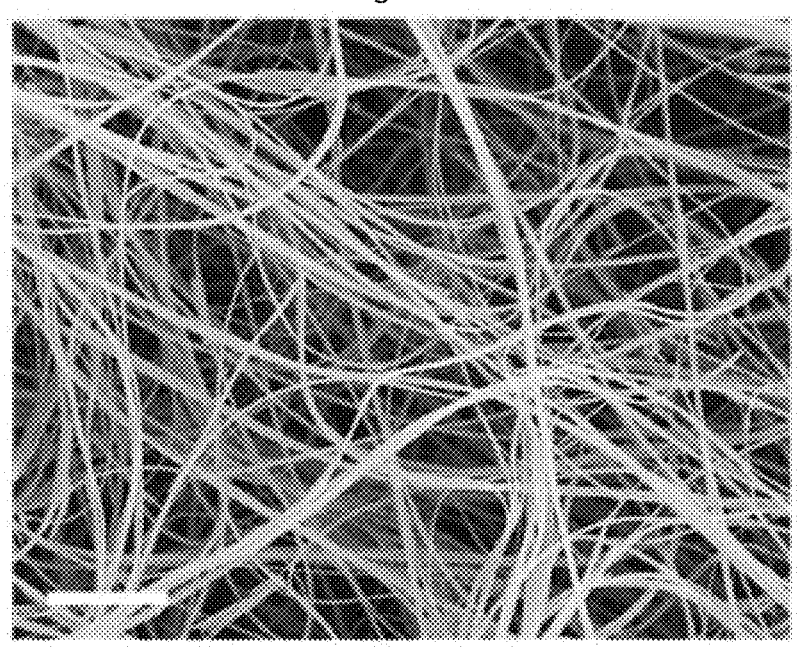
FIG. 9 is a view showing an SEM picture of an electrode structure according to Experimental Example 1 of the present application.
Figure 10:
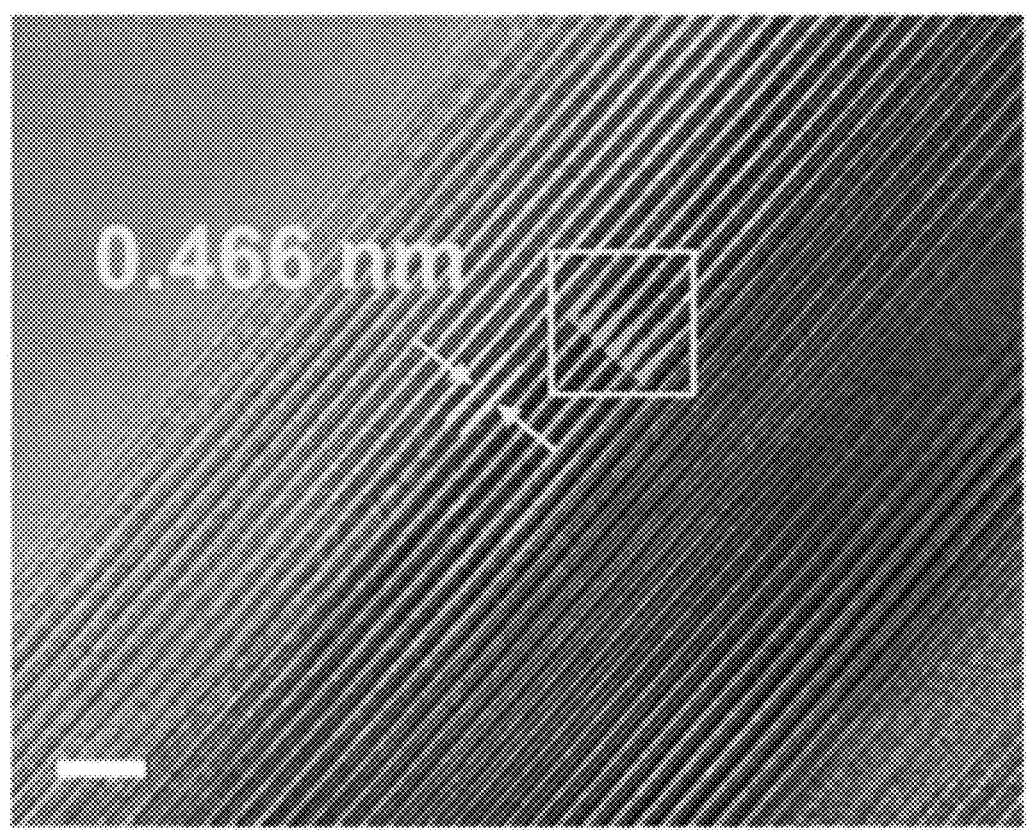
FIG. 10 is a view showing TEM pictures of an electrode structure according to Experimental Example 1 of the present application.
Figure 10:
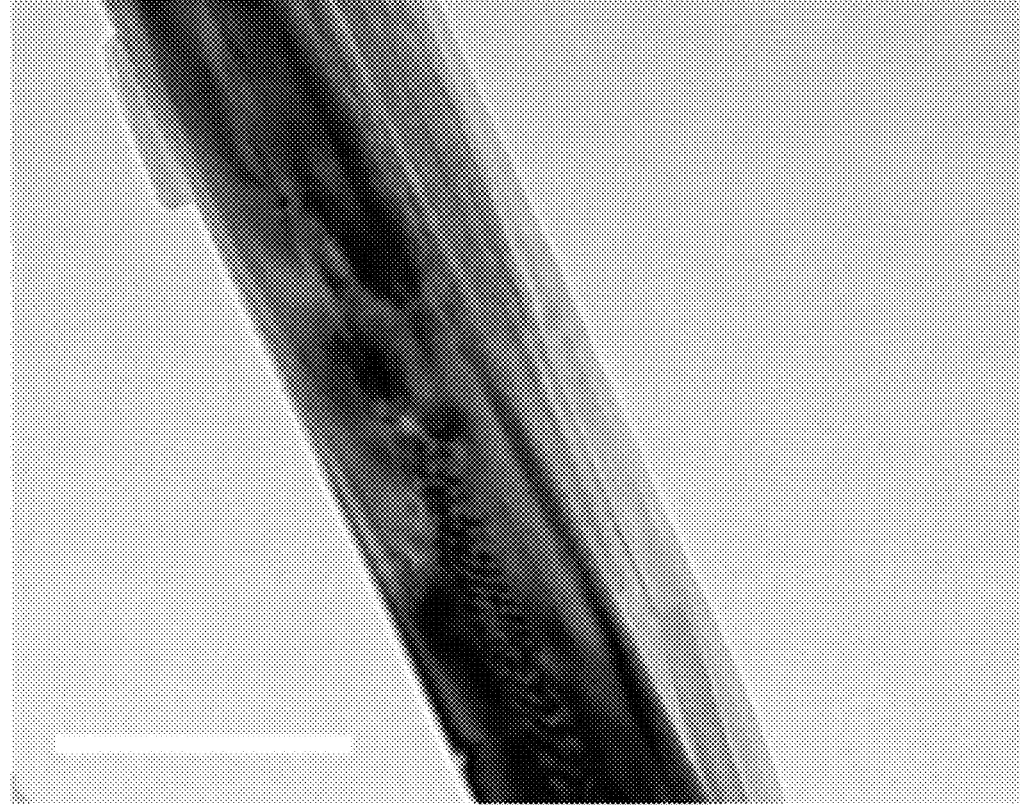
Figure 11:
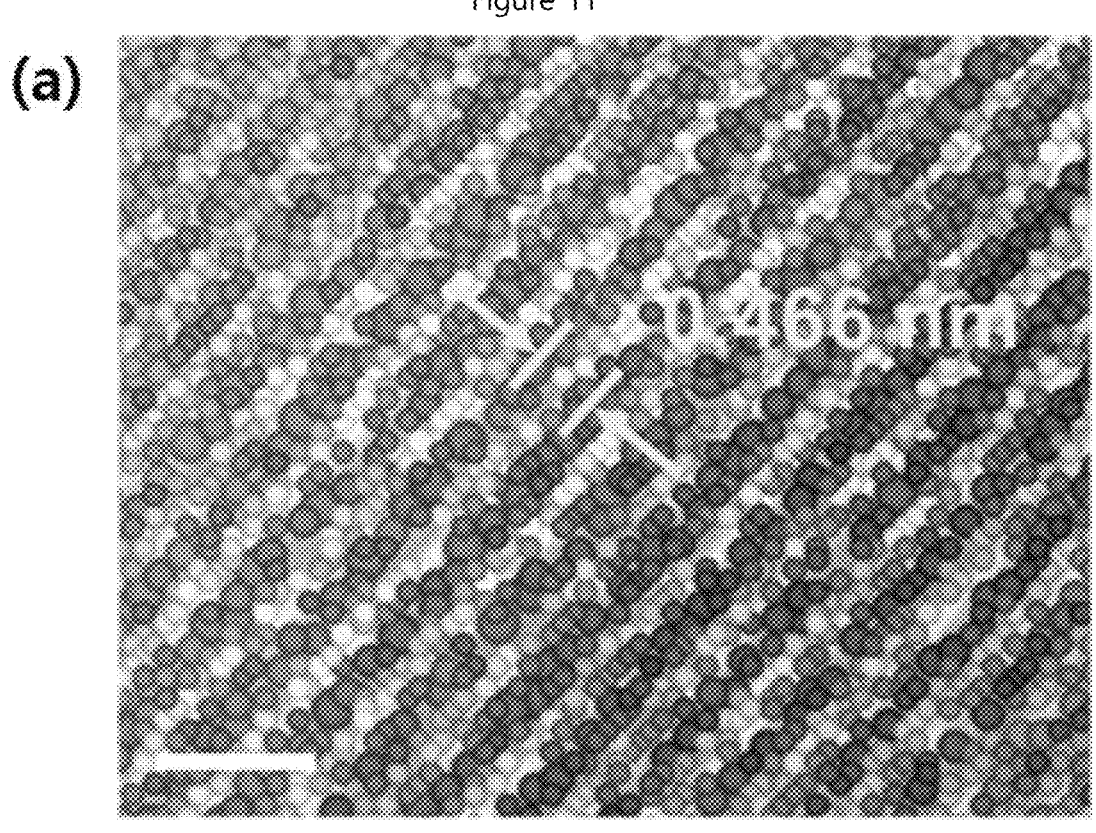
FIG. 11 is a view showing a simulation and a lattice fringe image of an atomic structure according to Experimental Example 1 of the present application.
Figure 11:
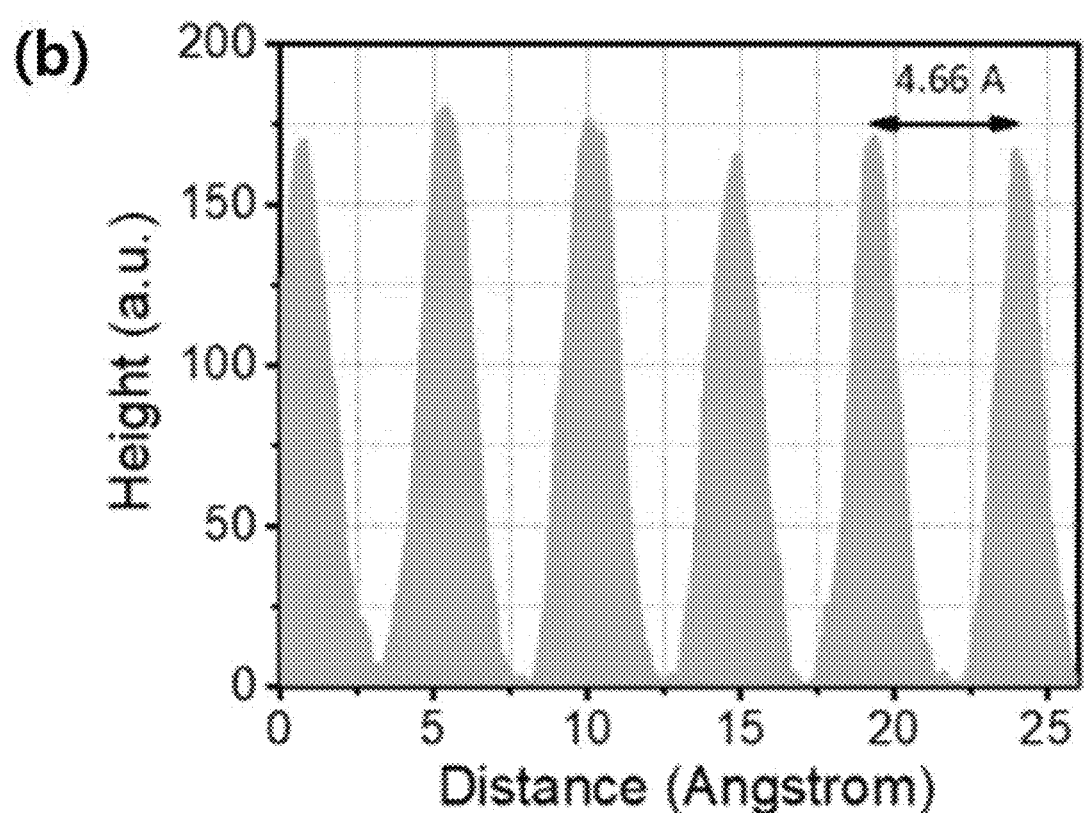

FIG. 9 is a view showing an SEM picture of an electrode structure according to Experimental Example 1 of the present application, FIG. 10 is a view showing TEM pictures of an electrode structure according to Experimental Example 1 of the present application, and FIG. 11 is a view showing a simulation and a lattice striped pattern of an atomic structure of an electrode structure according to Experimental Example 1 of the present application.

Referring to FIGS. 9 to 11, SEM and TEM pictures were taken for the CuPS electrode structure ($CuP_{0.5}S_{0.5}$) according to Experimental Example 1, and a simulation of an atomic structure and lattice stripes were displayed. (a) of FIG. 10 is a high-resolution (scale bar 2 nm) TEM picture of the electrode structure of Experimental Example 1, (b) of FIG. 10 is a low-resolution (scale bar 30 nm) TEM picture of the electrode structure of Experimental Example 1, (a) of FIG. 11 is a simulation showing an atomic arrangement of the crystal plane 101 of the electrode structure of Experimental Example 1, and (b) of FIG. 11 is a topographic plot profile of lattice stripes of the electrode structure of Experimental Example 1.

As can be understood from FIG. 9, it can be confirmed that a plurality of fibers form a network in the electrode structure of Experimental Example 1.

In addition, as can be understood from FIGS. 10 and 11, it can be confirmed that a lattice spacing of the electrode structure of Experimental Example 1 is 0.466 nm.

Figure 12:
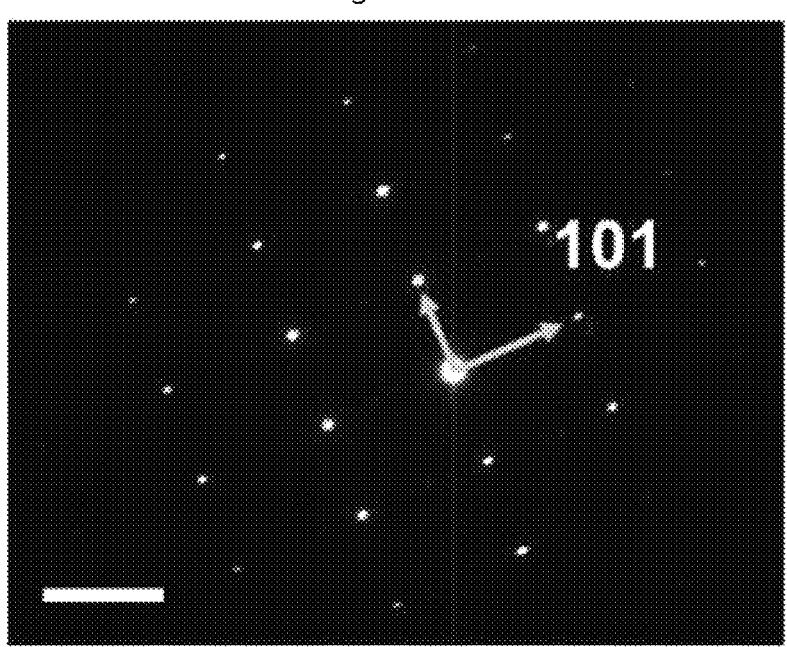
FIG. 12 is an SEAD pattern of an electrode structure fabricated according to Experimental Example 1 of the present application.
Figure 13:
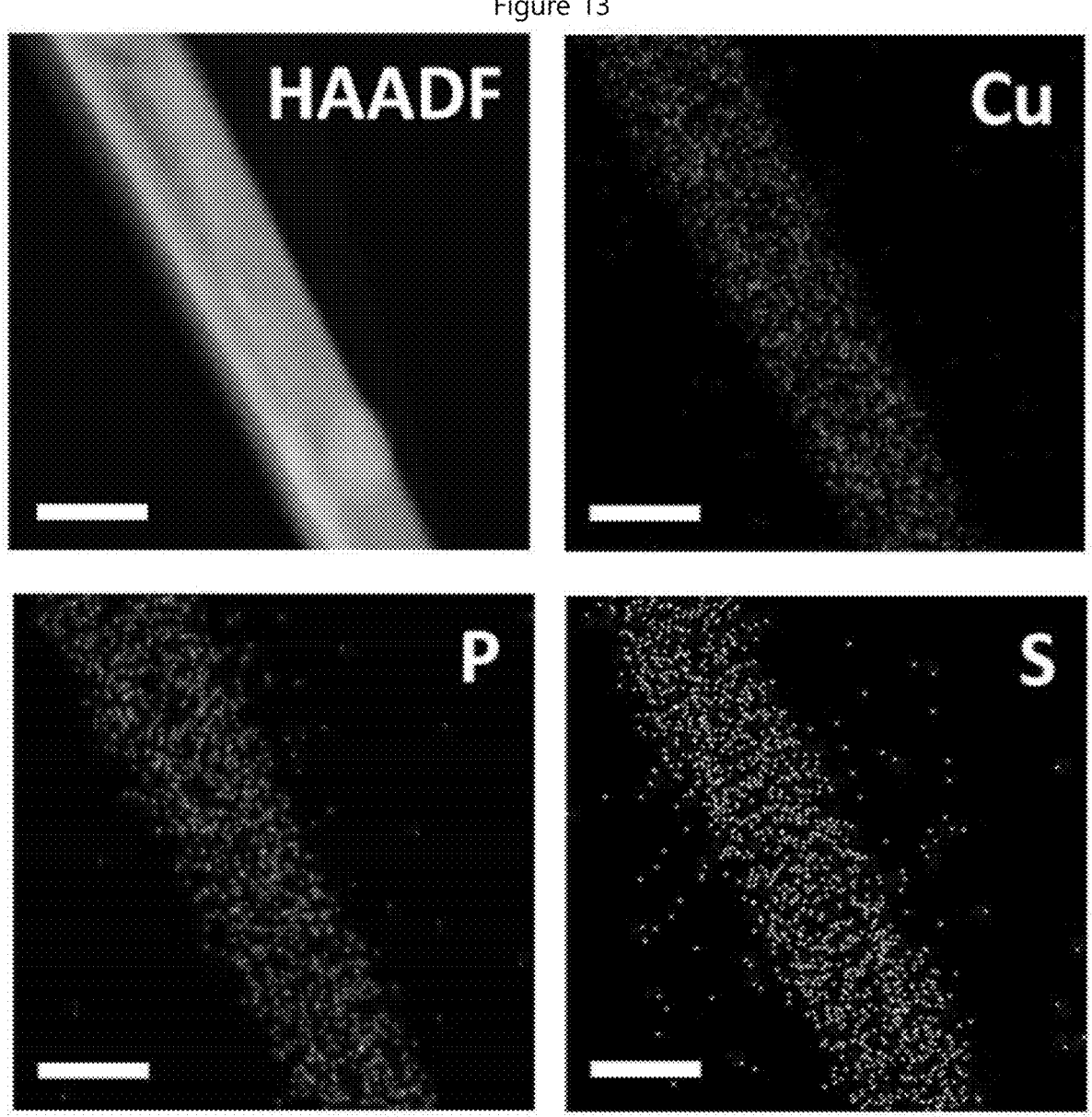
FIG. 13 is a view showing HAADF-STEM images of an electrode structure according to Experimental Example 1 of the present application.

FIG. 12 is an SEAD pattern of an electrode structure according to Experimental Example 1 of the present application, and FIG. 13 is a view showing HAADF-STEM images of an electrode structure according to Experimental Example 1 of the present application.

Referring to FIGS. 12 and 13, a SEAD pattern (scale 2 $nm^{-1}$) was obtained for the plane 101 of the CuPS electrode structure ($CuP_{0.5}S_{0.5}$) according to Experimental Example 1 described above, high angle annular dark field canning transmission electron microscopy (HAADF-STEM) images were taken, and mapping results are shown for Cu, P, and S.

As can be understood from FIGS. 12 and 13, it can be seen that the electrode structure of Experimental Example 1 has an orthorhombic crystal structure having a crystal plane 101 and is formed of a compound of Cu, P, and S.

Figure 14:
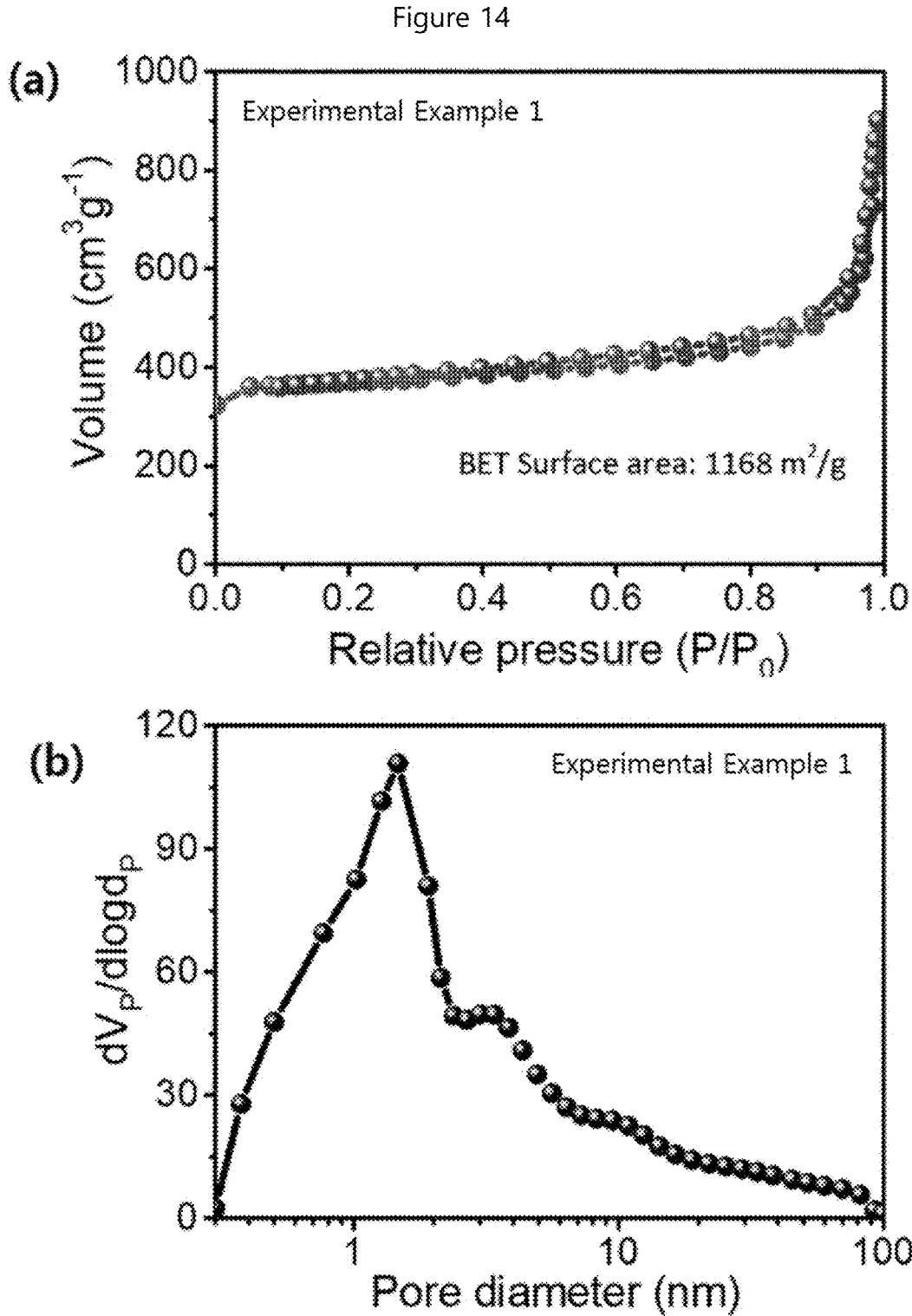
FIG. 14 is a graph for explaining a specific area and a pore of an electrode structure according to Experimental Example 1 of the present application.

FIG. 14 is a graph for explaining a specific area and a pore of an electrode structure according to Experimental Example 1 of the present application.

Referring to FIG. 14, a BET surface area of a CuPS electrode structure ($CuP_{0.5}S_{0.5}$) according to Experimental Example described above 1 was measured. It can be confirmed that an electrode structure according to Experimental Example 1 has a porous structure with a specific surface area of 1168 $m^2/g$ and has a large amount of pores having a size of 1 to 2 nm.

Figure 15:
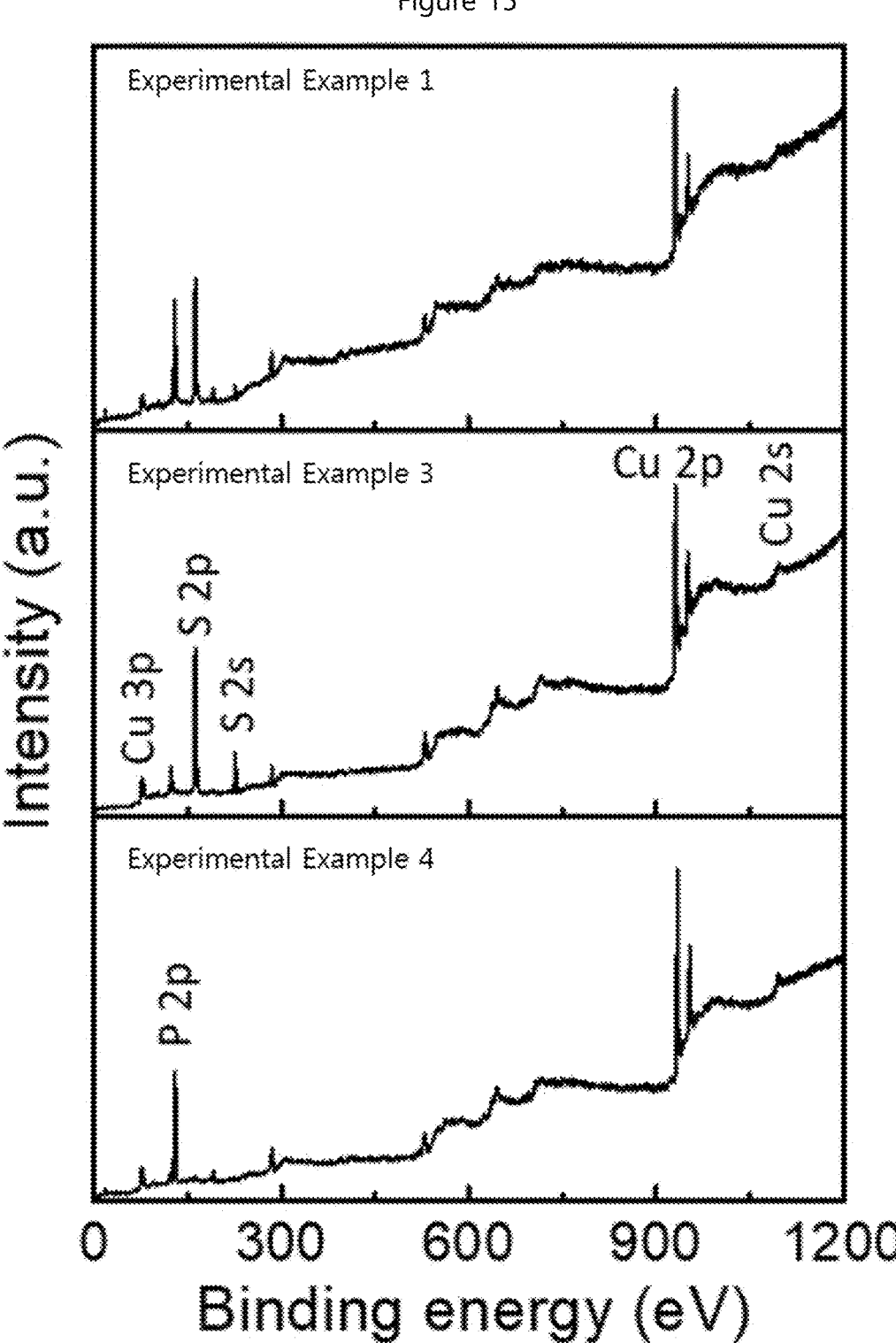
FIG. 15 is a graph showing an XPS measurement of electrode structures according to Experimental Examples 1, 3 and 4 of the present application.

FIG. 15 is a graph showing XPS measurement of an electrode structure according to Experimental Examples 1, 3 and 4 of the present application.

Referring to FIG. 15, an XPS measurement was performed for the electrode structures according to Experimental Examples 1, 3 and 4, and a ratio of Cu, P and S of the electrode structures according to Experimental Examples 1, 3 and 4 was calculated. In addition, the ratio of Cu, P and S of the electrode structures of Experimental Examples 1, 3 and 4 according to inductively coupled plasma spectrometer (ICP) and energy dispersive X-ray spectroscopy (EDS) was calculated as shown in [Table 1] to [Table 3] below.

TABLE 1

| XPS | Cu(at %) | P(at %) | S(at %) |
|---|---|---|---|
| Experimental Example 1 (CuPS) | 48.92 | 24.89 | 26.19 |
| Experimental Example 3 (CuS) | 50.44 | — | 49.56 |
| Experimental Example 4 (CuP) | 74.37 | 25.63 | — |

TABLE 2

| ICP | Cu(at %) | P(at %) | S(at %) |
|---|---|---|---|
| Experimental Example 1 (CuPS) | 48.96 | 24.86 | 26.18 |
| Experimental Example 3 (CuS) | 50.32 | — | 49.68 |
| Experimental Example 4 (CuP) | 74.16 | 25.84 | — |

TABLE 3

| EDS | Cu(at %) | P(at %) | S(at %) |
|---|---|---|---|
| Experimental Example 1 (CuPS) | 49.12 | 24.99 | 25.89 |
| Experimental Example 3 (CuS) | 50.57 | — | 49.43 |

TABLE 3-continued

| EDS | Cu(at %) | P(at %) | S(at %) |
|---|---|---|---|
| Experimental Example 4 (CuP) | 74.29 | 25.71 | — |

As can be seen from [Table 1] to [Table 3], it can be confirmed that the electrode structure according to Experimental Example 1 substantially has Cu, P and S at a ratio of 1:0.5:0.5; it can be confirmed that the electrode structure according to Experimental Example 3 substantially has Cu and S at a ratio of 1:1; and it can be confirmed that the electrode structure according to Experimental Example 4 substantially has Cu and P at a ratio of 3:1.

Figure 16:
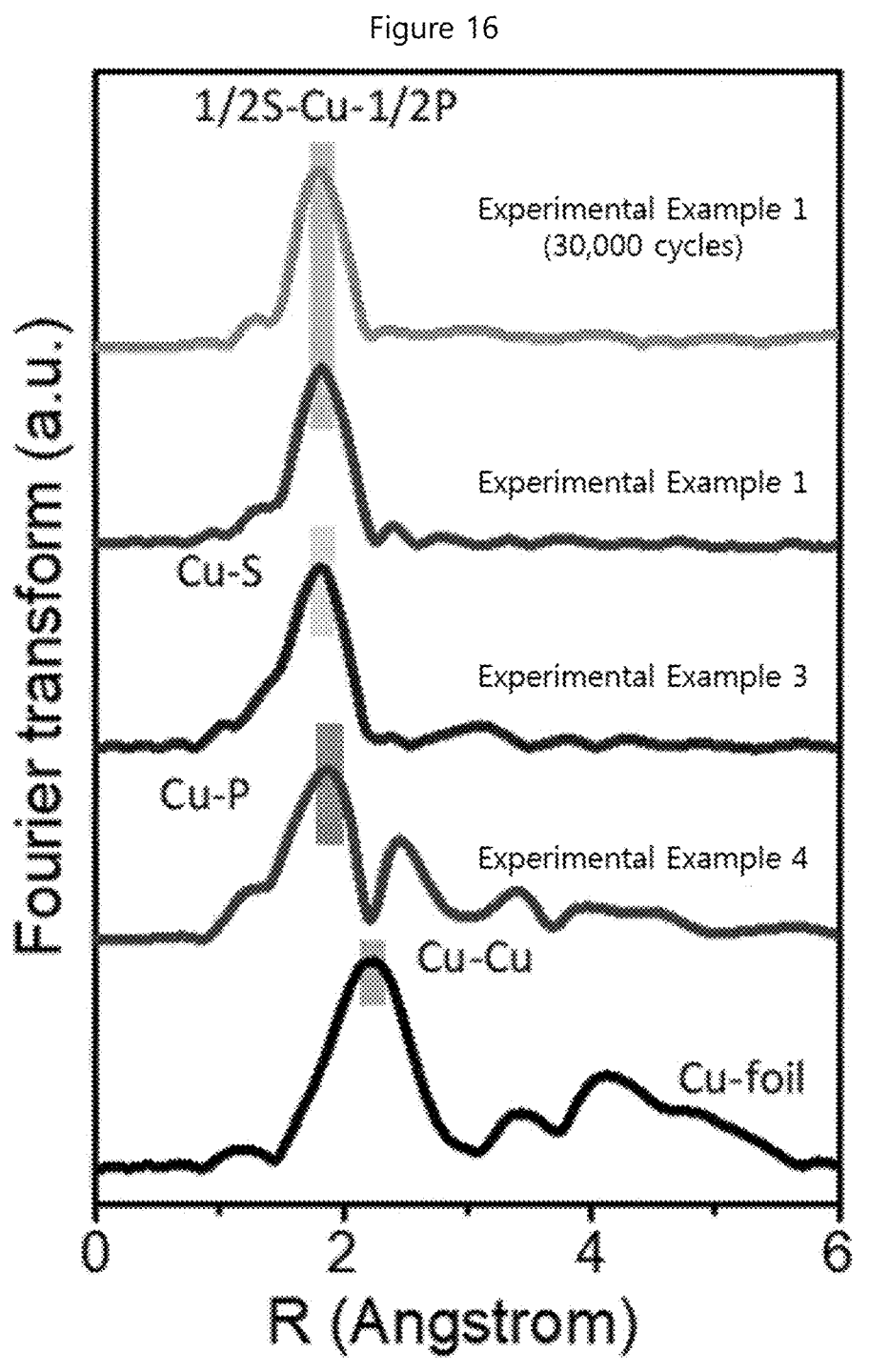
Figure 17:
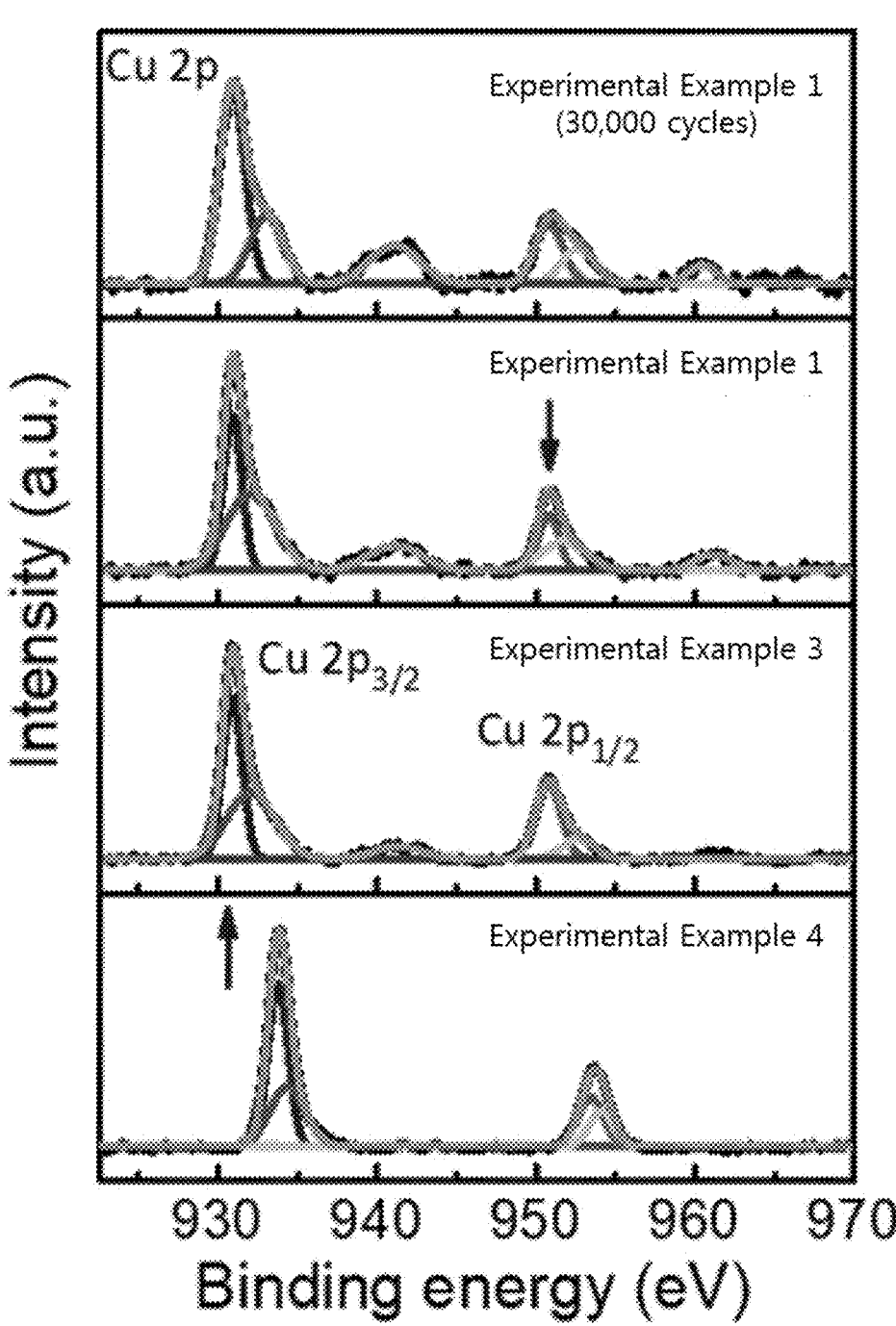
FIG. 17 is a Cu 2p XPS spectral graph showing electrode structures according to Experimental Examples 1, 3 and 4.
Figure 18:
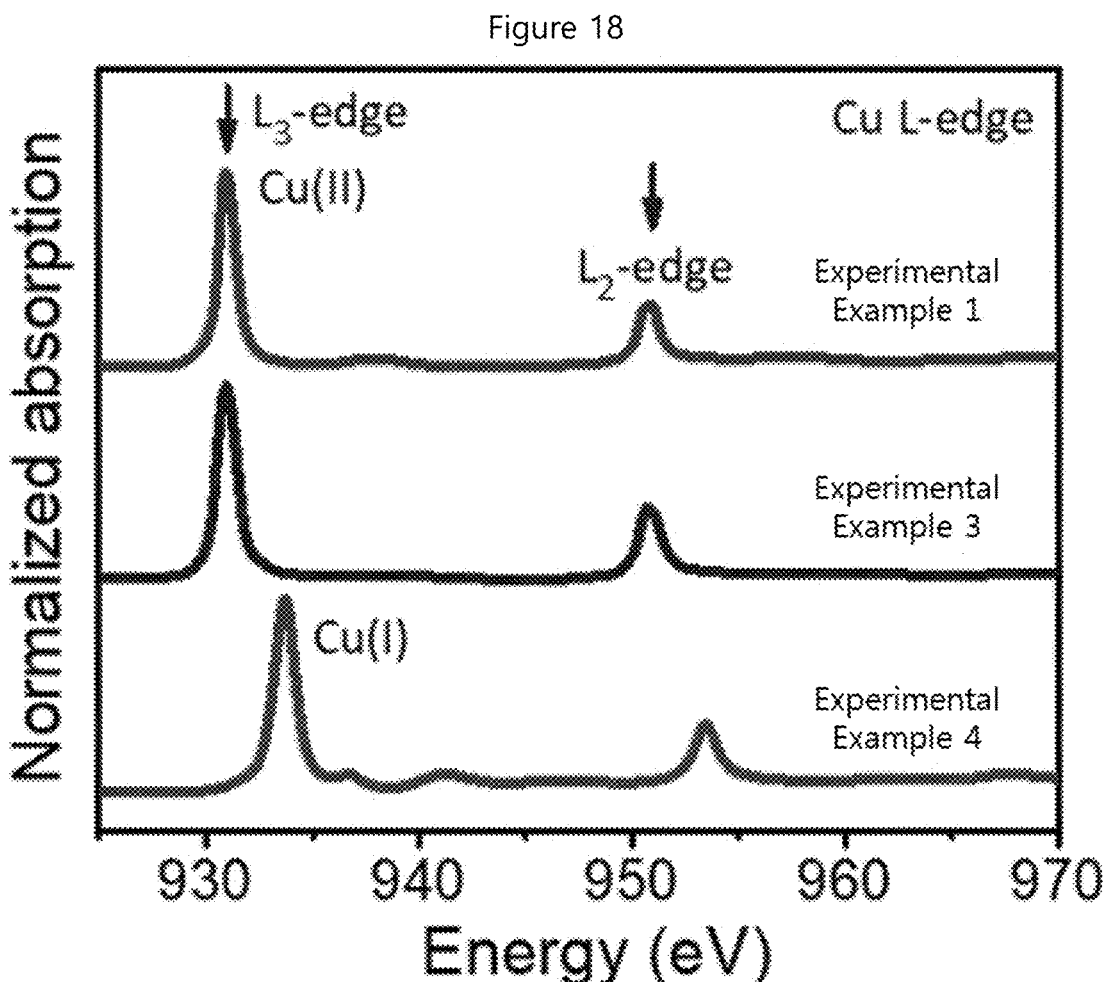
FIG. 18 is a Cu L-edge XANES spectral graph of electrode structures according to Experimental Examples 1, 3 and 4.
Figure 19:
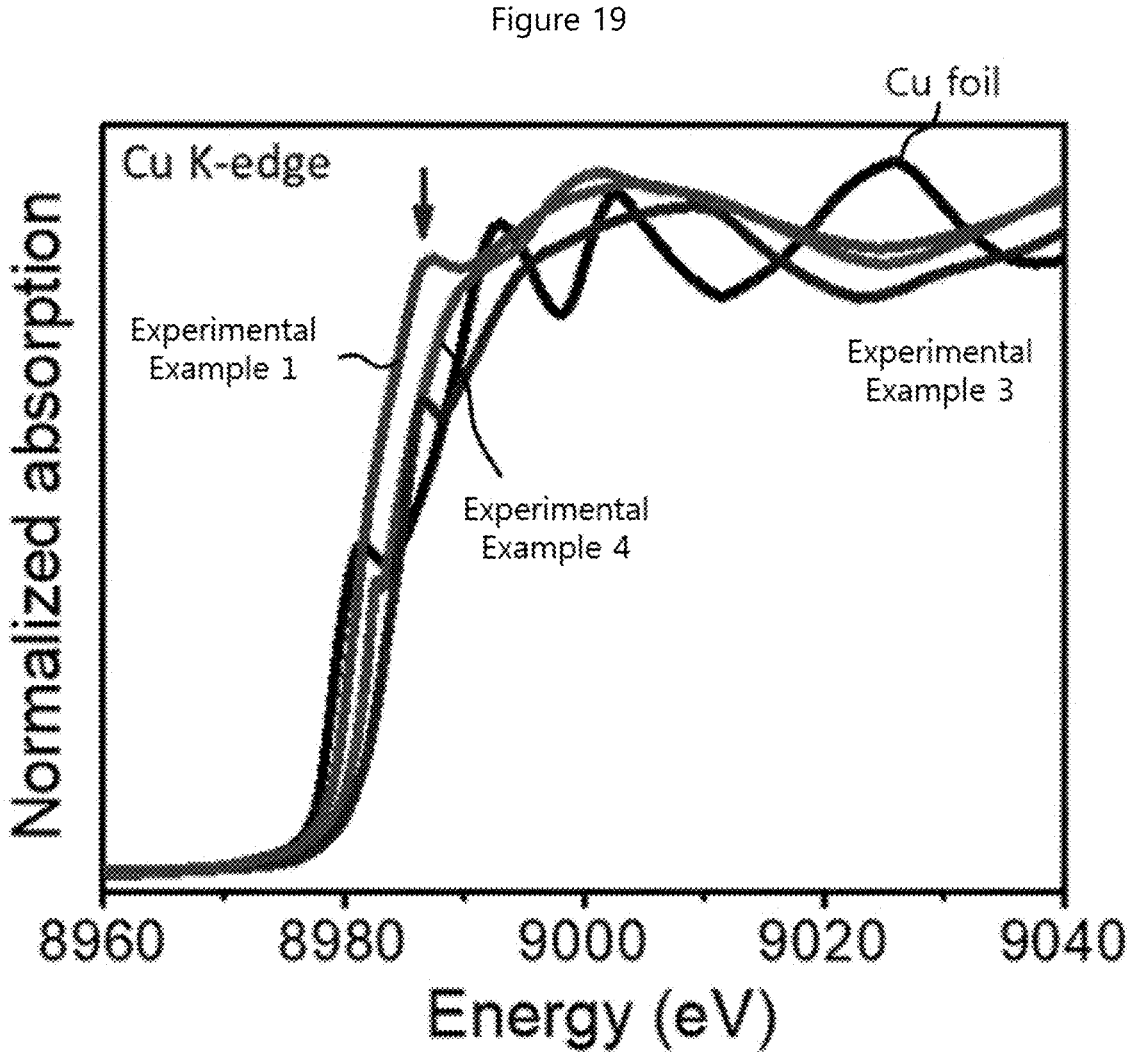
FIG. 19 is a Cu K-edge XANES spectral graph of electrode structures according to Experimental Examples 1, 3 and 4 of the present application and copper foil.

FIG. 16 is a view showing an EXAFS $k^2\chi(k)$ R space Fourier transform of electrode structures according to Experimental Example 1, 3 and 4, and copper foil, FIG. 17 is a Cu 2p XPS spectral graph showing electrode structures according to Experimental Examples 1, 3 and 4, FIG. 18 is a Cu L-edge XANES spectral graph of electrode structures according to Experimental Examples 1, 3 and 4, and FIG. 19 is a Cu K-edge XANES spectral graph of electrode structures according to Experimental Examples 1, 3 and 4 of the present application and copper foil.

Referring to FIG. 16, EXAFS $k^2\chi(k)$ R space Fourier transform of the electrode structures according to Experimental Examples 1, 3 and 4, the copper foil, and the electrode structure according to Experimental Example 1 in which 30,000 charge/discharge cycles were performed are shown. $CuP_{0.5}S_{0.5}$ was used as the electrode structure of Experimental Example 1.

As can be understood from FIG. 16, it can be seen that the electrode structure of Experimental Example 1 has a 1/2S—Cu-1/2P bond, has a covellite crystal structure, and is maintained to be substantially constant without any structural change even after 30,000 cycles. In addition, in the case of the electrode structure of Experimental Example 3, a Cu—S bond may be confirmed, and in the case of the electrode structure of Experimental Example 4, a Cu—P bond may be confirmed.

Referring to FIG. 17, a Cu 2p XPS measurement was performed for electrode structures according to Experimental Examples 1, 3 and 4, and an electrode structure according to Experimental Example 1 in which a charge and discharge cycle was performed 30,000 times. Referring to FIG. 18, a Cu L-edge XANES measurement was performed for electrode structures according to Experimental Examples 1, 3 and 4. Referring to FIG. 19, a Cu K-edge XANES measurement was performed for electrode structures according to Experimental Examples 1, 3 and 4 and copper foil.

As can be understood from FIGS. 17 and 18, a characteristic transition from 2p to $3d^9$ of Cu 2p3/2 and Cu $2p_{1/2}$ at 930.9 eV and 950.8 eV may be confirmed, which corresponds to about 8,986 eV in FIG. 19. As a result, it can be seen that the C(II) oxidation number is dominant.

In addition, in FIGS. 17 and 18, a shift of peaks of the CP electrode structure of Experimental Example 4 to the right about 2.8 eV shows a transition to the $3d^{10}$ state of Cu(I). In addition, a deformed lattice like the electrode structure of Experimental Example 1 may hybridize Cu 3d and S 2p, so that electrons are more easily transferred from Cu 3d to S 2p.

Figure 20:
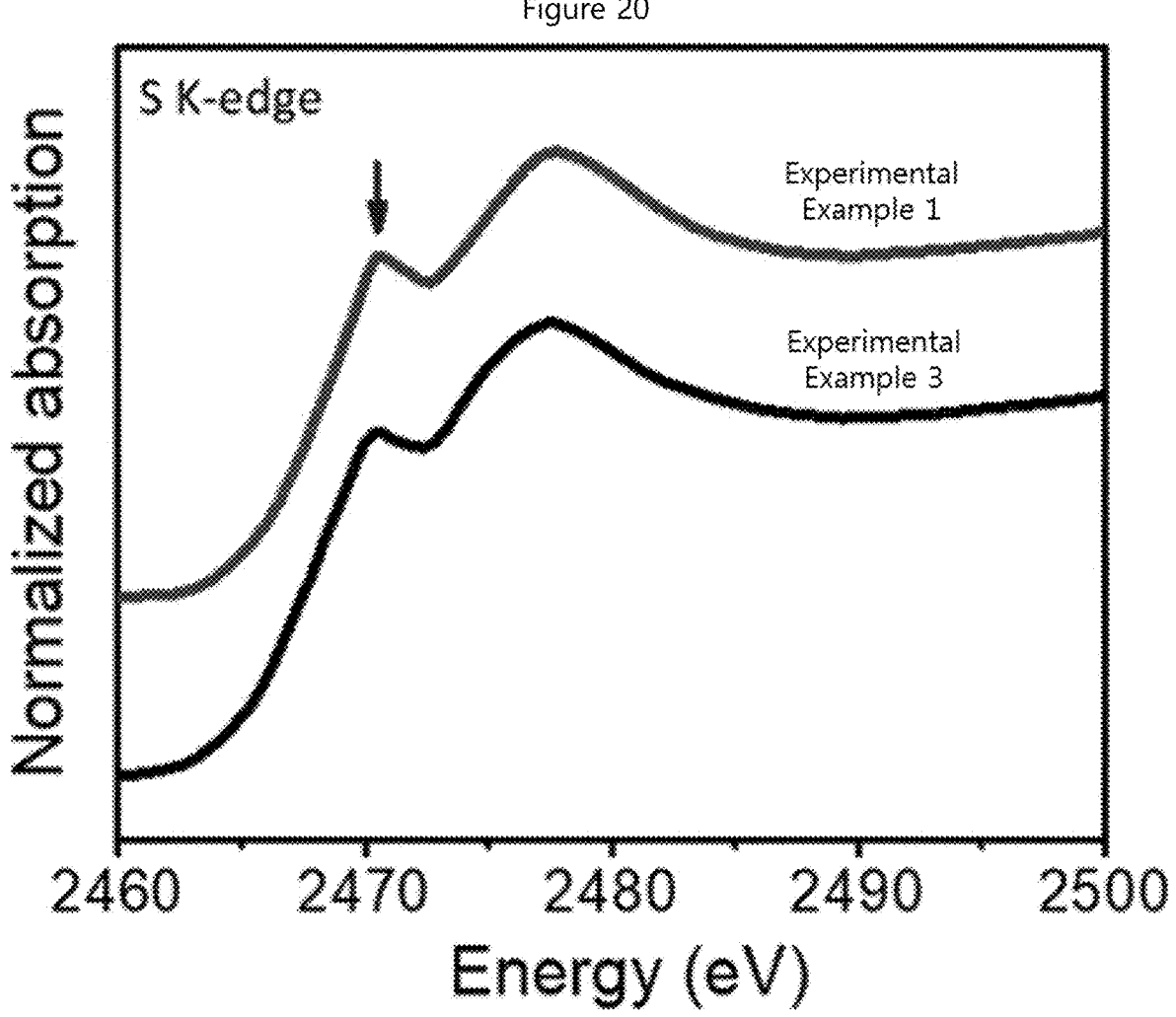
FIG. 20 is an S K-edge XANES spectral graph of electrode structures according to Experimental Examples 1 and 3 of the present application.
Figure 21:
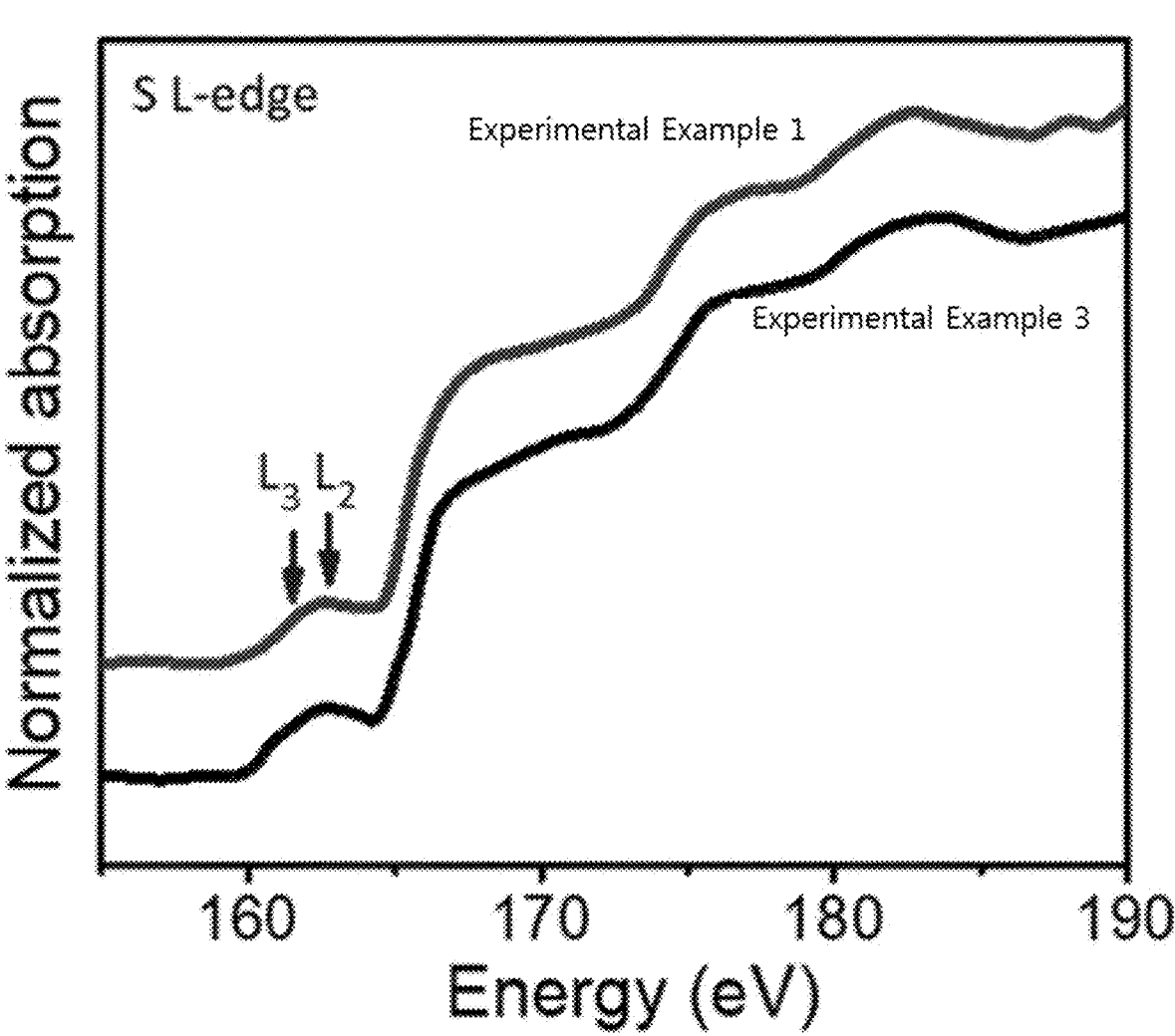
FIG. 21 is an S L-edge XANES spectral graph of electrode structures according to Experimental Examples 1 and 3 of the present application.
Figure 22:
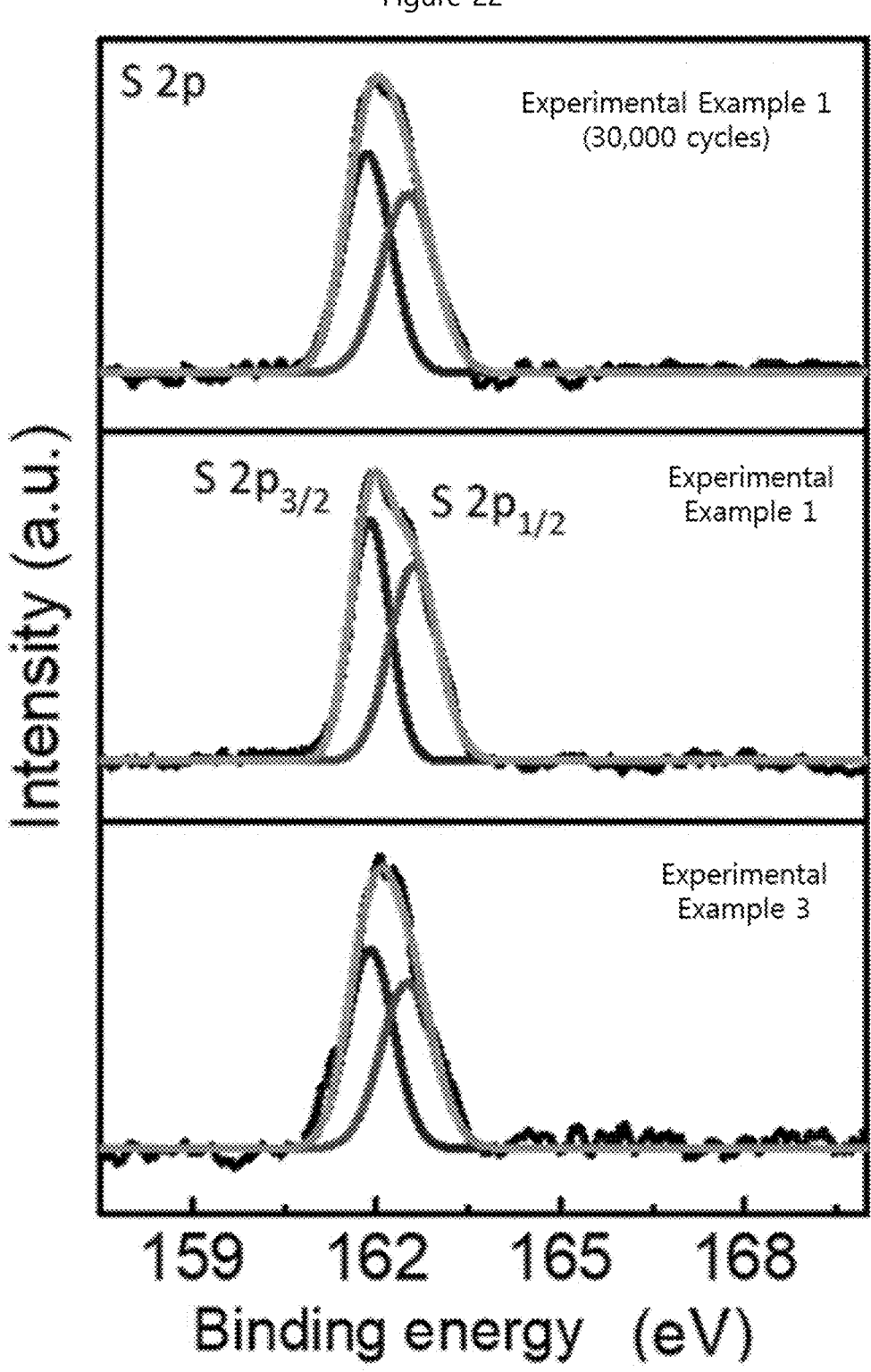
FIG. 22 is an S 2p XPS spectral graph of electrode structures according to Experimental Examples 1 and 3 of the present application.

FIG. 20 is an S K-edge XANES spectral graph of electrode structures according to Experimental Examples 1 and 3 of the present application, FIG. 21 is an S L-edge XANES spectral graph of electrode structures according to Experimental Examples 1 and 3 of the present application, and FIG. 22 is an S 2p XPS spectral graph of electrode structures according to Experimental Examples 1 and 3 of the present application.

Referring to FIGS. 20 to 22, S K-edge XANES spectra and S L-edge XANES spectra of the electrode structures according to Experimental Examples 1 and 3 were measured, and S 2p XPS spectra of the electrode structure according to Experimental Example 1, in which 30,000 cycles were performed, were measured. $CuP_{0.5}S_{0.5}$ was used as the electrode structure of Experimental Example 1.

As shown in FIG. 20, in the case of the electrode structure of Experimental Example 1, a pre-edge is confirmed at about 2471 eV and a broad-edge is confirmed at about 2477 eV, which means an $S^{2-}$ state.

As shown in FIG. 22, it can be confirmed that the electrode structure of Experimental Example 1 maintains substantially the same structure even after 30,000 charge/discharge cycles are performed, and it can be seen that the electrons of S 2p3/2 and S 2p1/3 are subjected into a spin-orbit transition to an anti-bonding state without an electron corresponding to S $L_{3,2}$-edge.

Figure 23:
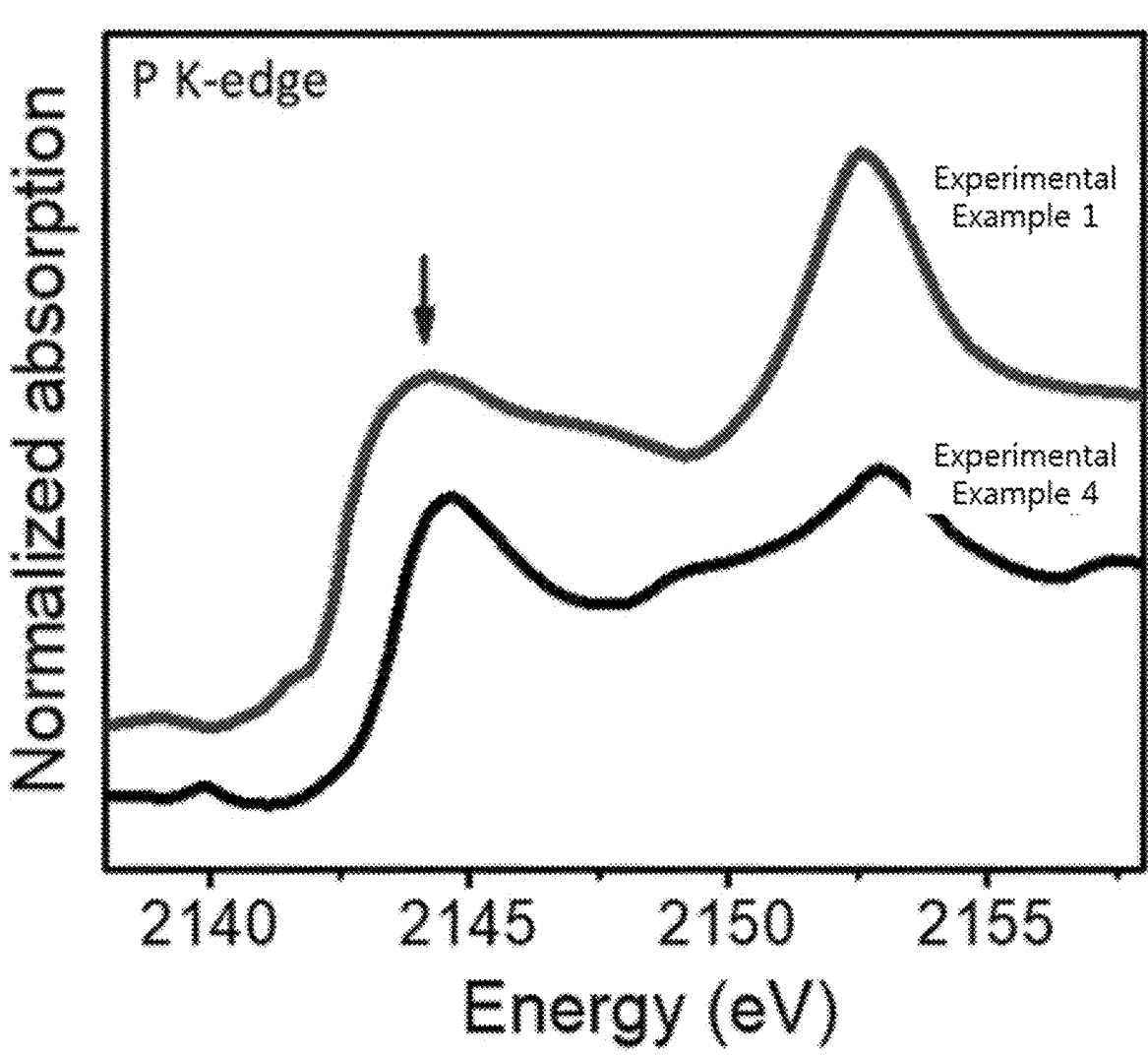
FIG. 23 is a P K-edge XANES spectral graph of an electrode structure according to Experimental Examples 1 and 4 of the present application.
Figure 24:
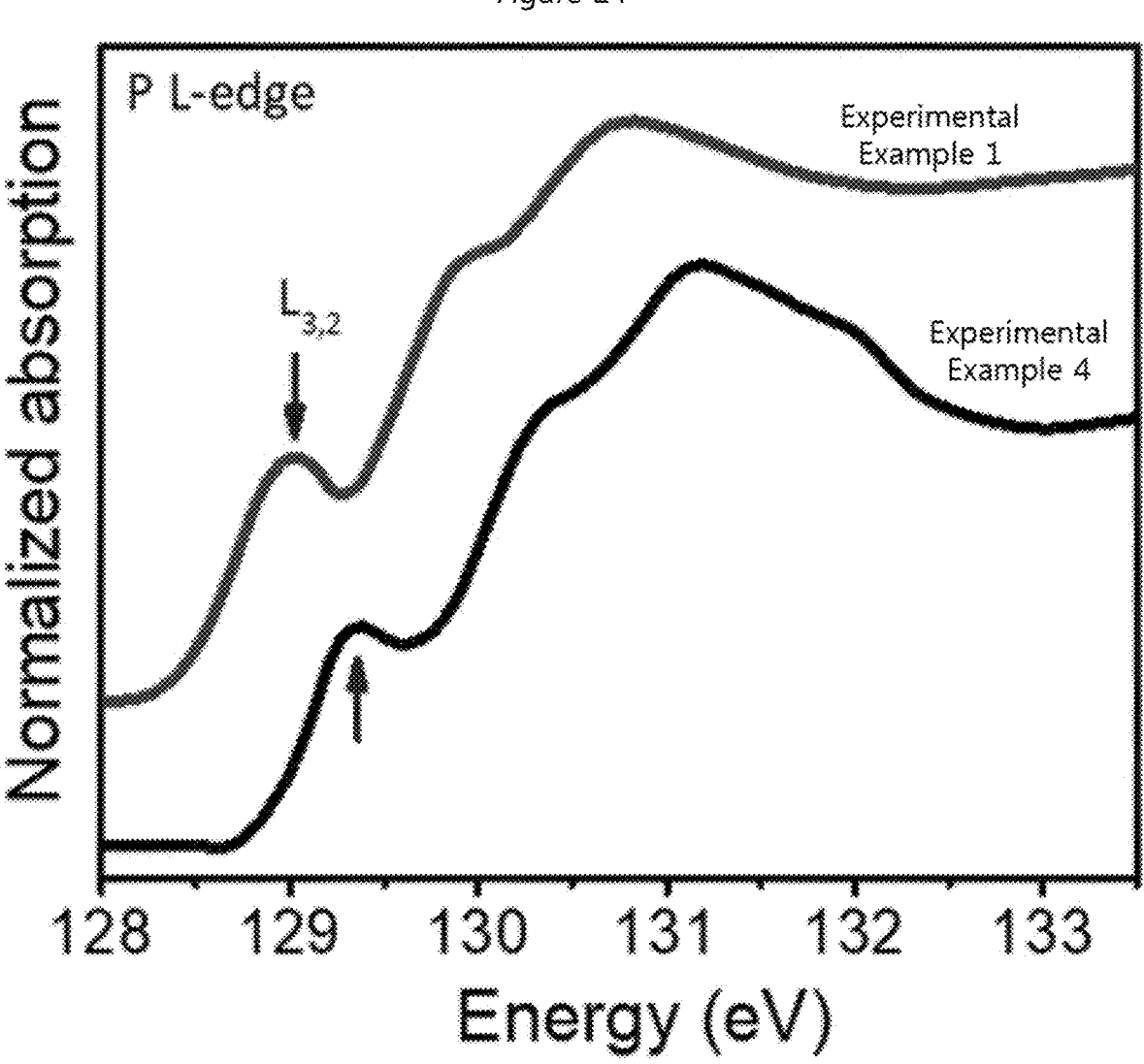
FIG. 24 is a P L-edge XANES spectral graph of electrode structures according to Experimental Examples 1 and 4 of the present application.
Figure 25:
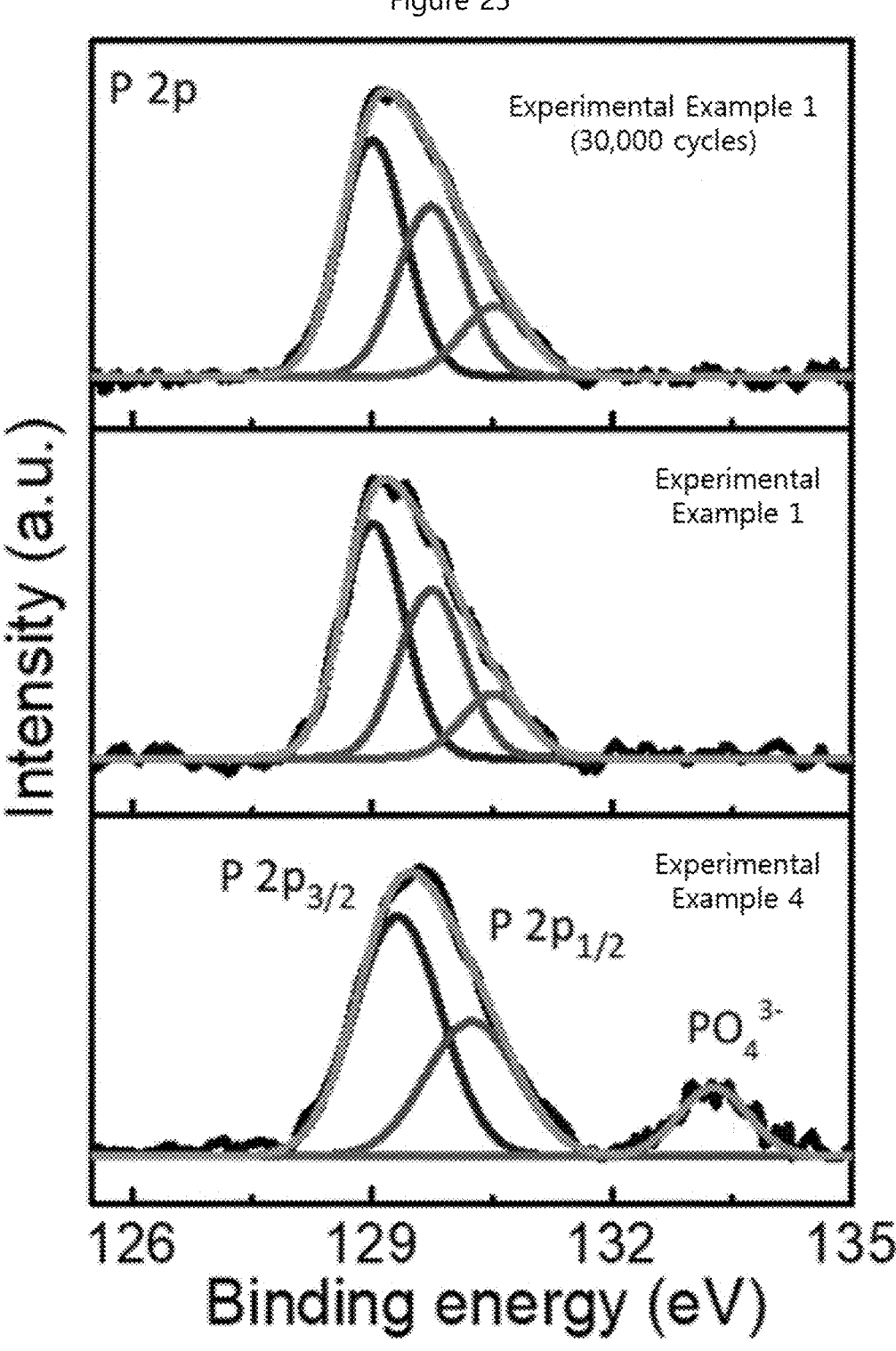
FIG. 25 is a P 2p XPS spectral graph of electrode structures according to Experimental Examples 1 and 3 of the present application.

FIG. 23 is a P K-edge XANES spectral graph of an electrode structure according to Experimental Examples 1 and 4 of the present application, FIG. 24 is a P L-edge XANES spectral graph of electrode structures according to Experimental Examples 1 and 4 of the present application, and FIG. 25 is a P 2p XPS spectral graph of electrode structures according to Experimental Examples 1 and 3 of the present application.

Referring to FIGS. 23 to 25, P K-edge XANES spectra and P L-edge XANES spectra of the electrode structures according to Experimental Examples 1 and 4 were measured, and P 2p XPS spectra of the electrode structure according to Experimental Example 1, in which 30,000 cycles were performed, were measured.

As shown in FIGS. 23 to 25, it can be seen that X-rays are absorbed at 2144.2 eV and 2152.6 eV, a spin-orbit split of P $2p_{3/2}$. and P P 2p1/2 at about 129 eV and about 129.8 eV occurs with a critical electron transition from the P 2p state to a d orbital without electrons filled.

Figure 26:
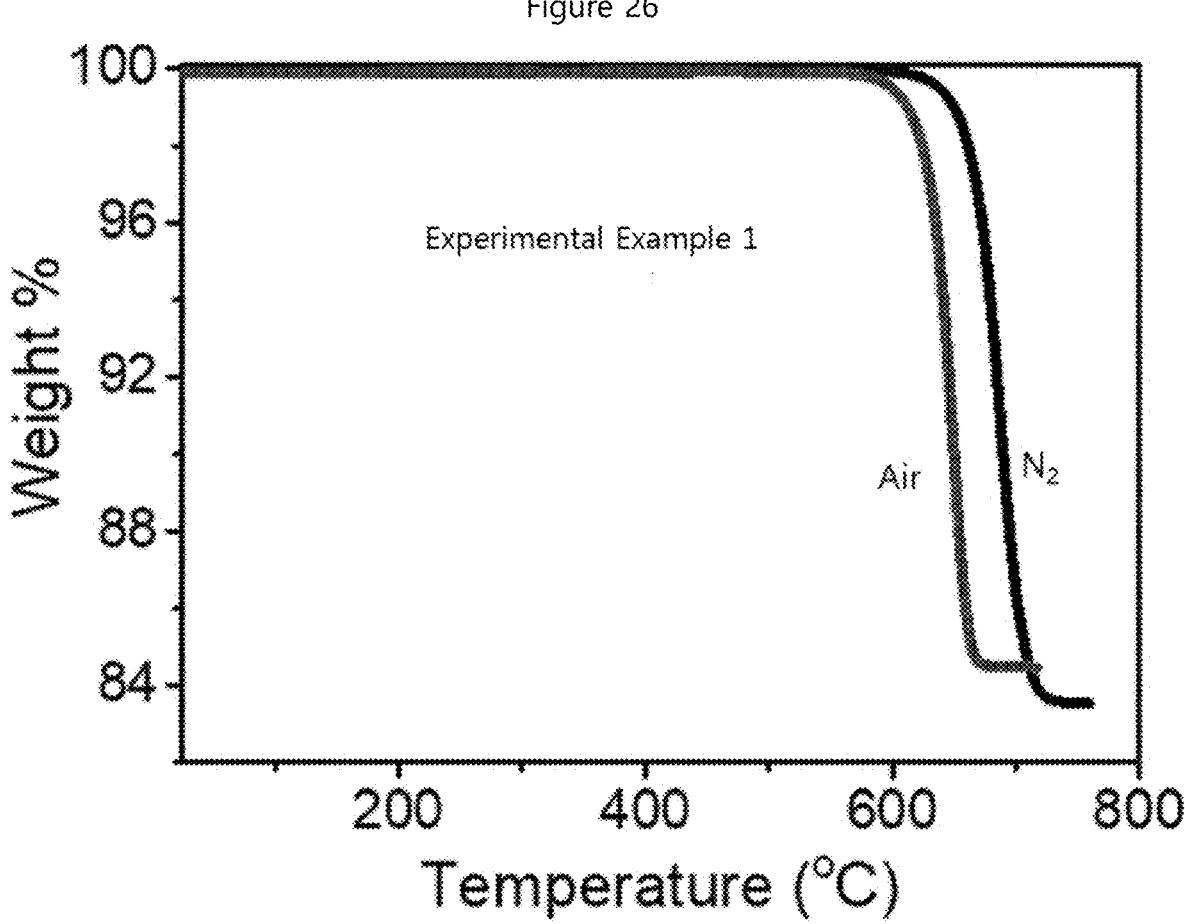
FIG. 26 is a view showing the results of TGA measurement of an electrode structure according to Experimental Example 1 of the present application.

FIG. 26 is a view showing the results of TGA measurement of an electrode structure according to Experimental Example 1 of the present application.

Referring to FIG. 26, a TGA analysis was performed on the CuPS electrode structure ($CuP_{0.5}S_{0.5}$) according to Experimental Example 1 while raising a temperature to 5° C. in a nitrogen and atmospheric gas atmosphere.

As can be understood from FIG. 26, it can be seen that the electrode structure according to Experimental Example 1 maintains a stable state. In the nitrogen atmosphere, a weight was lost at 605° C. to 732° C., and in the atmospheric gas atmosphere, a weight was lost at 565° C. to 675° C. Compared with the atmospheric gas atmosphere, it can be seen that a state is a little more stable in the nitrogen gas atmosphere, which is due to the formation of CuO in the electrode structure according to Experimental Example 1.

In conclusion, it can be confirmed that the electrode structure according to Experimental Example 1 has high thermal stability of the orthorhombic crystal structure.

Figure 27:
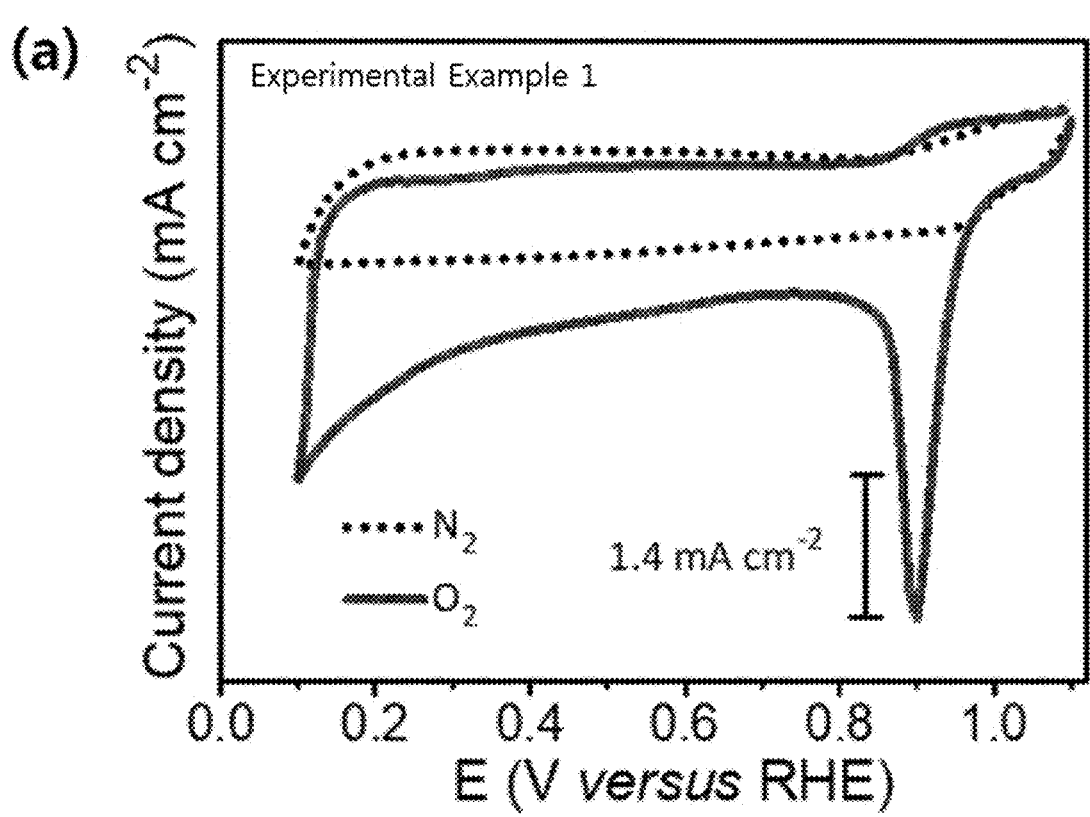
FIG. 27 is a cyclic voltammogram (CV) graph for explaining ORR properties of electrode structures according to Experimental Examples 1 and 2 of the present application.
Figure 27:
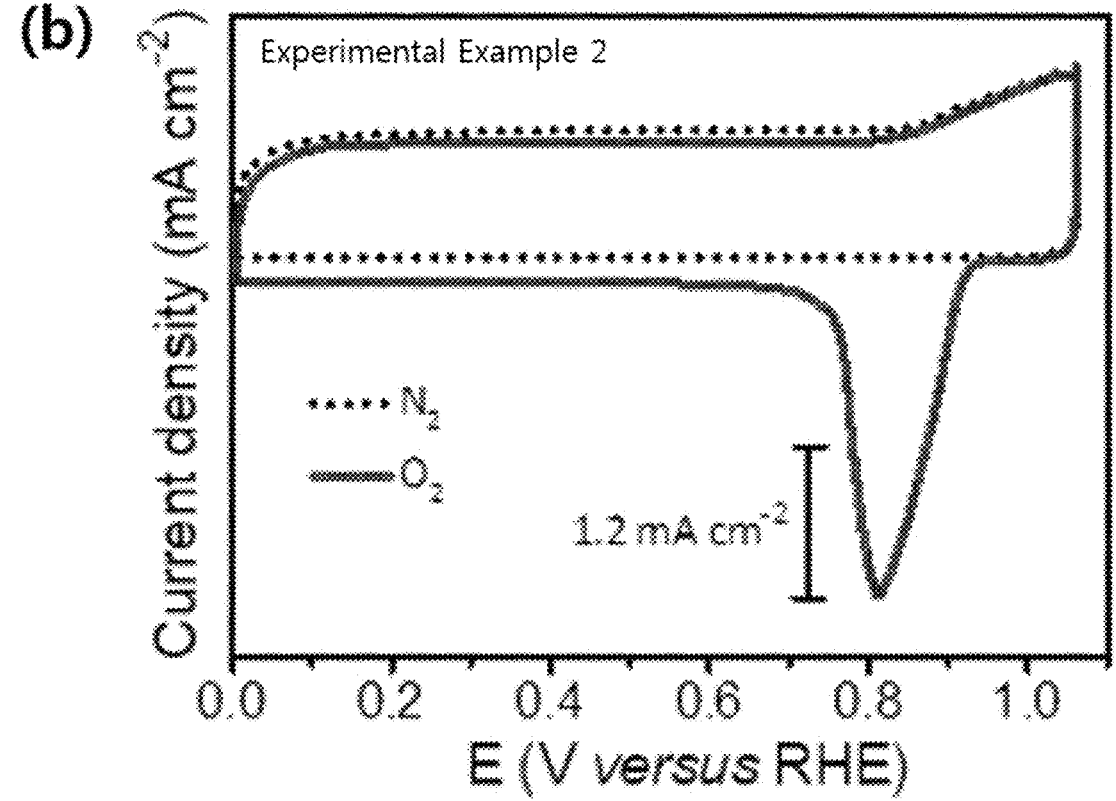
Figure 28:
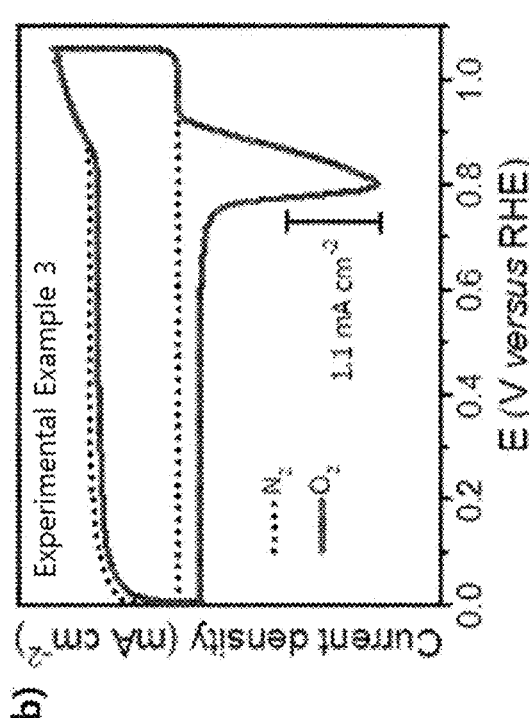
FIG. 28 is a CV graph for explaining ORR properties of electrode structures according to Experimental Examples 3 and 4 of the present application and Pt/C electrode.
Figure 28:
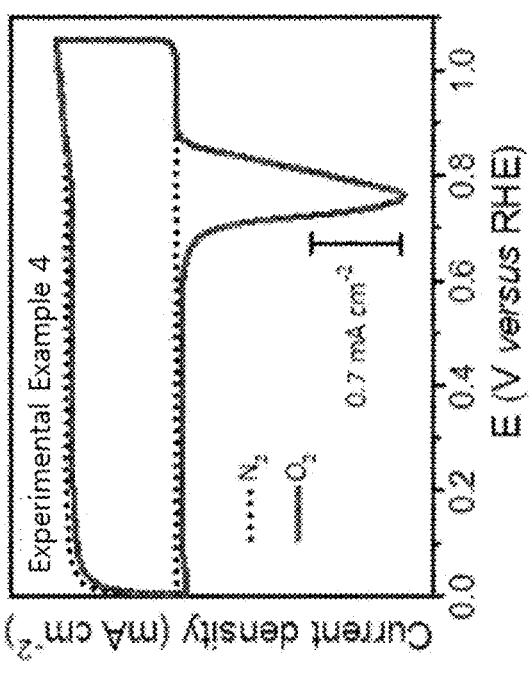
Figure 28:
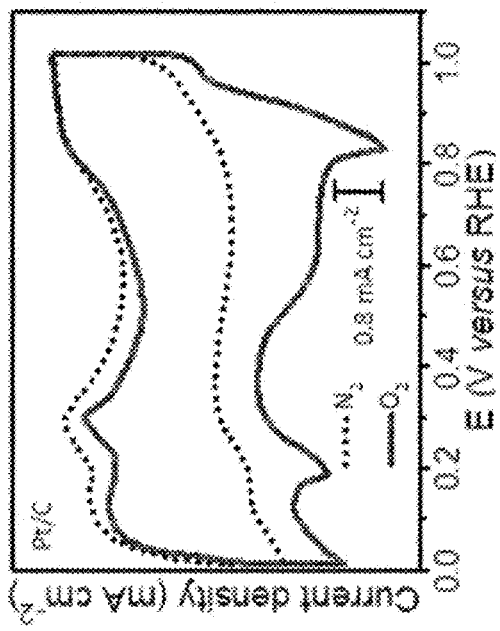
Figure 28:

FIG. 27 is a cyclic voltammogram (CV) graph for explaining ORR properties of electrode structures according to Experimental Examples 1 and 2 of the present application, and FIG. 28 is a CV graph for explaining ORR properties of electrode structures according to Experimental Examples 3 and 4 of the present application and Pt/C electrode.

Referring to FIGS. 27 and 28, a circulating current voltage curve of the electrode structures according to Experimental Examples 1 to 4, and the commercially available Pt/C electrode (20 wt %) were measured by using 0.1M KOH as an electrolyte. $CuP_{0.5}S_{0.5}$ was used as the electrode structures of Experimental Examples 1 and 2. In FIGS. 27 and 28, a dotted line indicates a nitrogen saturation condition, and a solid line indicates an oxygen saturation condition.

As can be understood from FIGS. 27 and 28, an oxygen-reduction potential of the electrode structures according to Experimental Examples 1 to 4 may be confirmed, and it can be seen that the structures have excellent ORR properties, even compared with the commercialized Pt/C electrode.

Figure 29:
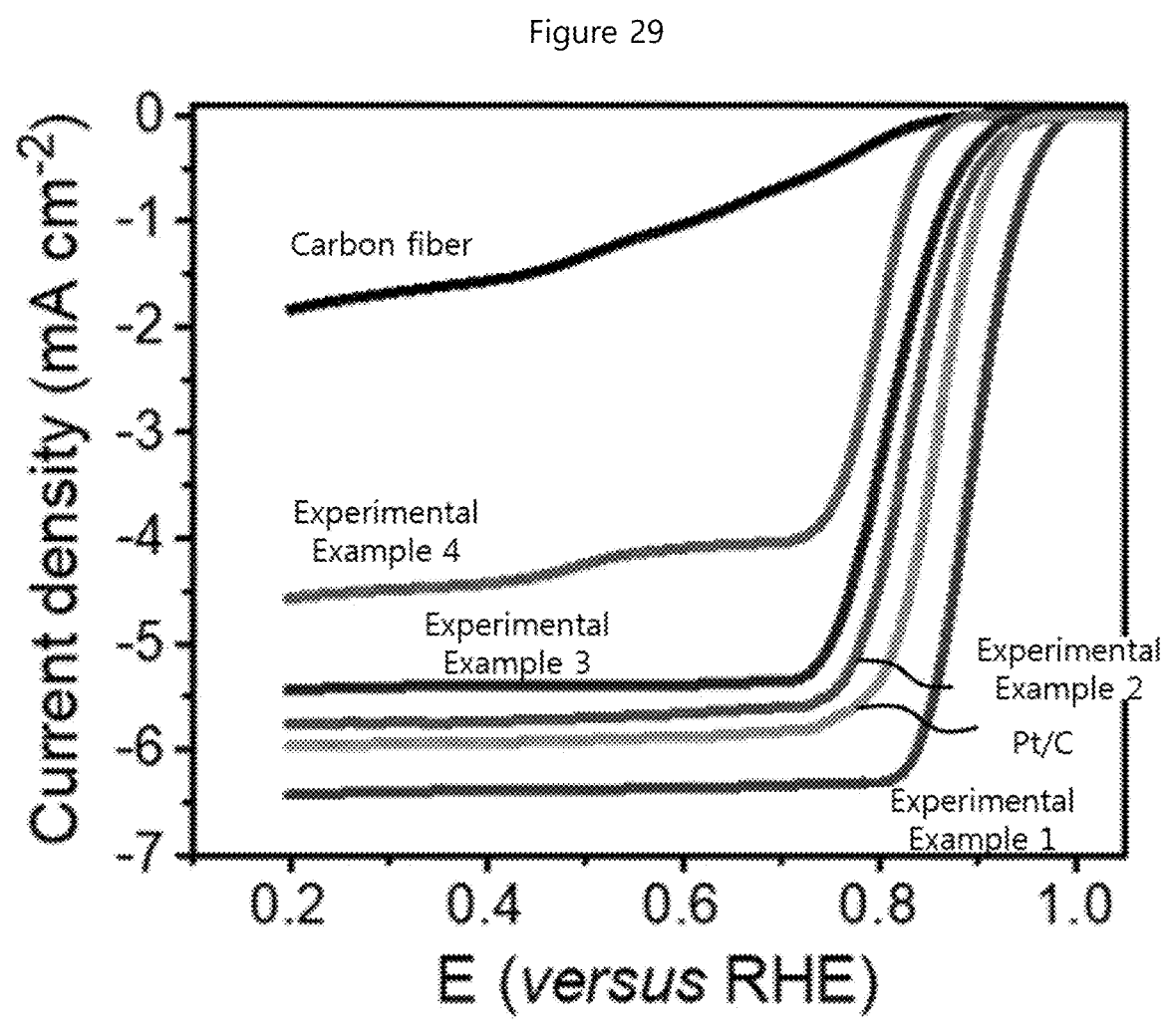
Figure 30:
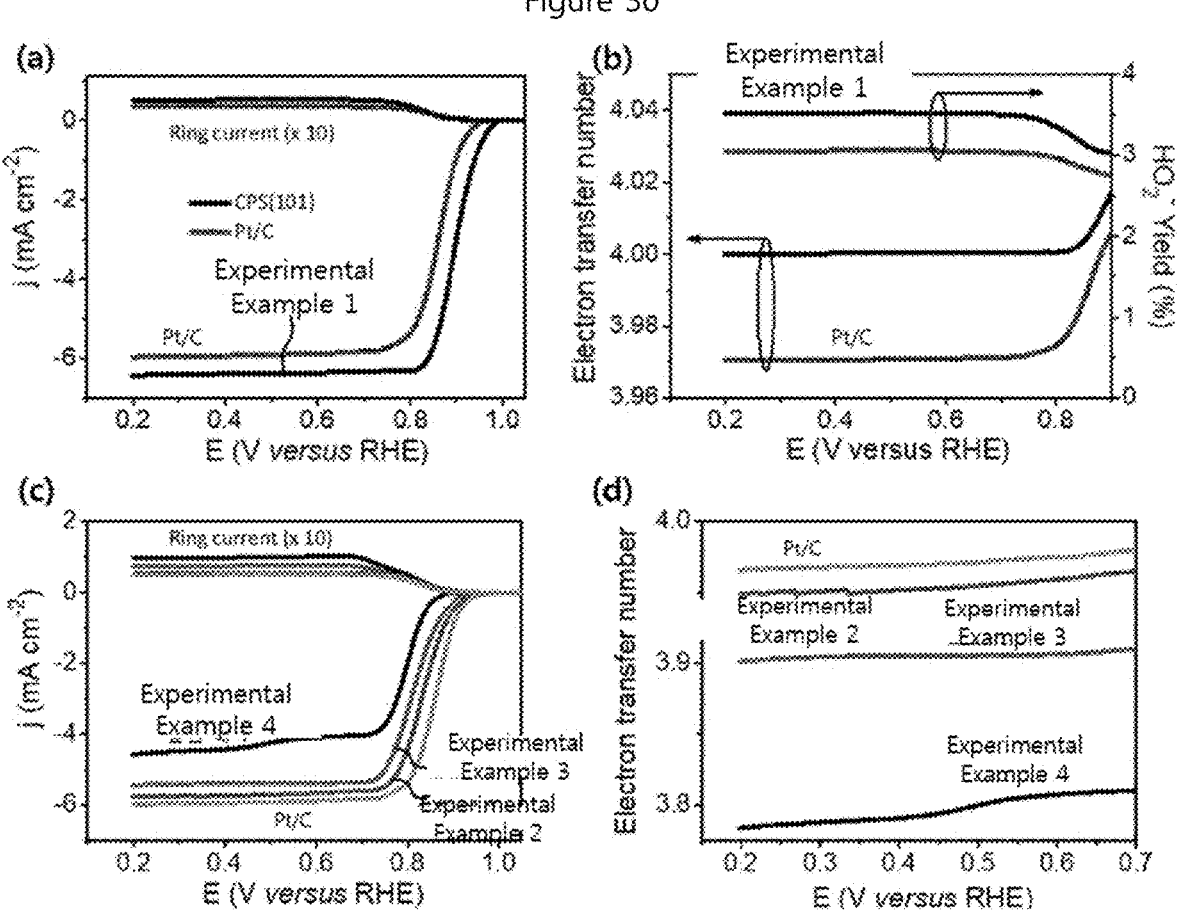
FIG. 30 is a graph showing a rotating ring disk electrode (RRDE) polarization plot and an electron transfer number of electrode structures according to Experimental Examples 1 to 4 of the present application and Pt/C electrode.

FIG. 29 is a linear sweep voltammetry (LSV) graph for explaining ORR properties of electrode structures according to Experimental Examples 1 to 4 of the present application, Pt/C electrode and carbon fiber, and FIG. 30 is a graph showing a rotating ring disk electrode (RRDE) polarization plot and an electron transfer number of electrode structures according to Experimental Examples 1 to 4 of the present application and Pt/C electrode.

Referring to FIGS. 29 to 30, the ORR properties were compared with regard to the electrode structures according to Experimental Examples 1 to 4, the commercially available Pt/C electrode, and the commercially available carbon fibers. $CuP_{0.5}S_{0.5}$ was used as the electrode structures of Experimental Examples 1 and 2. In addition, an RRDE polarization plot and an electron transfer coefficient are shown with regard to the electrode structures according to Experimental Examples 1 to 4 and the Pt/C electrode, and an $$OH_2-$$

yield of the electrode structure according to Experimental Example 1 was shown.

As can be understood from FIG. 29, it can be confirmed that the CuPS electrode structure having a reinforced crystal plane 101 according to Experimental Example 1 has the best ORR properties and the highest electron transport coefficient. In addition, it can be confirmed that the CuPS electrode structure of Experimental Example 2 and the CuS electrode structure of Experimental Example 3 are also slightly lower than commercial Pt/C, but have excellent ORR properties.

In conclusion, it can be confirmed that the electrode structures according to Experimental Examples 1 to 3 of the present application may be used to prepare the electrode structure having OPP properties similar to or more excellent than those of Pt/C at a lower price than Pt/C.

Figure 31:
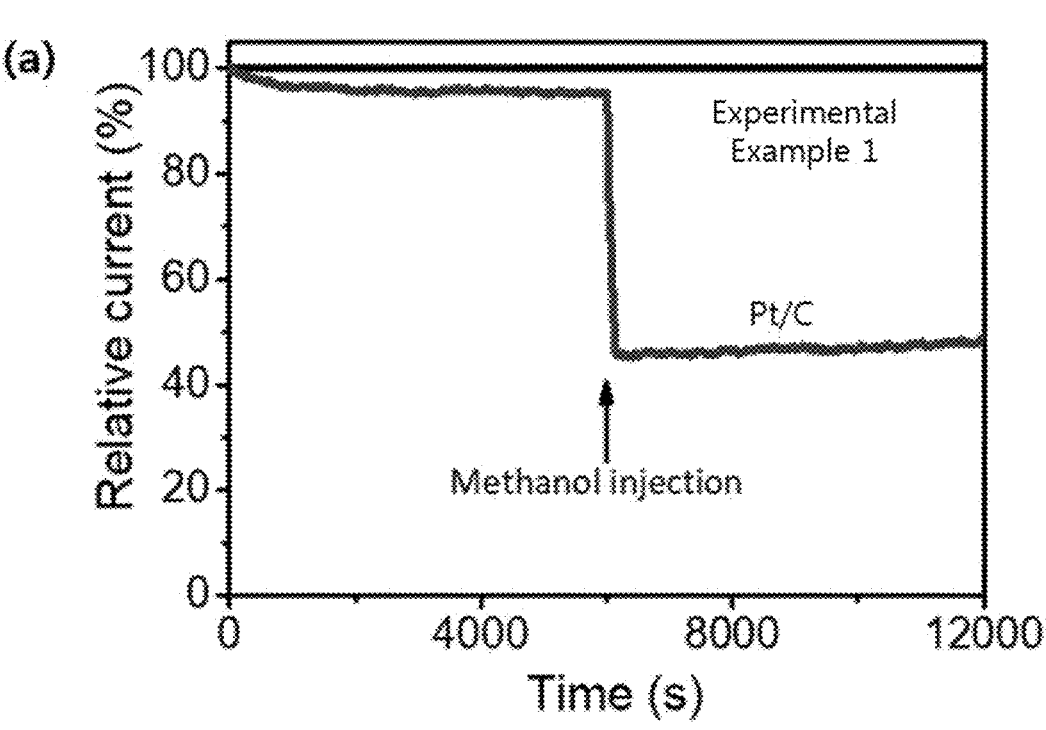
FIG. 31 is a graph showing a comparison of chemical durability of an electrode structure according to Experimental Example 1 of the present application and Pt/C electrode.
Figure 31:
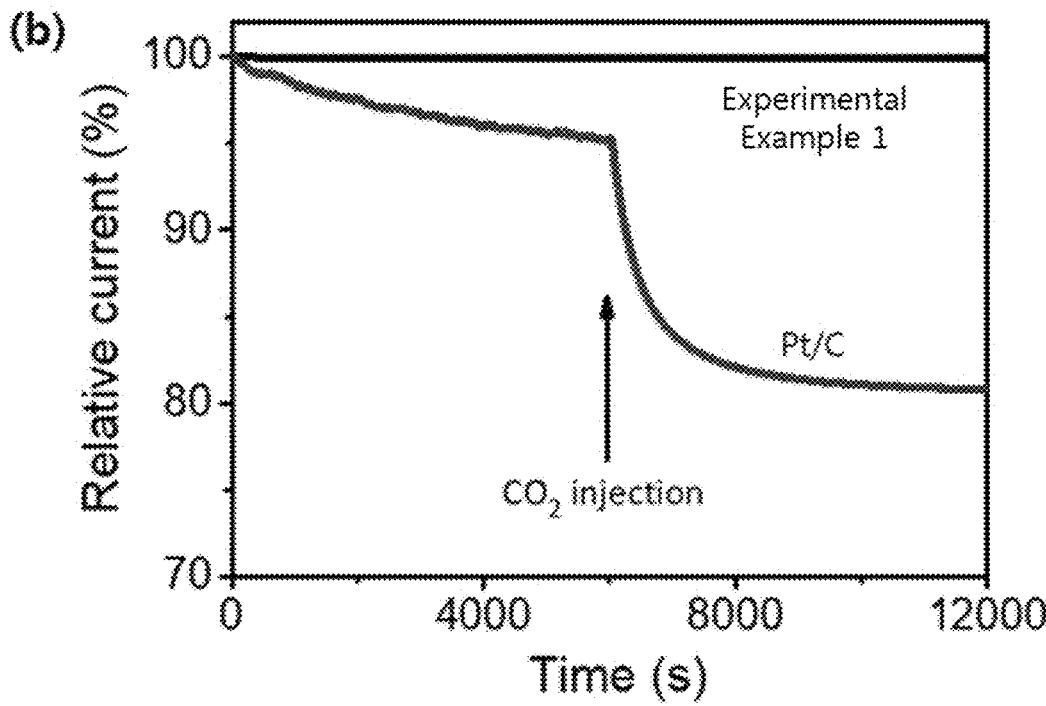

FIG. 31 is a graph showing a comparison of chemical durability of an electrode structure according to Experimental Example 1 of the present application and Pt/C electrode.

Referring to FIG. 31, chemical durability was measured by injecting methanol (2M) and $CO_2$ (10V %) into the electrode structure according to Experimental Example 1 and the commercially available Pt/C electrode at 1600 rpm by using 0.1M KOH. $CuP_{0.5}S_{0.5}$ was used as the electrode structure of Experimental Example 1.

As shown in FIG. 31, it can be confirmed that the electrode structure according to Experimental Example 1 is stably driven even after methanol and $CO_2$ are injected. Meanwhile, in the case of the Pt/C electrode, it can be confirmed that a current value is significantly lowered when methanol or CO2 is injected.

In conclusion, it can be seen that the CuPS electrode structure according to Experimental Example 1 of the present application has a high ORR property as well as excellent chemical resistance compared with the commercialized Pt/C electrode. Accordingly, it can be seen that the CuPS electrode structure according to Experimental Example 1 of the present application can be stably utilized in an alkaline environment.

Figure 32:
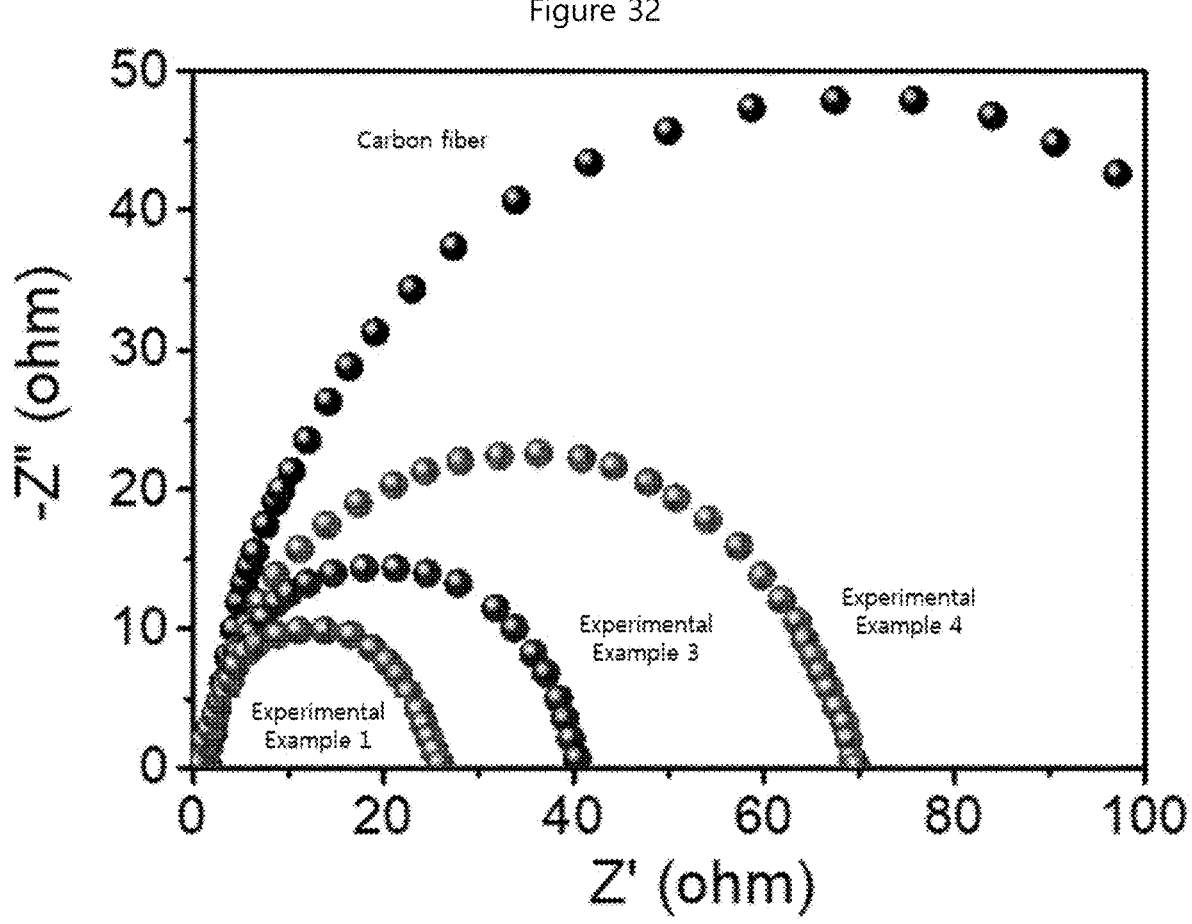
FIG. 32 is an electrochemical impedance spectroscopy (EIS) graph for explaining ORR properties of electrode structures according to Experimental Examples 1, 3 and 4 of the present application, Pt/C electrode and carbon fiber.

FIG. 32 is an electrochemical impedance spectroscopy (EIS) graph for explaining ORR properties of electrode structures according to Experimental Examples 1, 3 and 4 of the present application, Pt/C electrode and carbon fiber.

Referring to FIG. 32, an EIS measurement was performed for the electrode structures according to Experimental Examples 1, 3 and 4 and carbon fibers by using 0.1M KOH. $CuP_{0.5} S_{0.5}$ was used as the electrode structure of Experimental Example 1.

As can be understood from FIG. 32, it can be confirmed that the CuPS electrode structure of Experimental Example 1 has the lowest impedance value and ORR properties are higher in the order of the CuPS electrode structure of Experimental Example 1, the CuS electrode structure of Experimental Example 3, the CP electrode structure of Experimental Example 4, and the carbon fiber.

Figure 33:
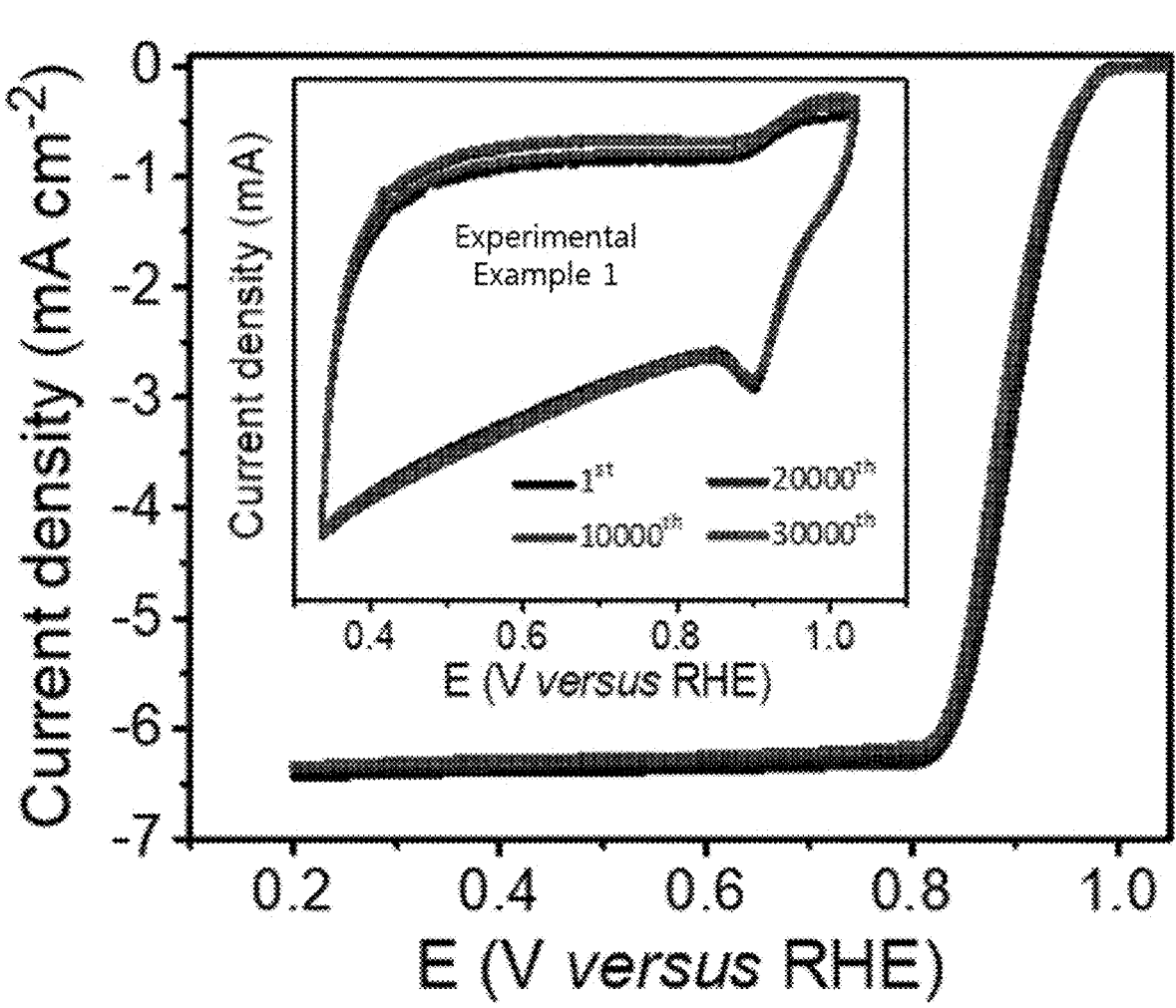
FIG. 33 is a graph of LSV and CV according to the number of cycles for explaining the ORR properties of an electrode structure according to Experimental Example 1 of the present application.
Figure 34:
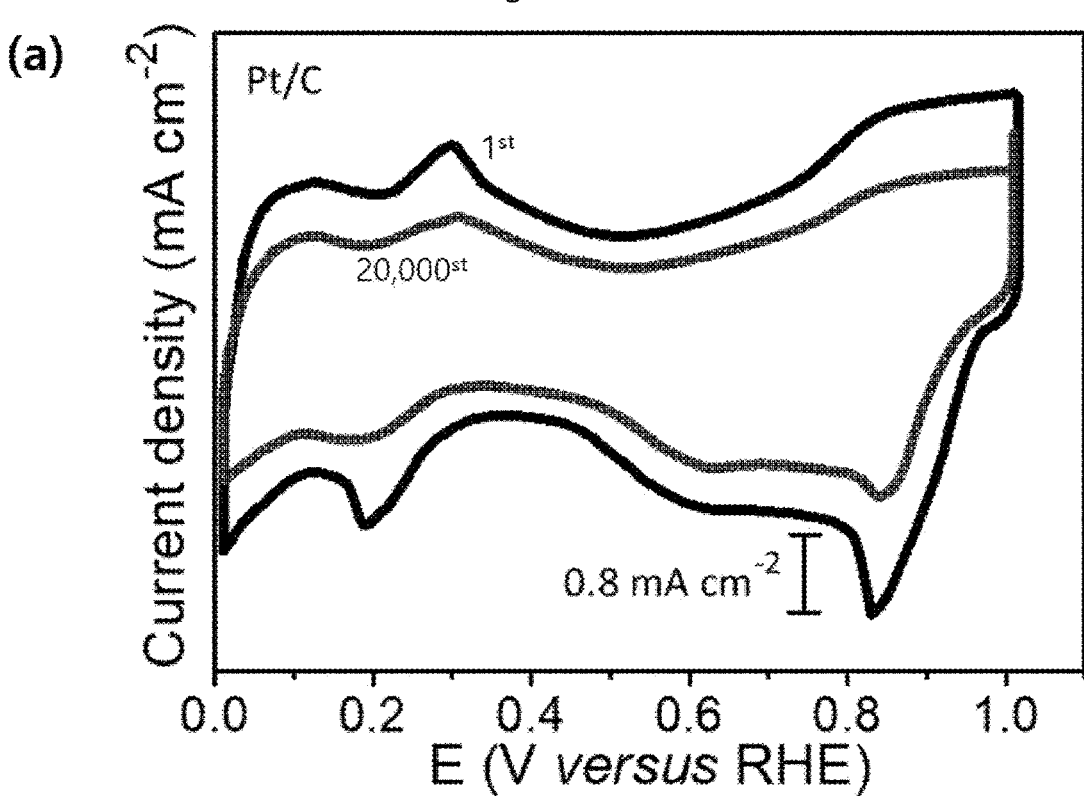
FIG. 34 is a graph of CV and LSV according to the number of cycles of the Pt/C electrode.
Figure 34:
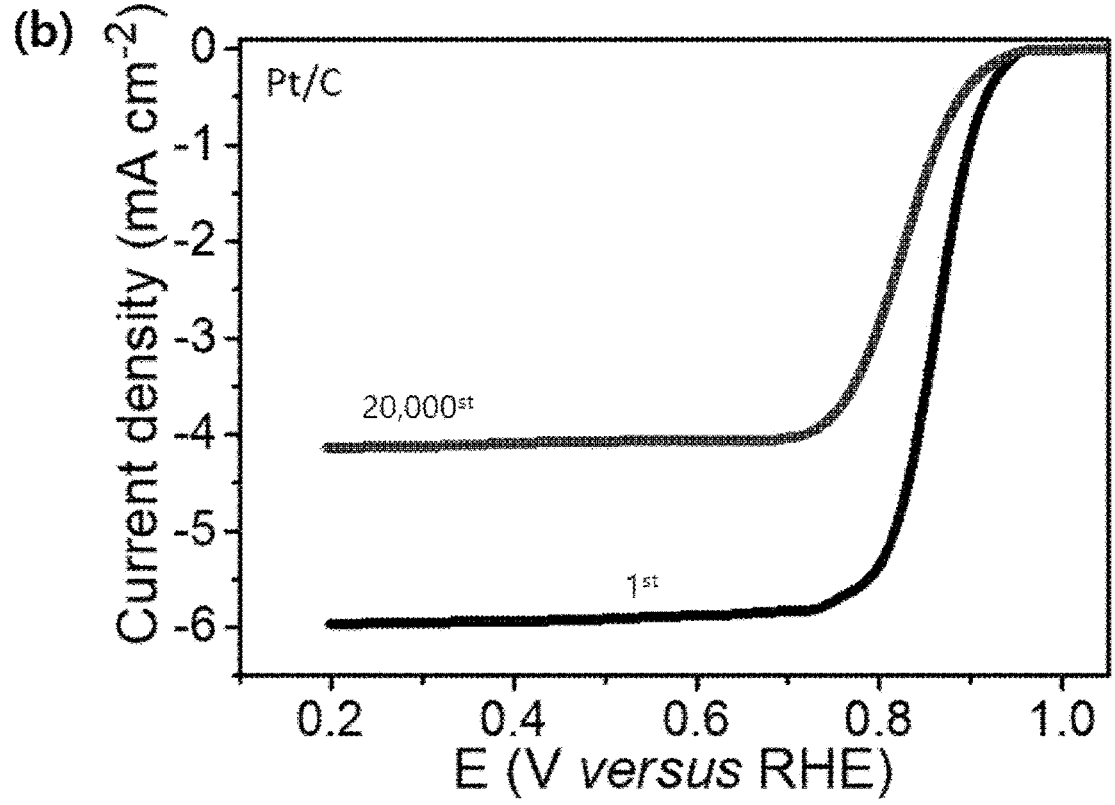
Figure 35:
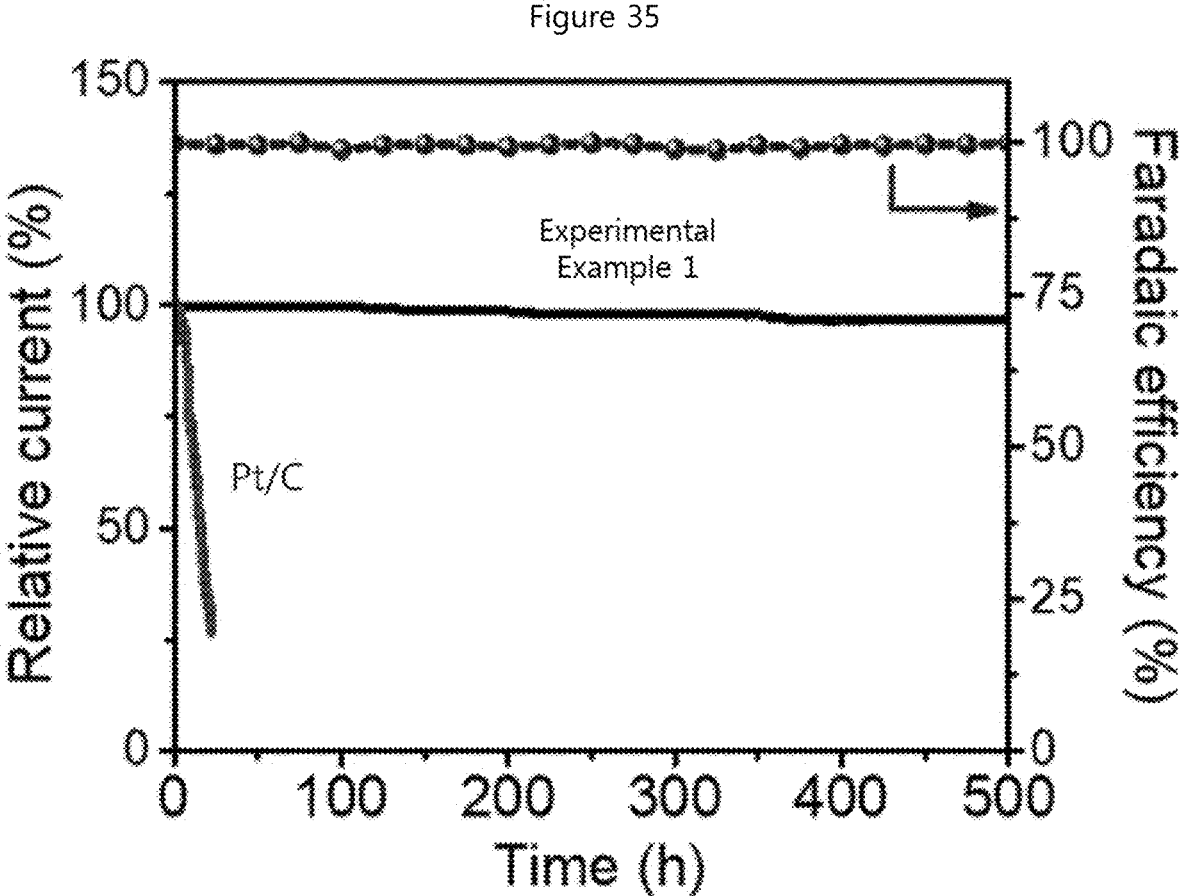
FIG. 35 is a graph showing a chronoamperometric measurement and Faradaic efficiency measurement for explaining the ORR properties of an electrode structure according to Experimental Example 1 of the present application and the Pt/C electrode.

FIG. 33 is a graph of LSV and CV according to the number of cycles for explaining the ORR properties of an electrode structure according to Experimental Example 1 of the present application, FIG. 34 is a graph of CV and LSV according to the number of cycles of the Pt/C electrode, and FIG. 35 is a graph showing a chronoamperometric measurement and Faradaic efficiency measurement for explaining the ORR properties of an electrode structure according to Experimental Example 1 of the present application and the Pt/C electrode.

Referring to FIGS. 33 to 35, LSV and CV measurements were performed according to the number of cycles for the CuPS electrode structure according to Experimental Example 1 and the commercially available Pt/C electrode by using 0.1M KOH and under oxygen conditions. In addition, the CuPS electrode structure according to Experimental Example 1 and the Pt/C electrode were measured by a chronoamperometric method under 0.9V conditions, and the Faraday efficiency was measured for the CuPS electrode according to Experimental Example 1. $CuP_{0.5}S_{0.5}$ was used as the electrode structure of Experimental Example 1.

As can be understood from FIGS. 33 to 35, it can be confirmed that the electrode structure according to Experimental Example 1 is stably driven without a substantial change even after 30,000 charge/discharge cycles are performed. In addition, it can be confirmed that the structure is stably driven without a substantial change for about 500 hours and has a Faraday efficiency of about 98% or more.

In contrast, in the case of the Pt/C electrode, it can be confirmed that a current density value is remarkably reduced and properties are remarkably deteriorated compared with the electrode structure of Experimental Example 1 as cycles are performed.

In conclusion, it can be seen that the CuPS electrode structure according to Experimental Example 1 has a high ORR property and excellent chemical resistance compared with the commercialized Pt/C electrode.

Figure 36:
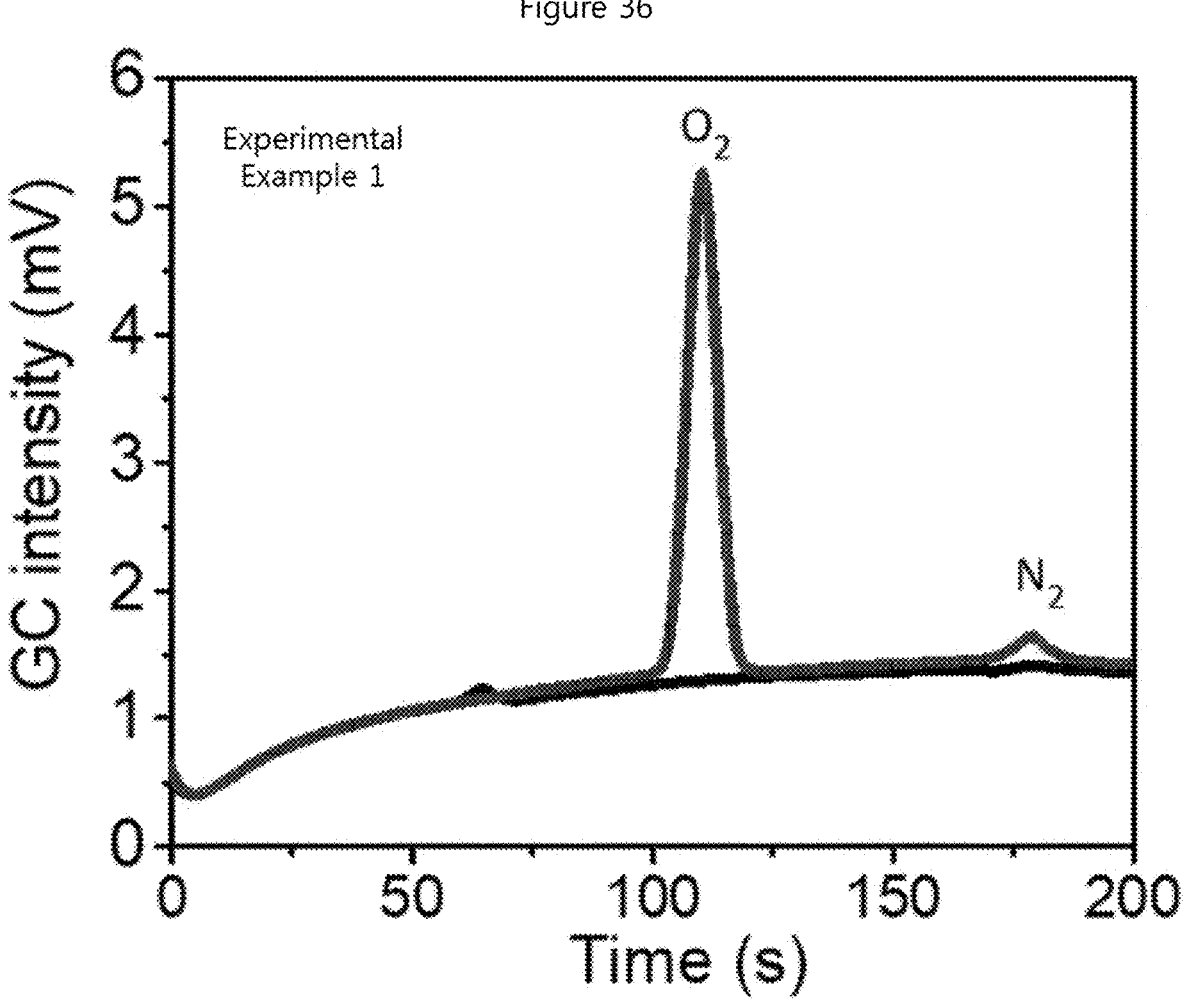
FIG. 36 is a view showing the results of gas chromatography measurement for explaining OER properties of an electrode structure according to Experimental Example 1 of the present application.

FIG. 36 is a view showing the results of gas chromatography measurement for explaining OER properties of an electrode structure according to Experimental Example 1 of the present application.

Referring to FIG. 36, gas chromatography was measured for the CuPS electrode structure according to Experimental Example 1 under oxygen conditions by using 0.1M KOH. $CuP_{0.5}S_{0.5}$ was used as the electrode structure of Experimental Example 1.

As can be understood from FIG. 36, it can be confirmed that oxygen gas is generated from a surface of the CuPS electrode structure according to Experimental Example 1.

Figure 37:
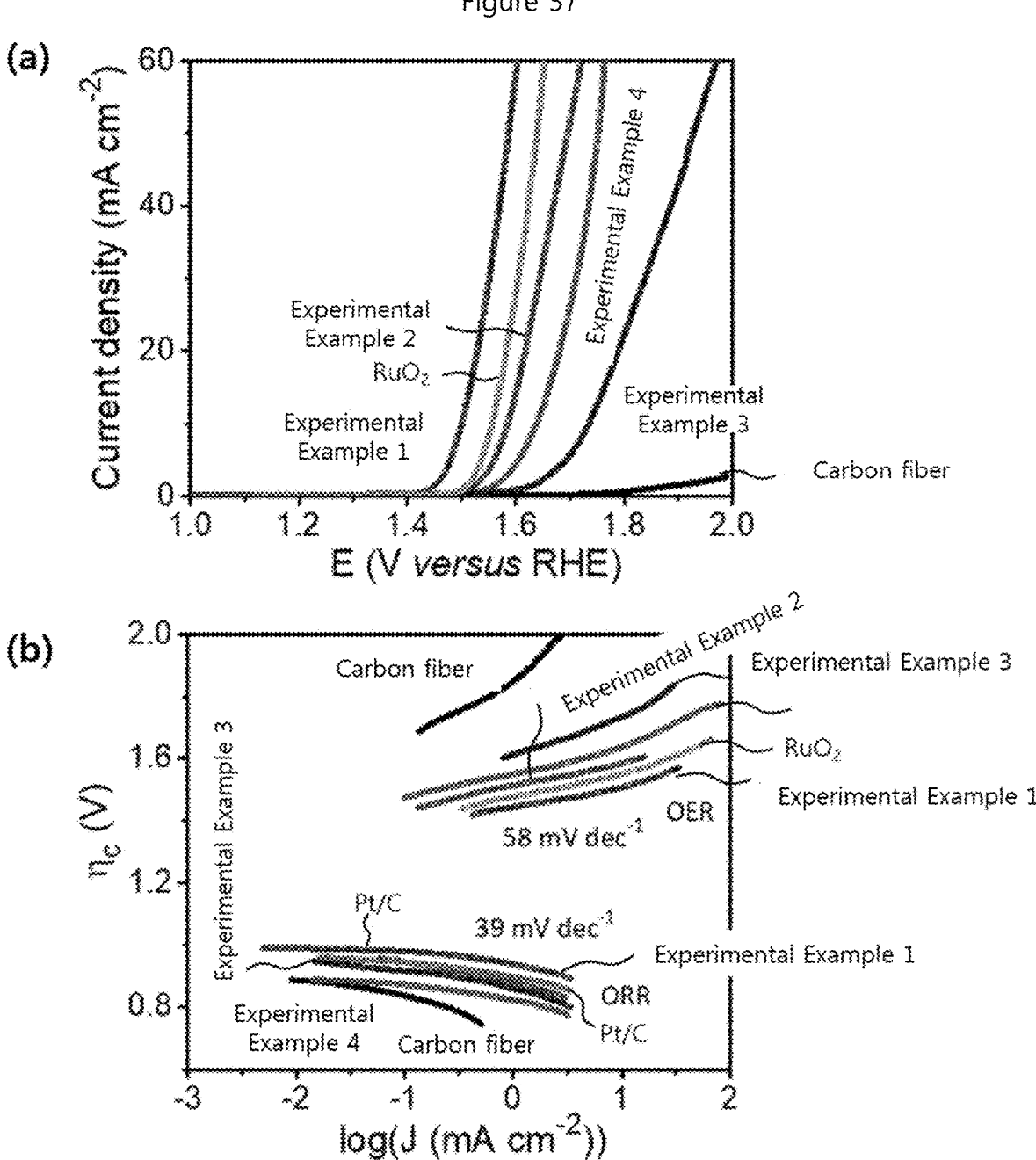
FIG. 37 is an LSV graph and a tafel profile for explaining OER properties of electrode structures according to Experimental Examples 1 to 4 of the present application, carbon fiber and RuO2 electrode.
Figure 38:
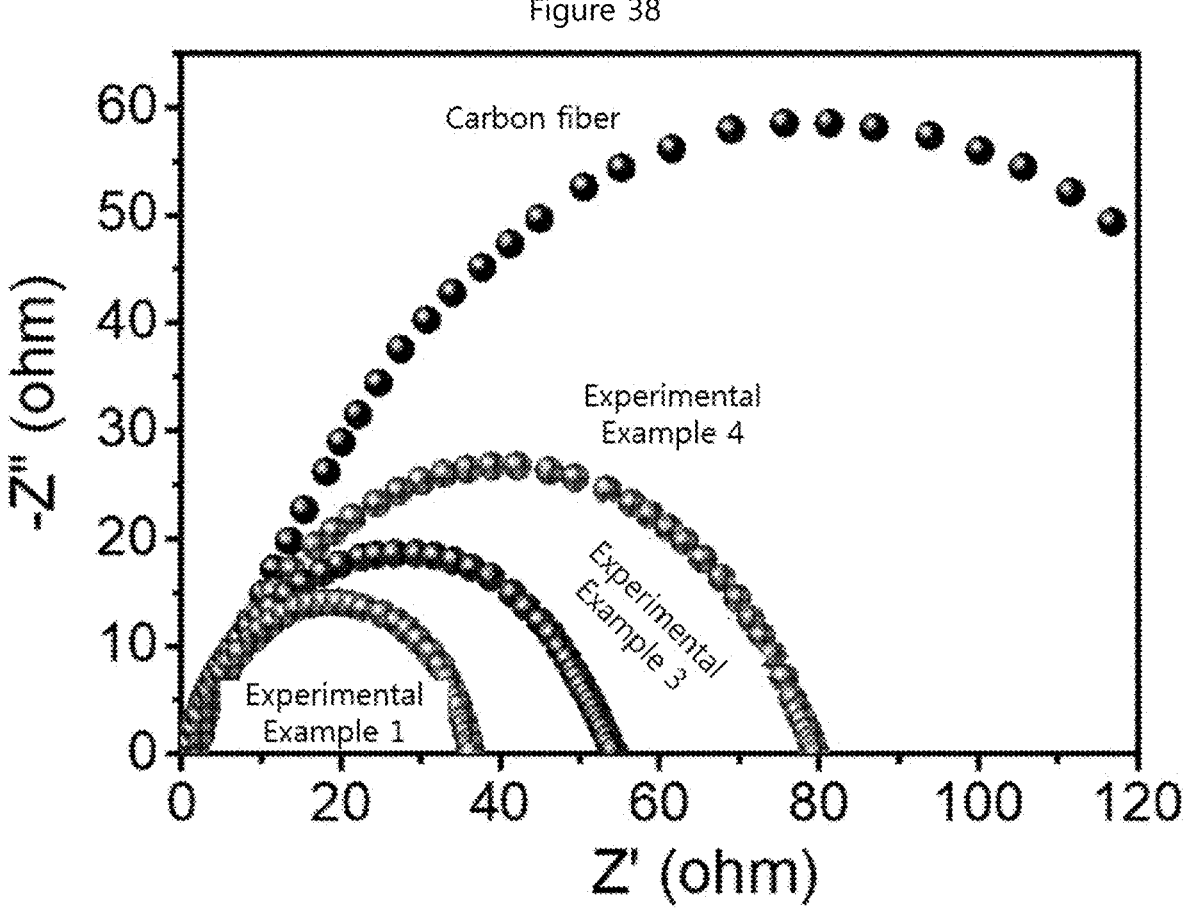
FIG. 38 is an EIS graph for explaining OER properties of electrode structures according to Experimental Examples 1, 3 and 4 of the present application, and carbon fiber.

FIG. 37 is an LSV graph and a tafel profile for explaining OER properties of electrode structures according to Experimental Examples 1 to 4 of the present application, carbon fiber and $RuO_2$ electrode, and FIG. 38 is an EIS graph for explaining OER properties of electrode structures according to Experimental Examples 1, 3 and 4 of the present application, and carbon fiber.

Referring to FIGS. 37 and 38, an LSV measurement was performed for the electrode structures according to Experimental Examples 1 to 4, carbon fiber, and $RuO_2$ electrode, and a tafel value was shown. In addition, an EIS measurement was performed for the electrode structures according to Experimental Examples 1, 3 and 4 and carbon fibers. $CuP_{0.5}S_{0.5}$ was used as the electrode structures of Experimental Examples 1 and 2.

As can be understood from FIGS. 37 and 38, it can be confirmed that ORR properties are higher in the order of the CuPS electrode structure of Experimental Example 1, $RuO_2$ electrode, the CuPS electrode structure of Experimental Example 2, the CP electrode structure of Experimental Example 4, the CuS electrode structure of Experimental Example 3, and the carbon fiber. In particular, it can be confirmed that the CuPS electrode structure according to Experimental Example 1 has the lowest overpotential value of 260 mV at 10 $mAcm^{-2}$ and a tafel value is 58 $mVdec^{-1}$, and it can be seen that OER property is remarkably higher than that of commercialized $RuO_2$.

Figure 39:
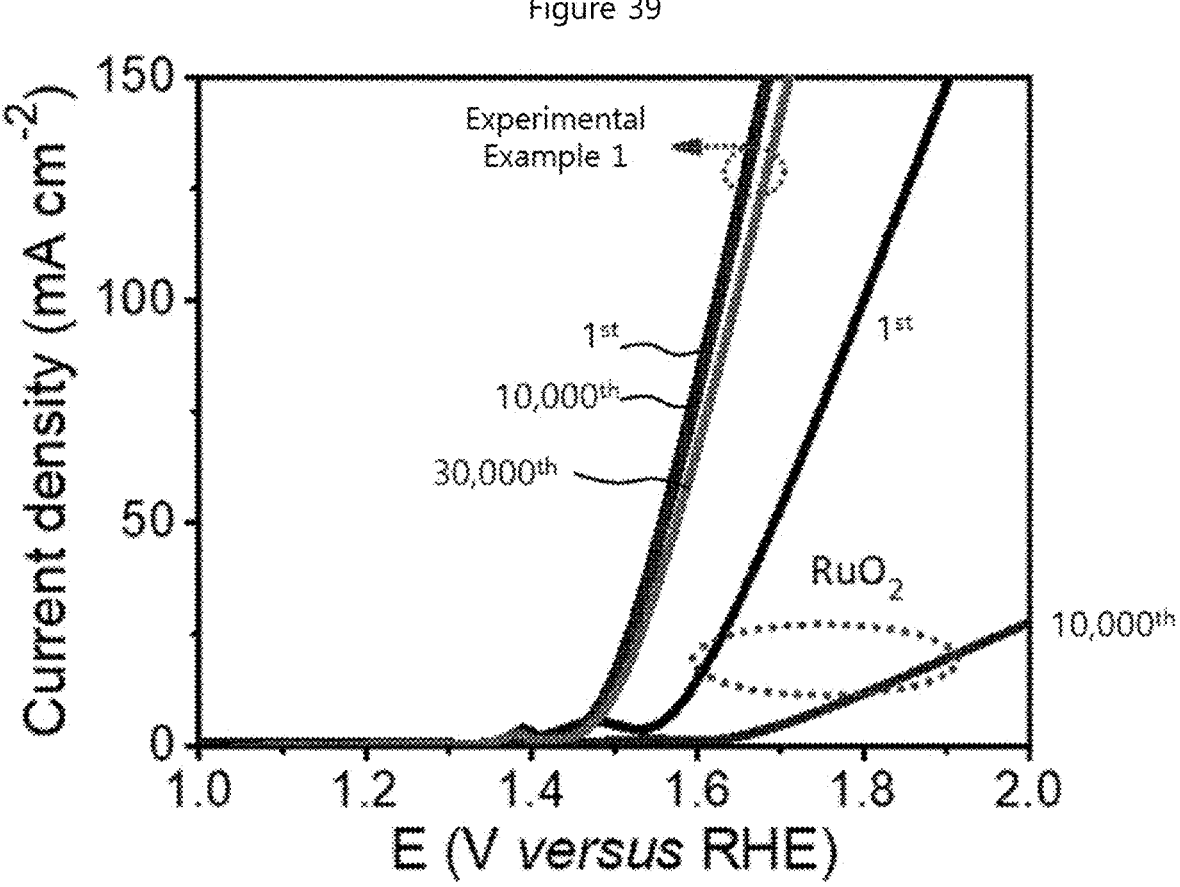
FIG. 39 is an LSV graph according to the number of cycles for explaining the OER properties of an electrode structure according to Experimental Example 1 of the present application and RuO$_2$ electrode.
Figure 40:
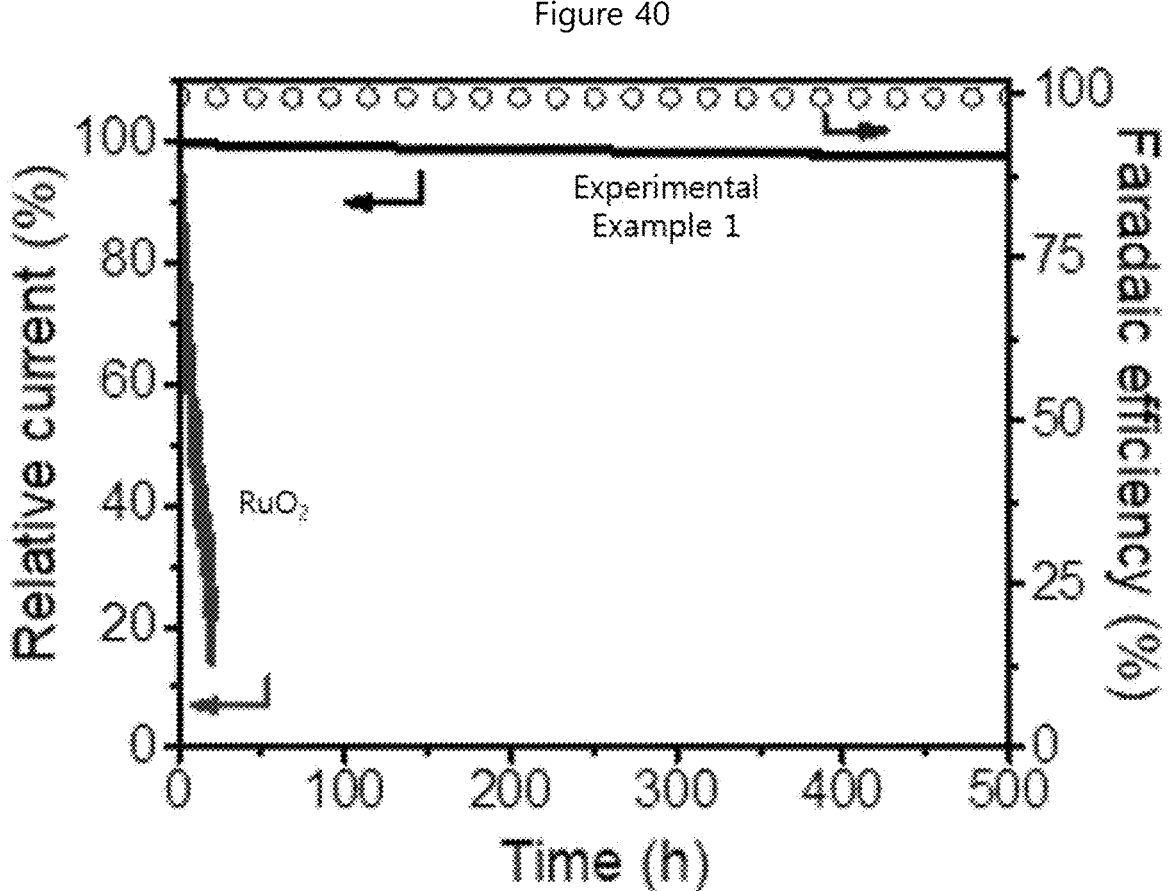
FIG. 40 is a graph of showing a chronoamperometric measurement and Faradaic efficiency measurement for explaining the OER properties of an electrode structure according to Experimental Example 1 of the present application and the RuO2 electrode.

FIG. 39 is an LSV graph according to the number of cycles for explaining the OER properties of an electrode structure according to Experimental Example 1 of the present application and $RuO_2$ electrode, and FIG. 40 is a graph of showing a chronoamperometric measurement and Faradaic efficiency measurement for explaining the OER properties of an electrode structure according to Experimental Example 1 of the present application and the $RuO_2$ electrode.

Referring to FIGS. 39 and 40, LSV measurement was performed according to the number of cycles for the CuPS electrode structure according to Experimental Example 1 and the commercially available $RuO_2$ electrode at 1600 rpm and by using 0.1M KOH. In addition, the CuPS electrode structure according to Experimental Example 1 and the $RuO_2$ electrode were measured by a chronoamperometric method under 1.5V conditions, and the Faraday efficiency was measured for the CuPS electrode according to Experimental Example 1. $CuP_{0.5}S_{0.5}$ was used as the electrode structure of Experimental Example 1.

As can be understood from FIGS. 39 to 40, it can be confirmed that the electrode structure according to Experimental Example 1 is stably driven without a substantial change even after 30,000 cycles are performed. In addition, it can be confirmed that the structure is stably driven without a substantial change for about 500 hours and has a Faraday efficiency of about 99% or more.

In contrast, in the case of the $RuO_2$ electrode, it can be confirmed that the overpotential rapidly increases as the cycle is performed, a current density value rapidly decreases, and a loss of 85% or more occurs after 24 hours.

In conclusion, it can be seen that the CuPS electrode structure according to Experimental Example 1 has a higher ORR property and a longer life compared with the commercialized $RuO_2$ electrode.

Figure 41:
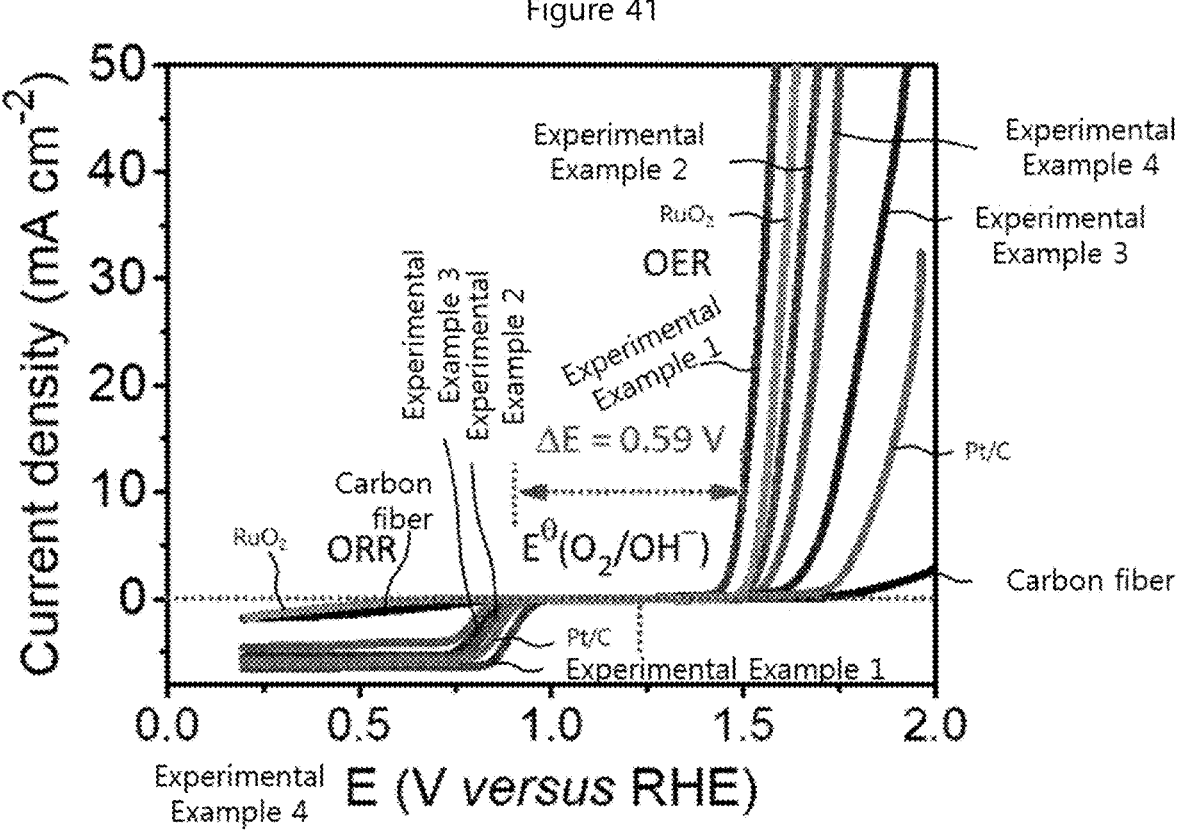
FIG. 41 is a graph for explaining bifunctional oxygen properties of electrode structures according to Experimental Examples 1 to 4 of the present application, Pt/C electrode, RuO2 electrode and carbon fiber.
Figure 42:
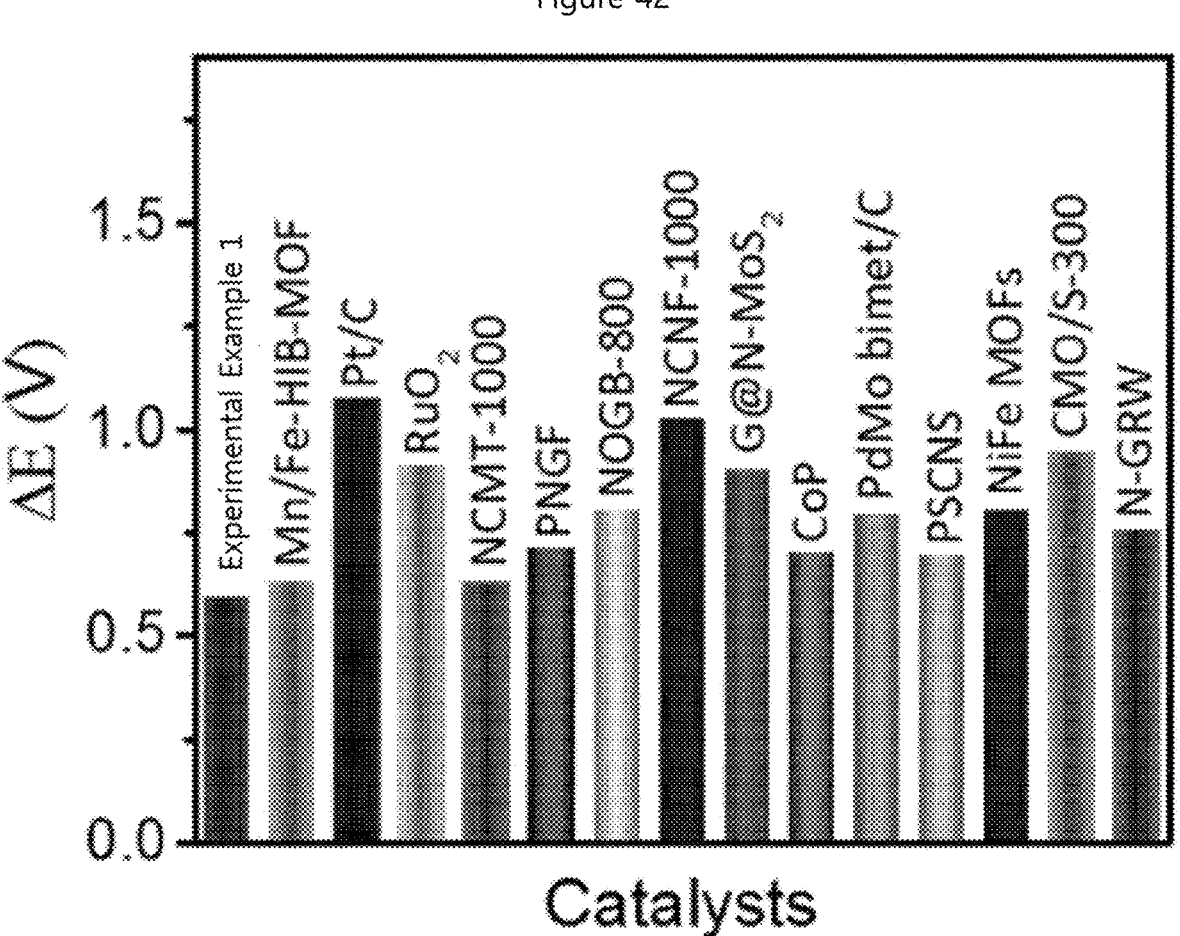
FIG. 42 is a graph showing a comparison of bifunctional oxygen properties between an electrode structure according to Experimental Example 1 of the present application and another electrode reported so far.

FIG. 41 is a graph for explaining bifunctional oxygen properties of electrode structures according to Experimental Examples 1 to 4 of the present application, Pt/C electrode, $RuO_2$ electrode and carbon fiber, and FIG. 42 is a graph showing a comparison of bifunctional oxygen properties between an electrode structure according to Experimental Example 1 of the present application and another electrode reported so far.

Referring to FIGS. 41 and 42, the OER properties were compared with regard to the electrode structures according to Experimental Examples 1 to 4, Pt/C electrode, $RuO_2$ electrode and carbon fiber. $CuP_{0.5}S_{0.5}$ was used as the electrode structures of Experimental Examples 1 and 2. A reversible bifunctional reaction of oxygen may be determined by a difference (4E) of the overpotentials of ORR and OER, and as the difference is smaller, the reversibility may be higher.

As shown in FIG. 41, in the case of the electrode structure of Experimental Example 1, it can be confirmed that a difference in the overpotentials of ORR and OER is 0.59V and reversibility is excellent compared with the commercially available Pt/C electrode and $RuO_2$ electrode.

In addition, as shown in FIG. 42, it can be confirmed that the electrode structure of Experimental Example 1 has the smallest difference in the overpotentials of ORR and OER compared with other electrodes reported so far, thus showing excellent reversibility for OER and ORR reactions.

Figure 43:
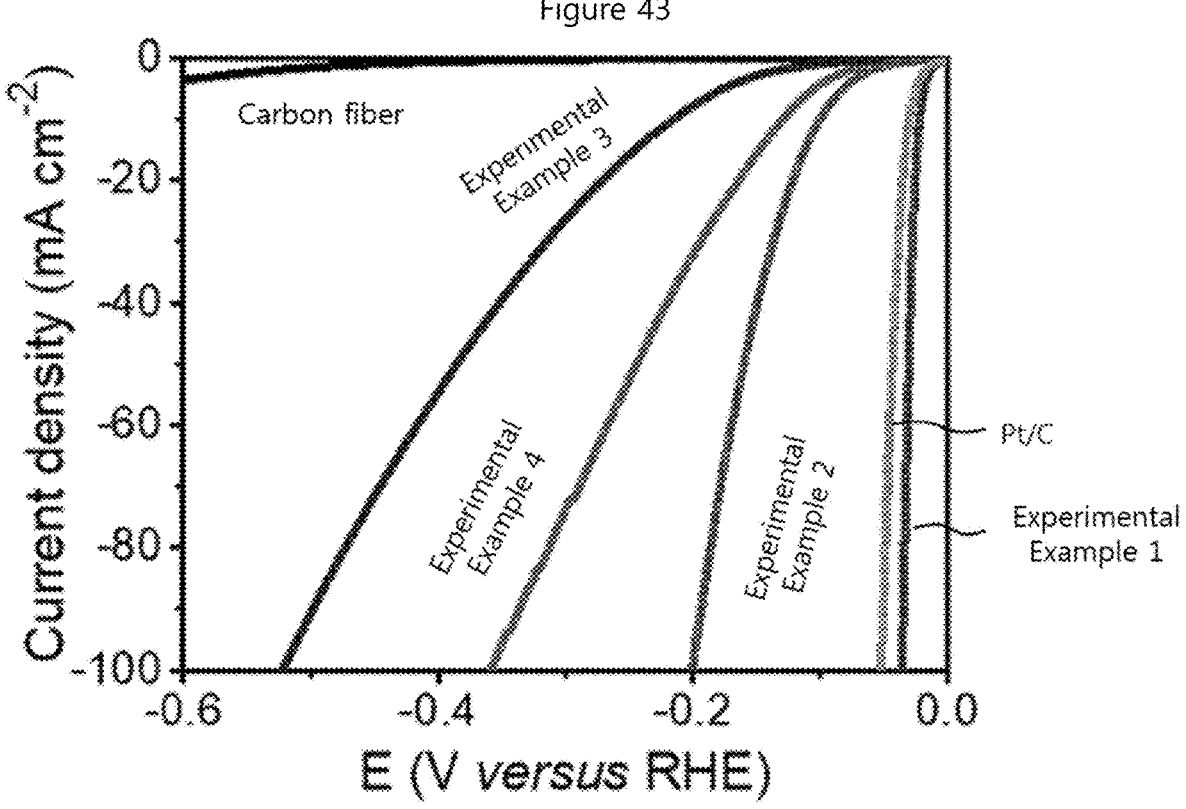
FIG. 43 is an LSV graph for explaining HER properties of Experimental Examples 1 to 4, Pt/c electrode and carbon fiber.
Figure 44:
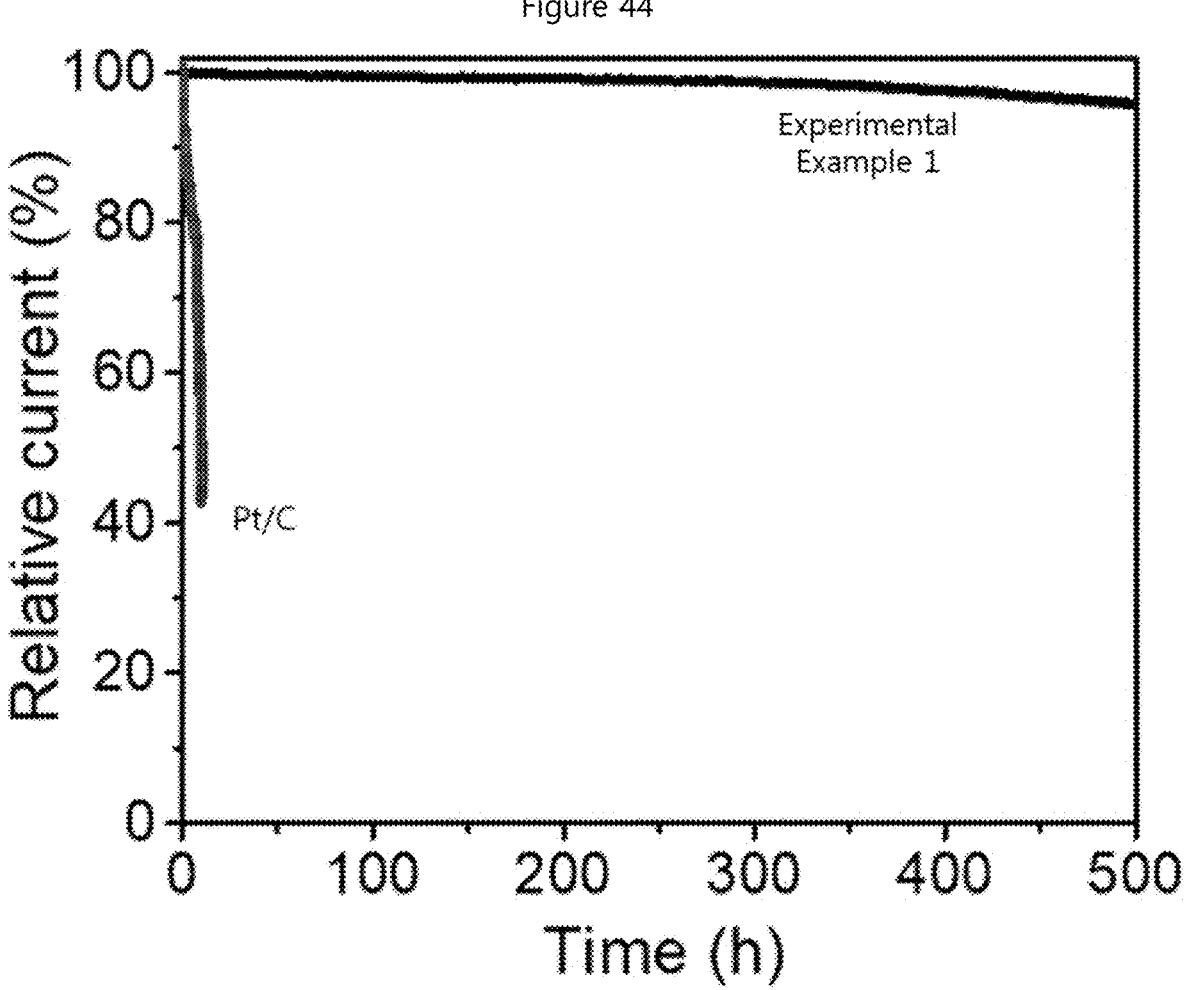
FIG. 44 is a graph of showing a chronoamperometric measurement for explaining HER properties of electrode structure according to Experimental Example 1 of the present application and Pt/C electrode.
Figure 45:
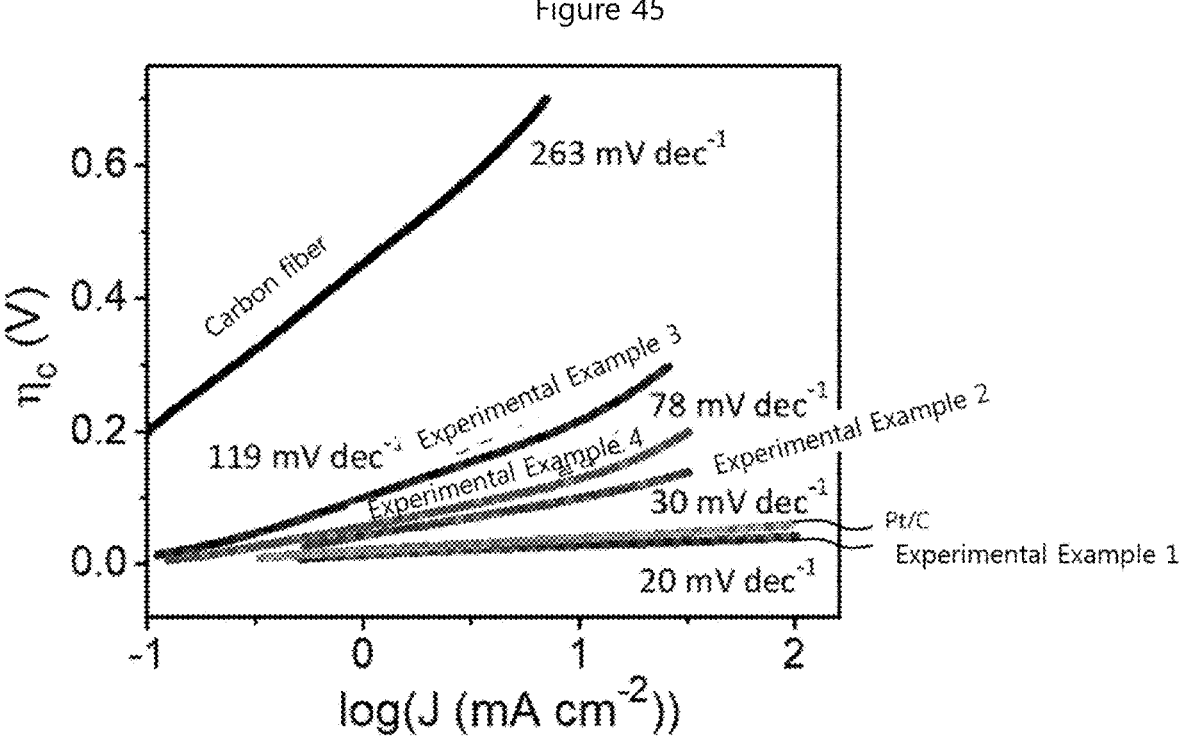
FIG. 45 is a tafel profile for explaining HER properties of Experimental Examples 1 to 4, Pt/c electrode and carbon fiber.

FIG. 43 is an LSV graph for explaining HER properties of Experimental Examples 1 to 4, Pt/c electrode and carbon fiber, FIG. 44 is a graph of showing a chronoamperometric measurement for explaining HER properties of electrode structure according to Experimental Example 1 of the present application and Pt/C electrode, and FIG. 45 is a tafel profile for explaining HER properties of Experimental Examples 1 to 4 of the present application, Pt/c electrode and carbon fiber.

Referring to FIGS. 43 to 45, an LSV measurement was performed for the electrode structures according to Experimental Examples 1 to 4, carbon fiber, and Pt/C electrode, and a tafel value was shown. In addition, an electrode structure according to Experimental Example 1 and Pt/C electrode were measured according to chronoamperometry. $CuP_{0.5}S_{0.5}$ was used as the electrode structures of Experimental Examples 1 and 2.

As can be understood from FIGS. 43 to 45, it can be seen that HER properties are more excellent in the order of the electrode structure of Experimental Example 1, Pt/C electrode, the electrode structure of Experimental Example 2, the electrode structure of Experimental Example 4, the electrode structure of Experimental Example 3, and the carbon fiber.

In particular, it can be confirmed that the CuPS electrode structure according to Experimental Example 1 has a high HER property compared with the commercialized Pt/C electrode. In particular, a tafel value of the electrode structure of Experimental Example 1 is 20 $mVdec^{-1}$, which is lower than a tafel value (30 $mVdec^{-1}$) of the Pt/C electrode, which indicates that the HER process of the electrode structure of Experimental Example 1 is performed by the Volmer-Tafel mechanism.

Figure 46:
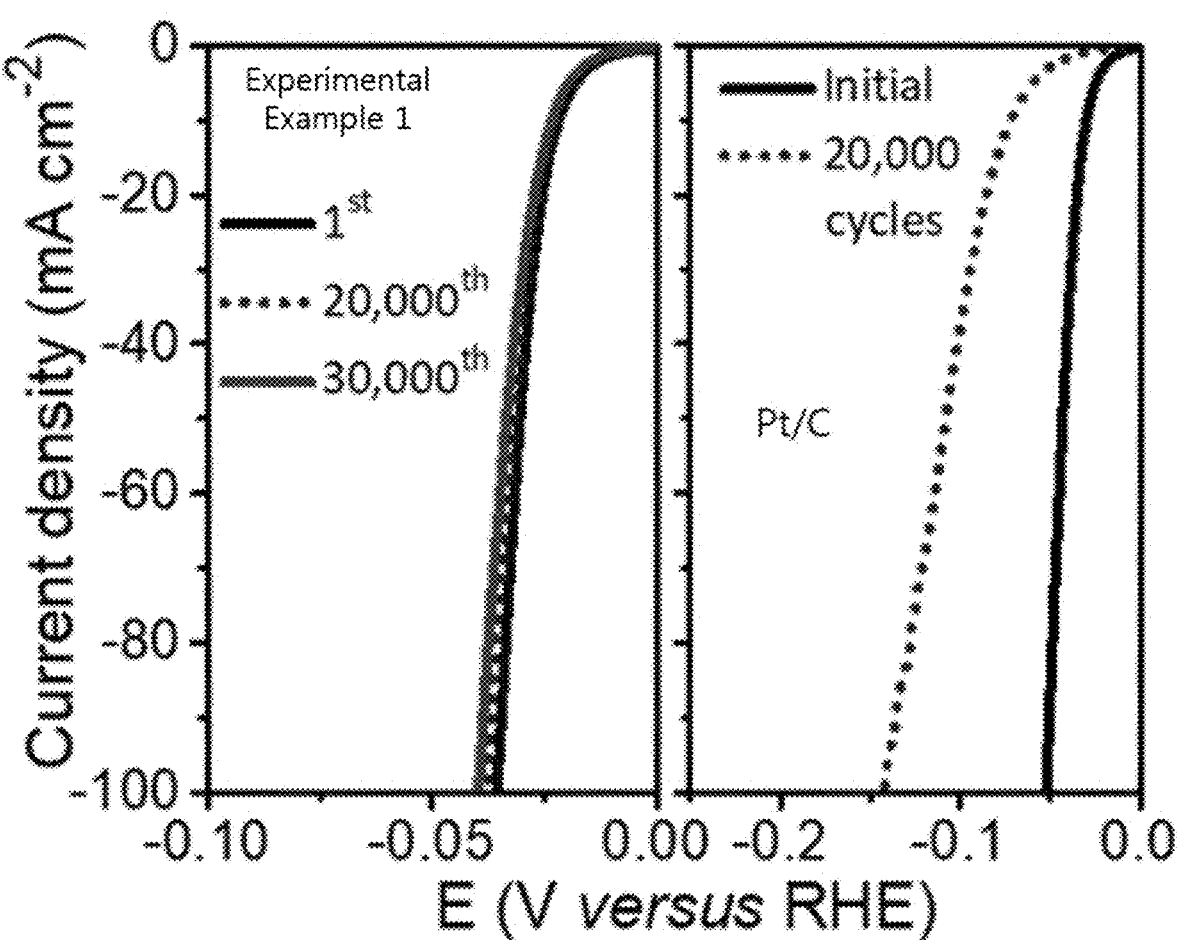
FIG. 46 is an LSV graph according to the number of cycles for explaining the HER properties of an electrode structure according to Experimental Example 1 of the present application and Pt/C electrode.

FIG. 46 is an LSV graph according to the number of cycles for explaining the HER properties of an electrode structure according to Experimental Example 1 of the present application and Pt/C electrode.

Referring to FIG. 46, an LSV measurement was performed according to the number of cycles for the CuPS electrode structure according to Experimental Example 1 and the Pt/C electrode.

As can be seen from FIG. 46, in the case of the Pt/C electrode, it can be confirmed that the overpotential greatly increases after 20,000 cycles, so that the HER property is rapidly deteriorated. In contrast, it can be confirmed that the electrode structure according to Experimental Example 1 is stably driven without a substantial change even after 30,000 cycles are performed.

In conclusion, it can be seen that the CuPS electrode structure according to Experimental Example 1 has a higher HER property and a longer life compared with the commercialized Pt/C electrode.

Figure 47:
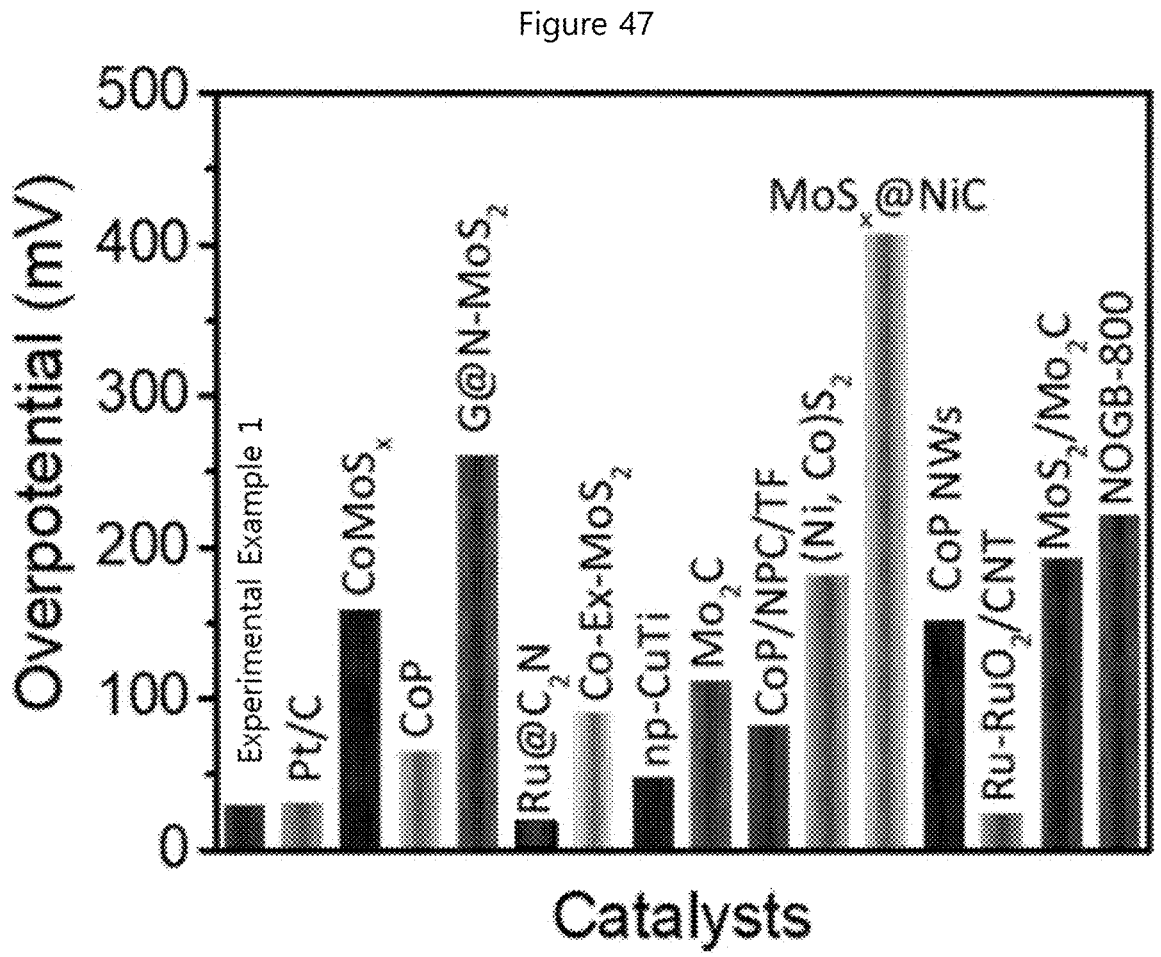
FIG. 47 is a graph showing a comparison of HER properties between an electrode structure according to Experimental Example 1 of the present application and another electrode reported so far.

FIG. 47 is a graph showing a comparison of HER properties between an electrode structure according to Experimental Example 1 of the present application and another electrode reported so far.

Referring to FIG. 47, in the case of the electrode structure (CuP$_{0.5}$S$_{0.5}$) according to Experimental Example 1, it can be confirmed that an overpotential value is small compared with other electrodes reported so far, and thus the electrode structure according to Experimental Example 1 may implement a high HER property without the use of expensive precious metals.

Figure 48:
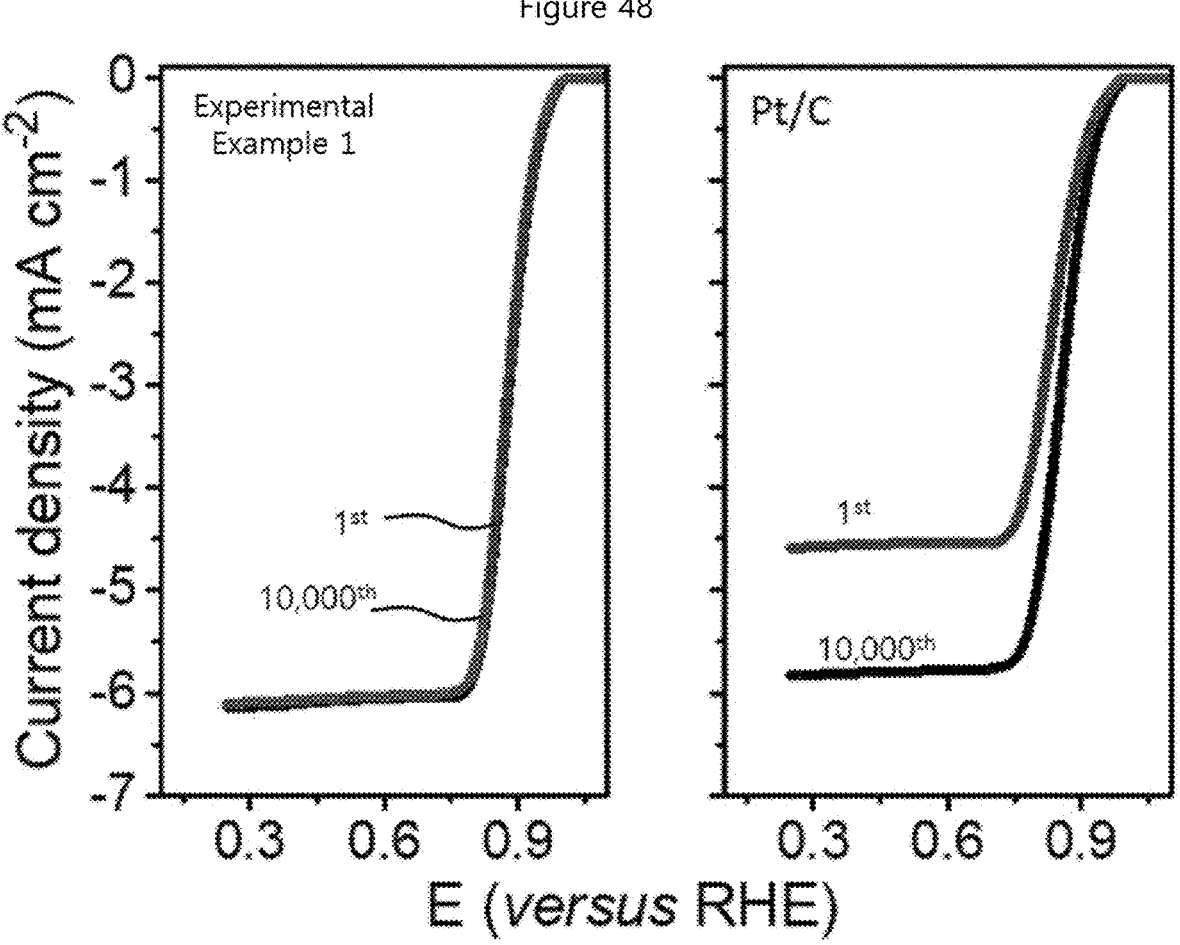
FIG. 48 is an LSV graph for explaining ORR properties of an electrode structure according to Experimental Example 1 of the present application and Pt/C electrode in an acidic environment.
Figure 49:
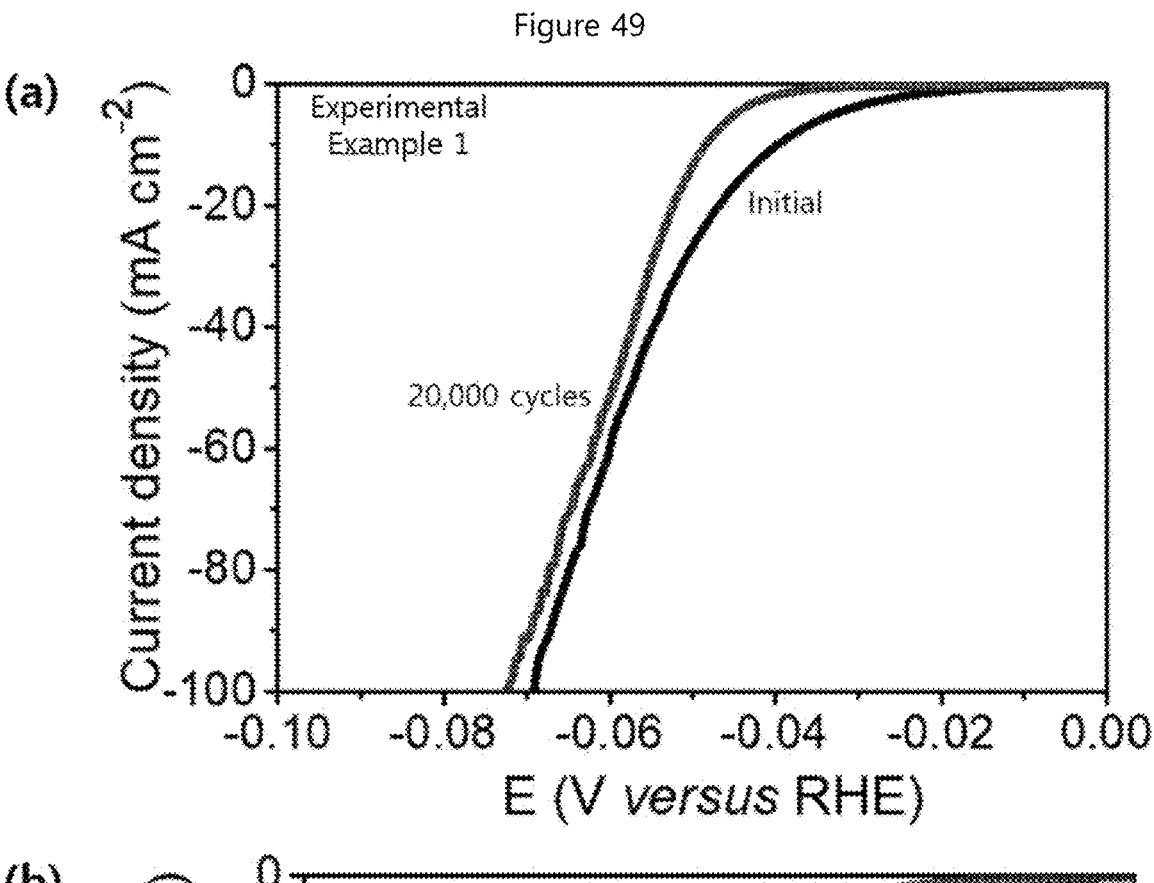
FIG. 49 is an LSV graph for explaining HER properties of an electrode structure according to Experimental Example 1 of the present application and Pt/C electrode in an acidic environment.
Figure 49:
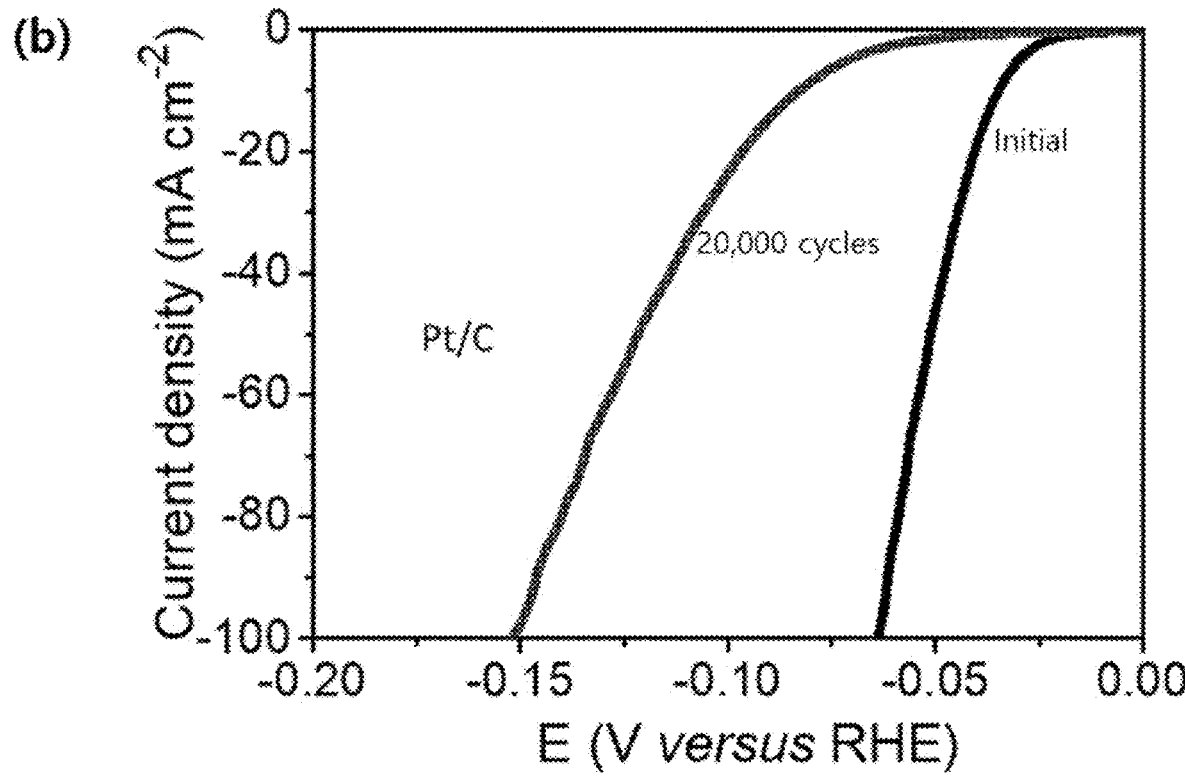
Figure 50:
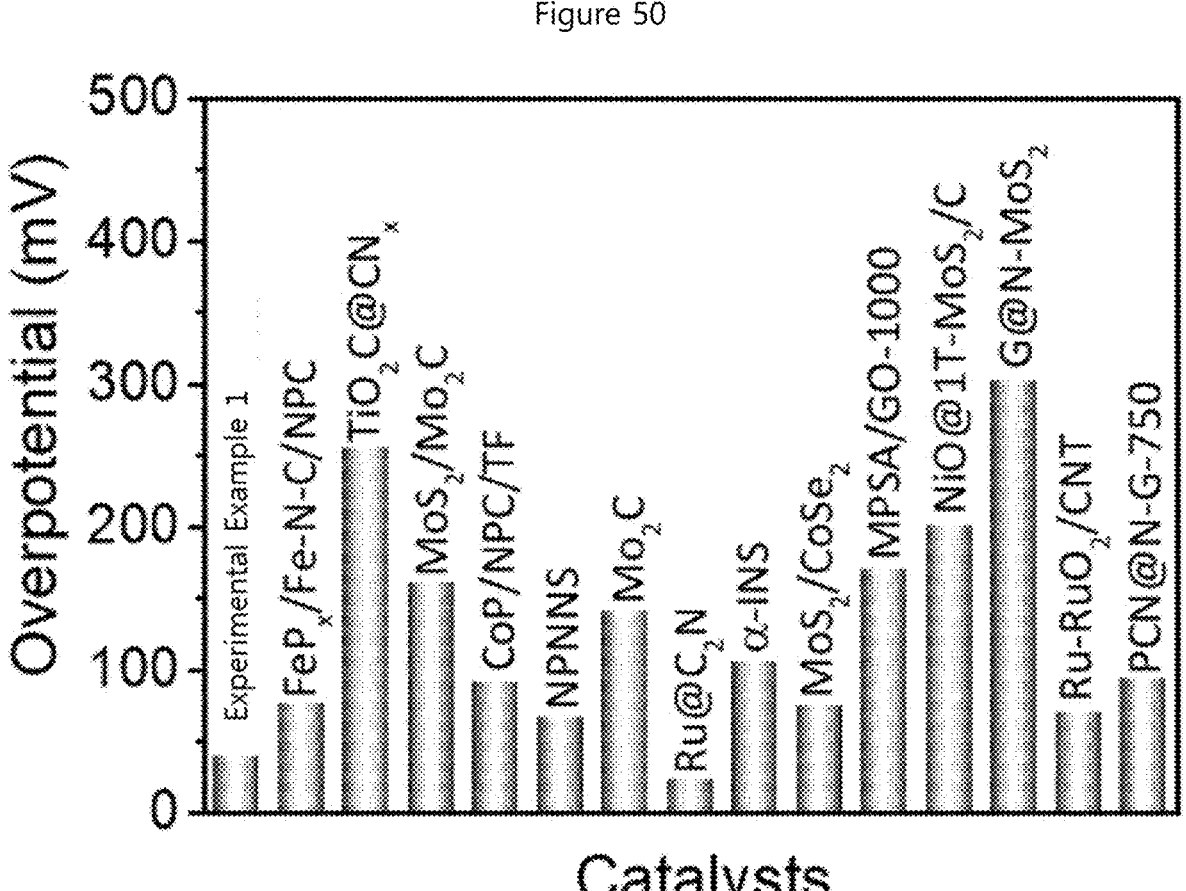
FIG. 50 is a graph showing a comparison of HER properties between an electrode structure according to Experimental Example 1 of the present application and another electrode reported so far in an acidic environment.

FIG. 48 is an LSV graph for explaining ORR properties of an electrode structure according to Experimental Example 1 of the present application and Pt/C electrode in an acidic environment, FIG. 49 is an LSV graph for explaining HER properties of an electrode structure according to Experimental Example 1 of the present application and Pt/C electrode in an acidic environment, and FIG. 50 is a graph showing a comparison of HER properties between the electrode structure according to Experimental Example 1 of the present application and another electrode reported so far in an acidic environment.

Referring to FIGS. 48 and 49, an LSV measurement was performed for the electrode structure according to Experimental Example 1 and the Pt/C electrode in order to confirm the ORR property by using 0.1M HC104. In addition, a comparison of HER properties was made between the electrode structure according to Experimental Example 1 and another electrode reported so far in a 0.5M H2504 environment. CuP$_{0.5}$S$_{0.5}$ was used as the electrode structure of Experimental Example 1.

As can be understood from FIG. 48, the electrode structure according to Experimental Example 1 was stably driven even in an acidic environment, and the actual ORR properties did not change even after 10,000 cycles were performed. In contrast, it can be seen that the Pt/C electrode has ORR properties deteriorated due to a rapid increase in overpotential after 10,000 cycles were performed in an acidic environment.

In addition, as can be understood from FIG. 49, in the electrode structure of Experimental Example 1, it can be confirmed that the overpotential is slightly increased after 20,000 cycles and thus the HER properties are stably maintained even in an acidic environment, but in the case of Pt/C electrode, the overpotential is remarkably increased after 20,000 cycles and thus the HER properties are deteriorated.

In addition, as can be understood from FIG. 50, it can be confirmed that the electrode structure of Experimental Example 1 may maintain high HER properties even in an acidic environment compared with other electrodes reported so far.

Figure 51:
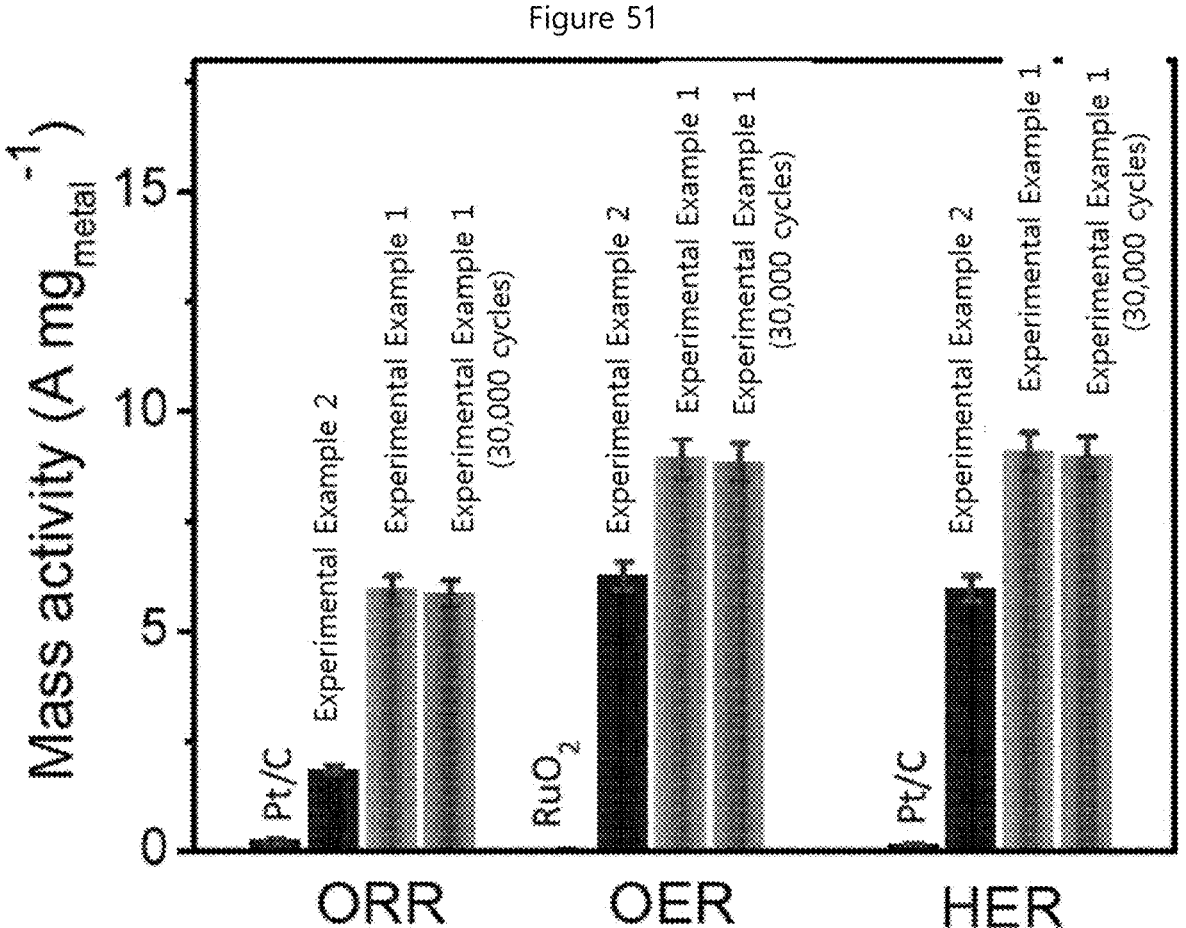
FIG. 51 is a mass activity graph for comparing ORR, OER and HER properties of electrode structures according to Experimental Examples 1 and 2 of the present application, Pt/C electrode and $RuO_2$ electrode.

FIG. 51 is a mass activity graph for comparing ORR, OER and HER properties of electrode structures according to Experimental Examples 1 and 2 of the present application, Pt/C electrode and RuO$_2$ electrode.

Referring to FIG. 51, a mass activity was calculated for ORR, OER and HER of electrode structures according to Experimental Examples 1 and 2, Pt/C electrode and RuO$_2$ electrode. CuP$_{0.5}$S$_{0.5}$ was used as the electrode structure of Experimental Examples 1 and 2.

As shown in FIG. 51, it can be confirmed that the electrode structures of Experimental Examples 1 and 2 have a high mass activity for ORR, OER and HER compared with Pt/C electrode and RuO$_2$ electrode.

In particular, in the case of the electrode structure according to Experimental Example 1, it can be seen that a mass activity value is maintained without a substantial change even after 30,000 cycles are performed.

In conclusion, it can be confirmed that the electrode structures according to Experimental Examples 1 and 2 have high ORR, OER and HER properties compared with the commercialized Pt/C electrode and RuO$_2$.

Figure 52:
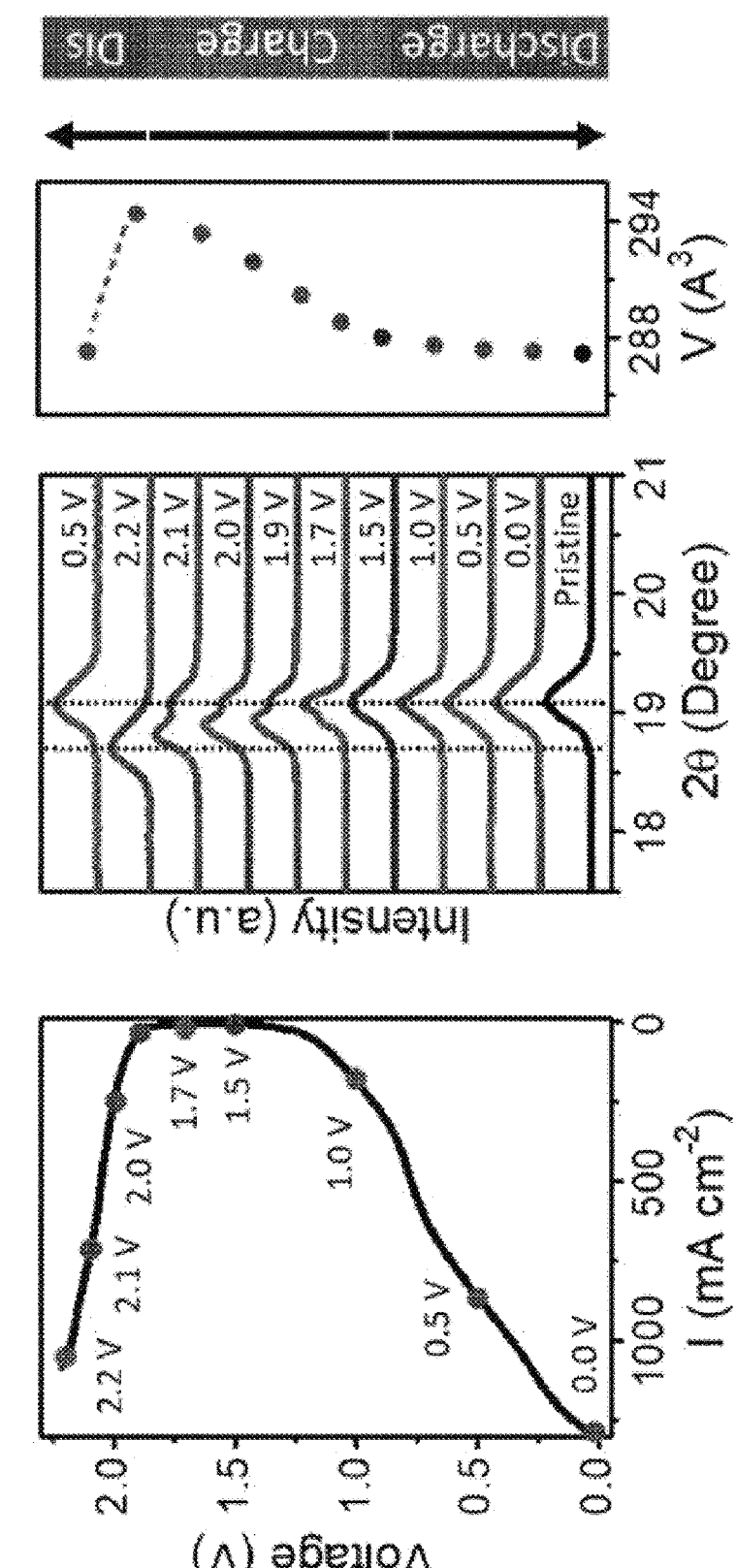
FIG. 52 is a graph showing an in-situ XRD measurement of an electrode structure according to Experimental Example 1 in a charged/discharged state of a secondary battery according to Experimental Example 1 of the present application.
Figure 53:
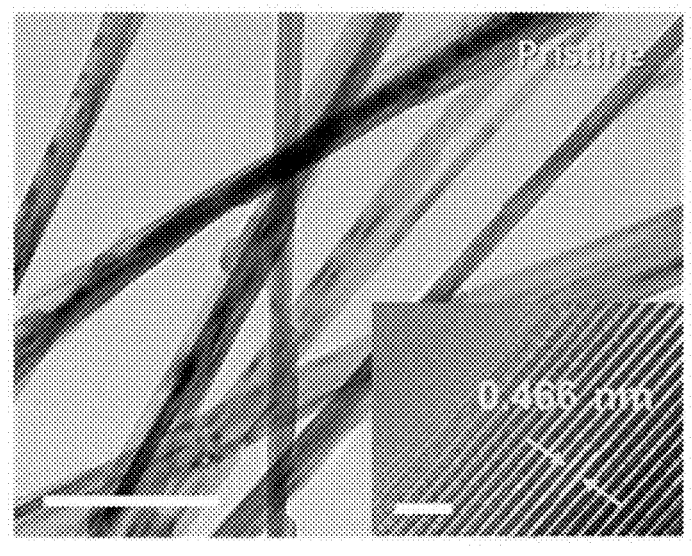
FIG. 53 is an HRTEM picture showing an electrode structure according to Experimental Example 1 in a charged/discharged state of a secondary battery according to Experimental Example 1 of the present application.
Figure 53:
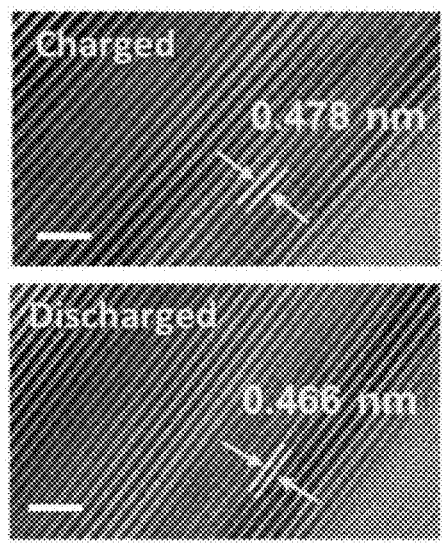

FIG. 52 is a graph showing an in-situ XRD measurement of an electrode structure according to Experimental Example 1 in a charged/discharged state of a secondary battery according to Experimental Example 1 of the present application, and FIG. 53 is an HRTEM picture showing an electrode structure according to Experimental Example 1 in a charged/discharged state of a secondary battery according to Experimental Example 1 of the present application.

Referring to FIGS. 52 and 53, an in-situ XRD measurement was performed for the electrode structure according to Experimental Example 1 in a charged/discharged state of a secondary battery according to Experimental Example 1, and a galvanostatic charge/discharge profile and a volume change in an unit cell of the electrode structure of Experimental Example 1 are also shown. Along with this, an HRTEM picture of an electrode structure according to Experimental Example 1 was taken in a charged/discharged state of a secondary battery according to Experimental Example 1.

As can be understood from FIGS. 52 and 53, in the case of electrode structure of Experimental Example 1, it can be confirmed that a peak is observed in the range of 2θ values of 18.5° to 19.5°, and as charging proceeds in a discharged state, a 2θ value corresponding to the peak moves to the left and decreases, and then the peak is divided into two. In addition, in case of being fully charged with 2.2V at 0.466 nm, it can be confirmed that that the lattice spacing increases to 0.478 nm and a volume of the unit cell increases from 287.2 Å 3 to 294.6 Å 3. In other words, it can be seen that a solid-solution reaction occurs while the electrode structure of Experimental Example 1 maintains an orthorhombic crystal structure during charging and discharging.

Figure 54:
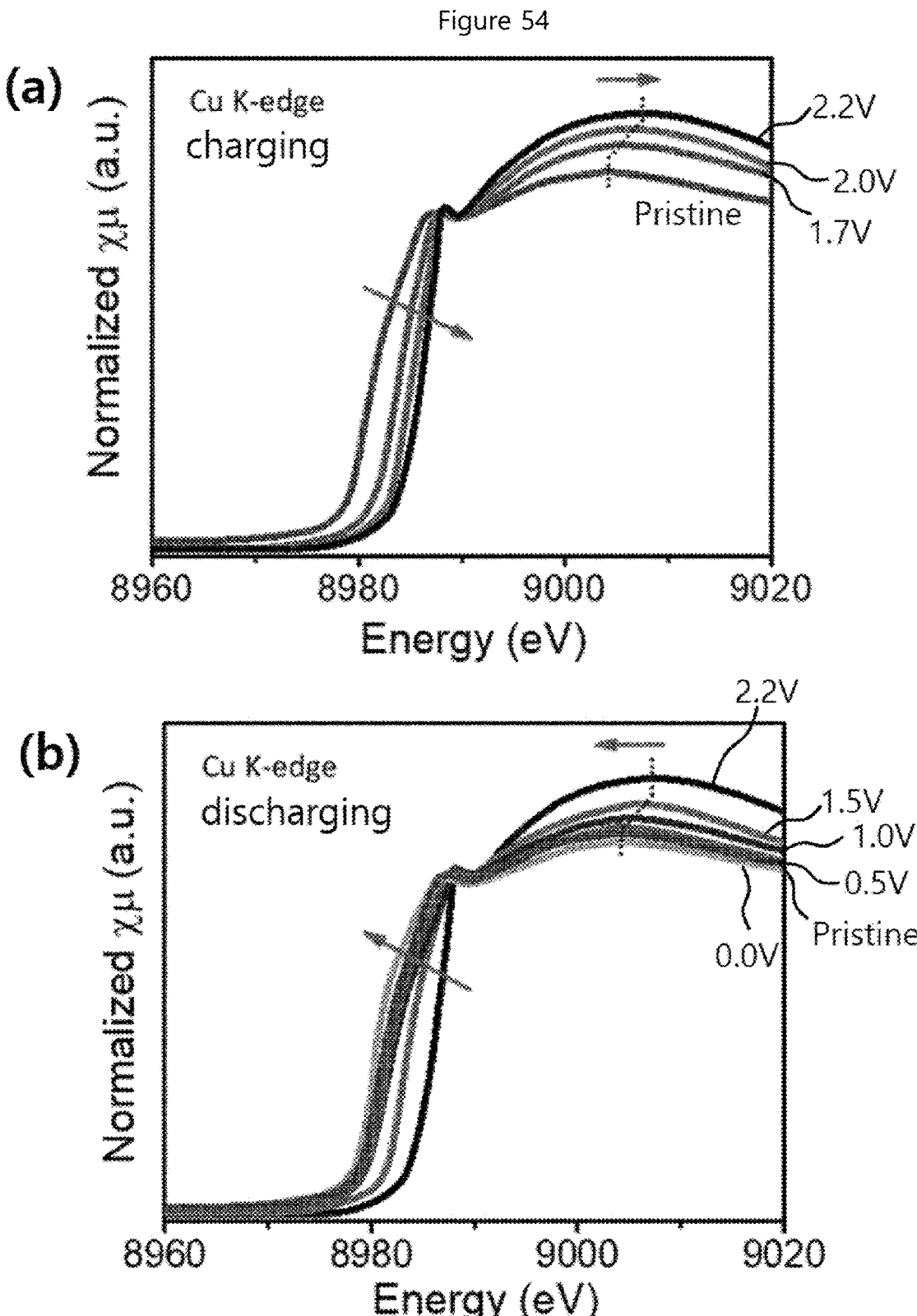
FIG. 54 is a Cu K-edge XANES spectral graph of an electrode structure according to Experimental Example 1 in a charged/discharged state of a secondary battery according to Experimental Example 1 of the present application.
Figure 55:
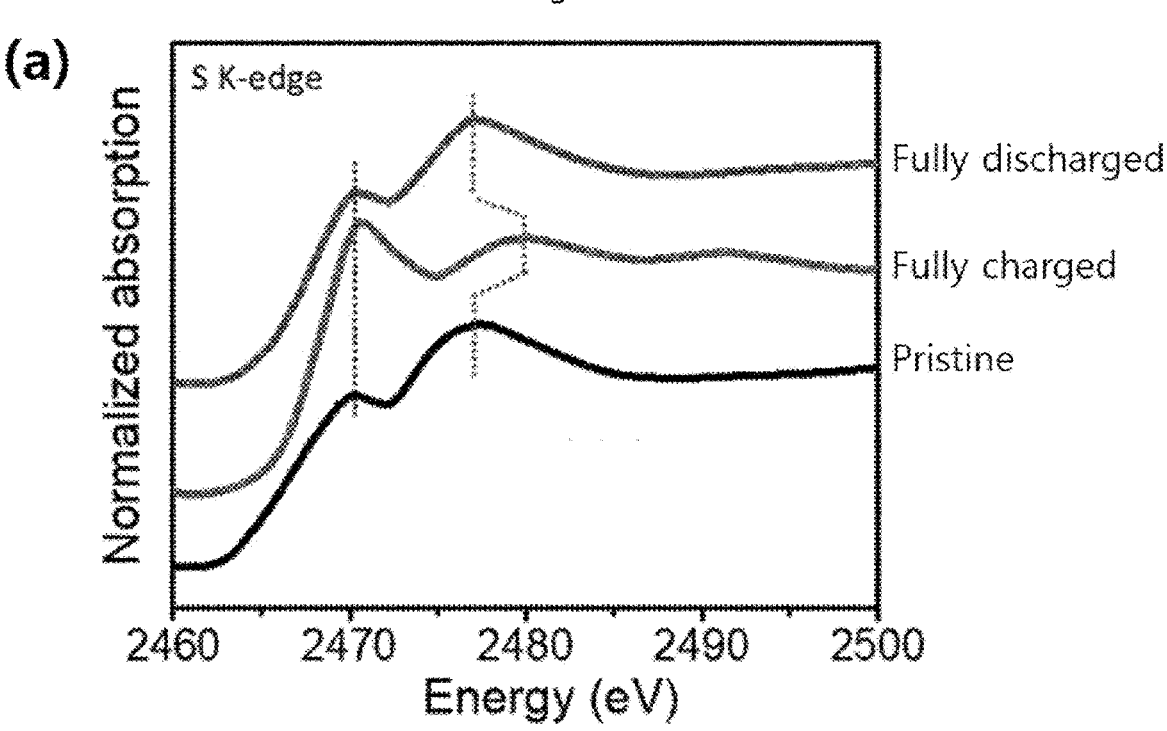
FIG. 55 is an S K-edge and P L-edge XANES spectral graph of an electrode structure according to Experimental Example 1 in a charged/discharged state of a secondary battery according to Experimental Example 1 of the present application.
Figure 55:
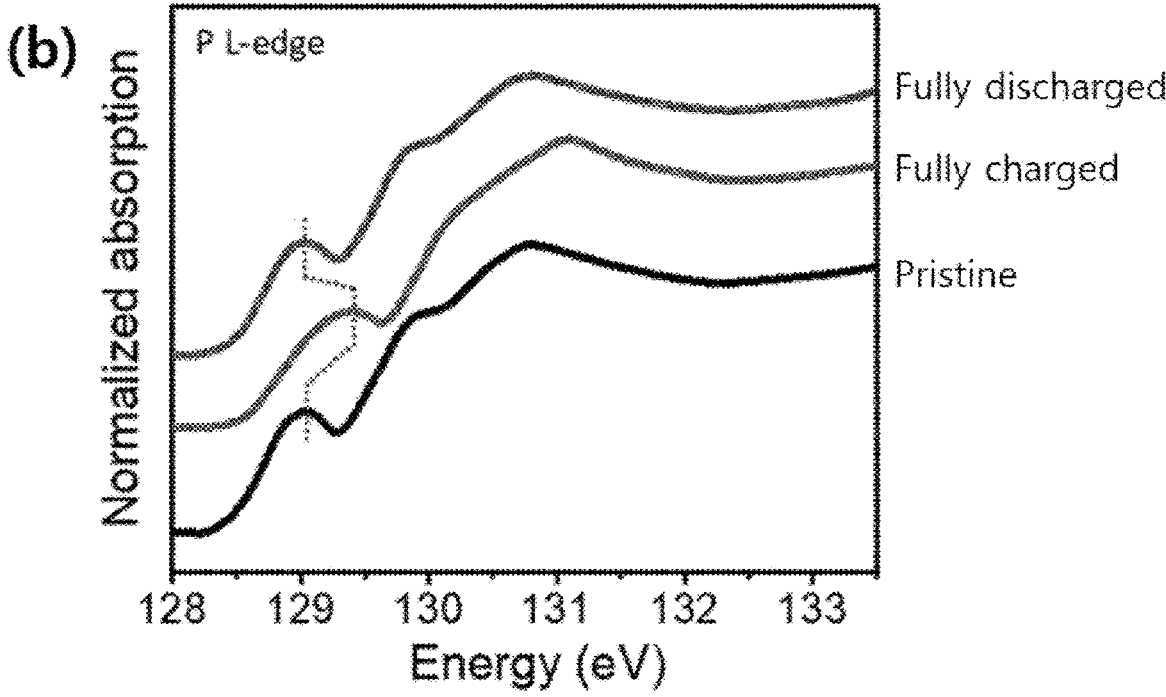
Figure 56:
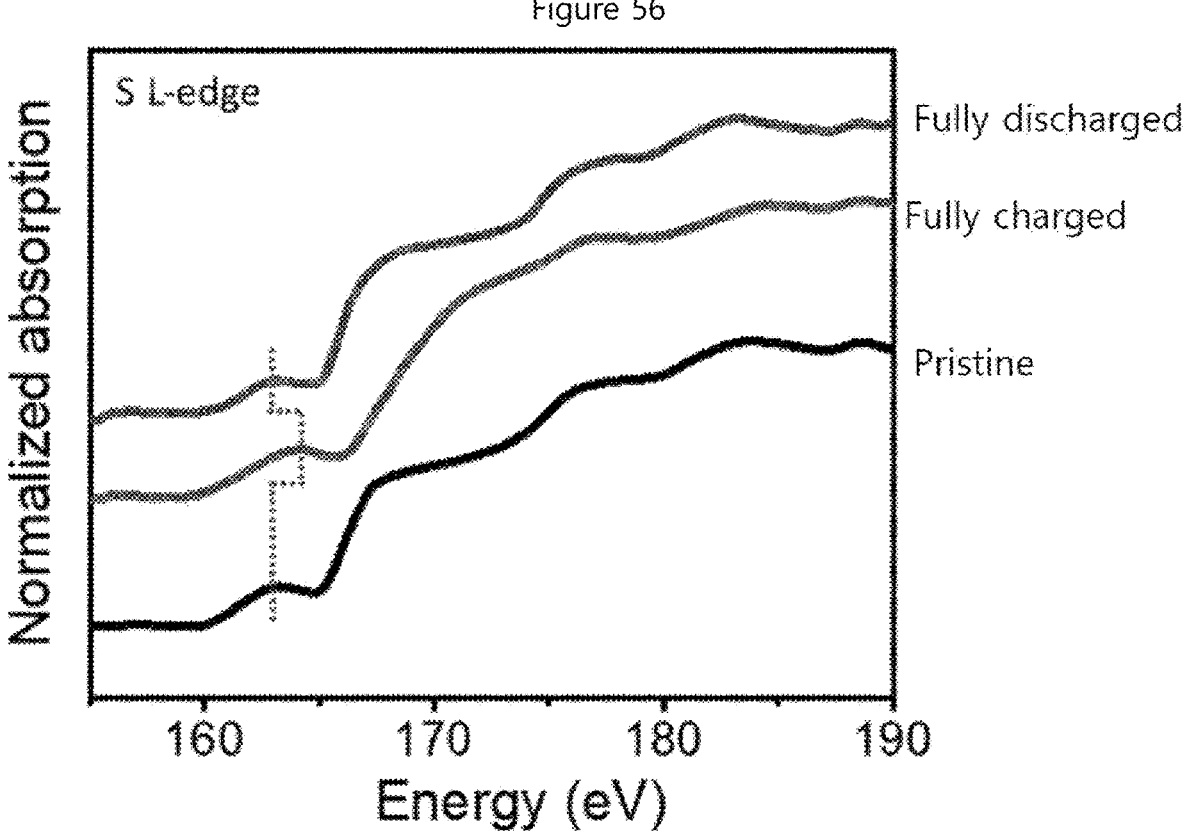
FIG. 56 is S L3,2-edge XANES spectra of an electrode structure according to Experimental Example 1 in a charged/discharged state of a secondary battery according to Experimental Example 1 of the present application.
Figure 57:
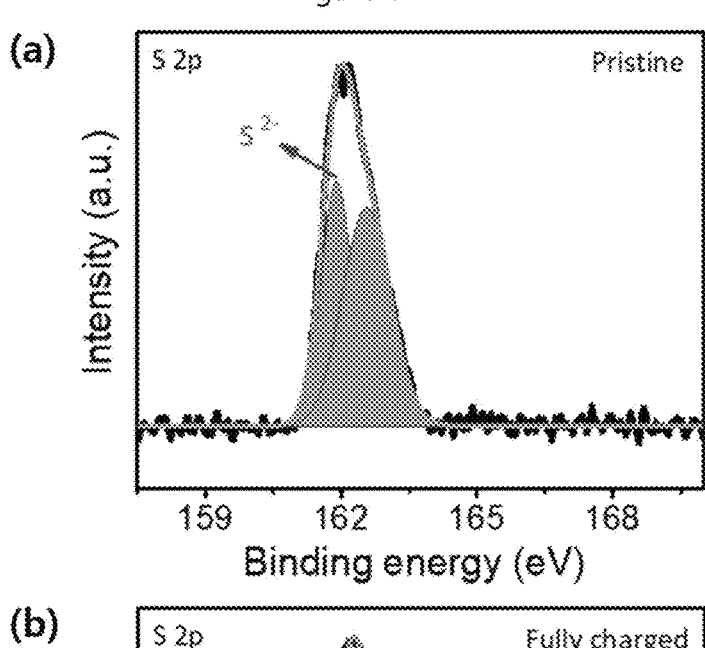
FIG. 57 is S 2p XPS spectra of an electrode structure according to Experimental Example 1 in a charged/discharged state of a secondary battery according to Experimental Example 1 of the present application.
Figure 57:
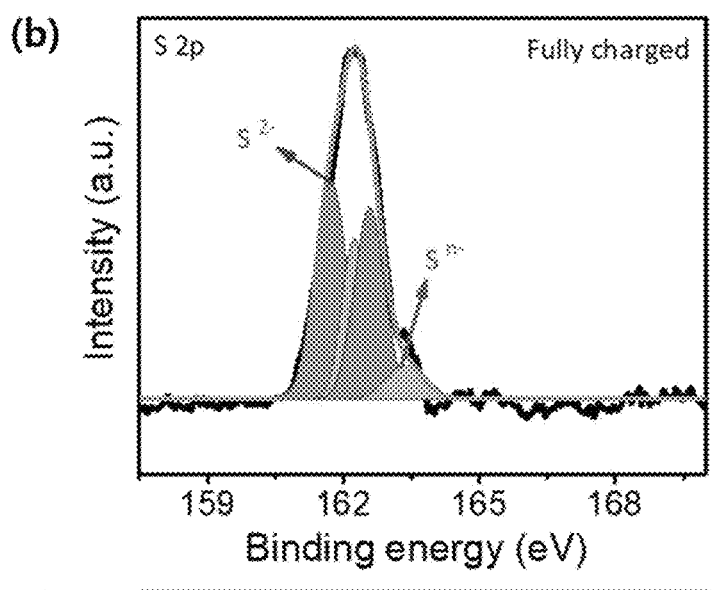
Figure 57:
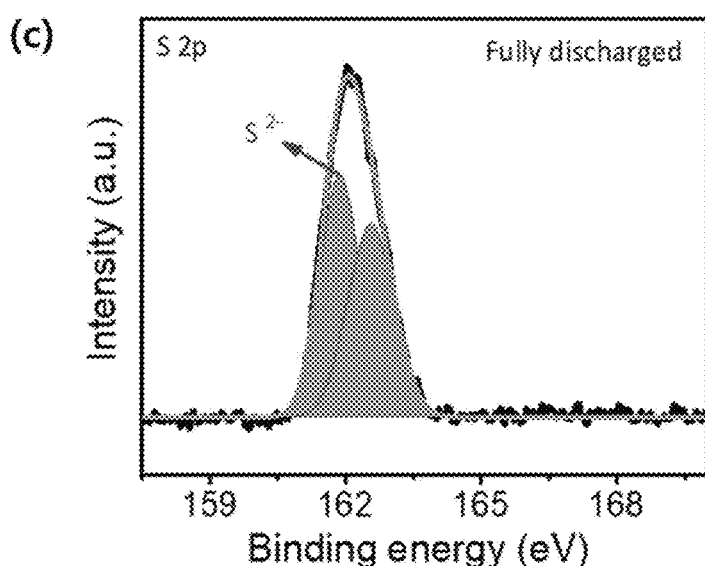
Figure 58:
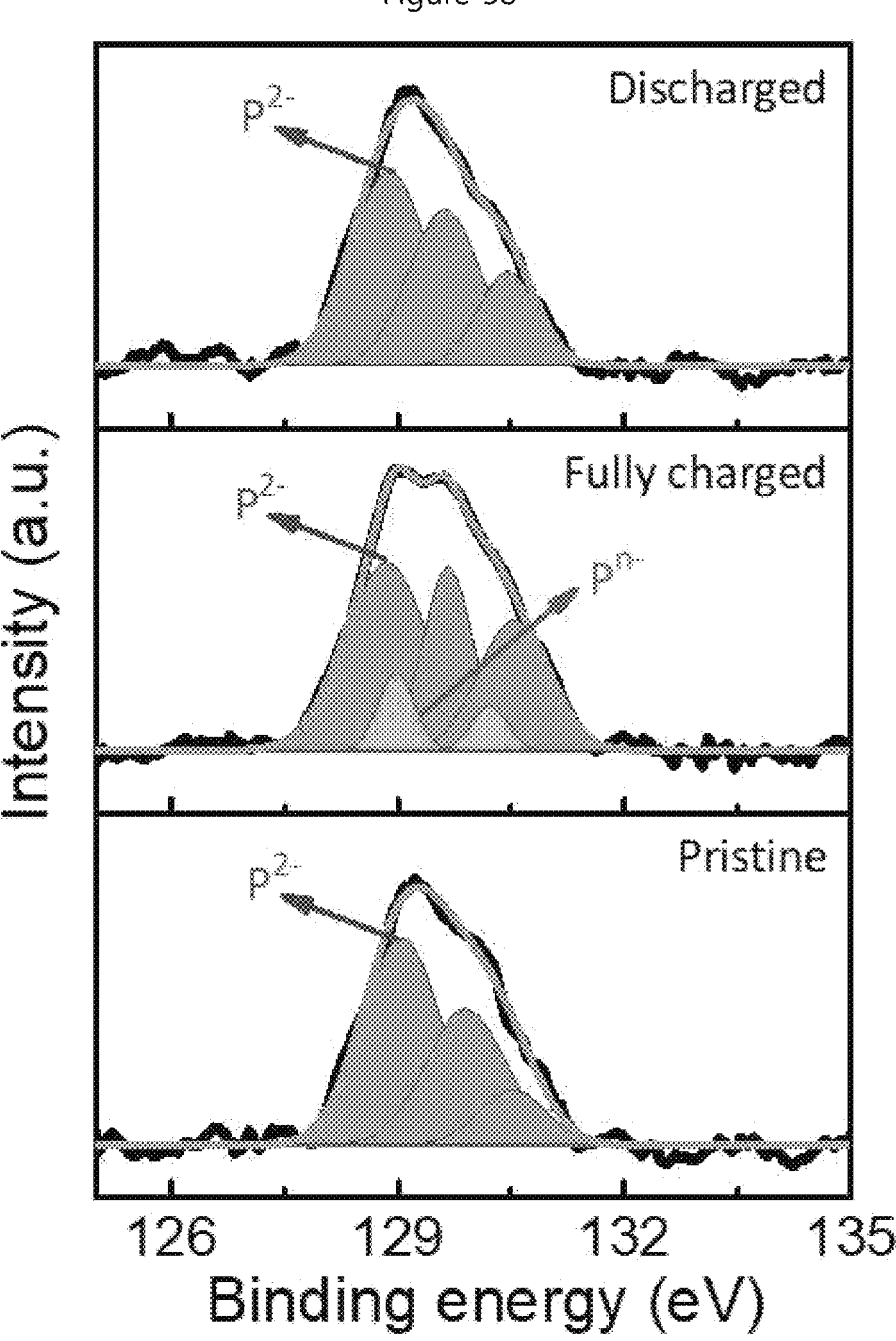
FIG. 58 is P 2p XPS spectra of an electrode structure according to Experimental Example 1 in a charged/discharged state of a secondary battery according to Experimental Example 1 of the present application.

FIG. 54 is a Cu K-edge XANES spectral graph of an electrode structure according to Experimental Example 1 in a charged/discharged state of a secondary battery according to Experimental Example 1 of the present application, FIG. 55 is an S K-edge and P L-edge XANES spectral graph of an electrode structure according to Experimental Example 1 in a charged/discharged state of a secondary battery according to Experimental Example 1 of the present application, FIG. 56 is S L$_{3,2}$-edge XANES spectra of an electrode structure according to Experimental Example 1 in a charged/discharged state of a secondary battery according to Experimental Example 1 of the present application, FIG. 57 is S 2p XPS spectra of an electrode structure according to Experimental Example 1 in a charged/discharged state of a secondary battery according to Experimental Example 1 of the present application, and FIG. 58 is P 2p XPS spectra of an electrode structure according to Experimental Example 1 in a charged/discharged state of a secondary battery according to Experimental Example 1 of the present application.

Referring to FIGS. 54 to 58, Cu K-edge, S K-edge, P L-edge, S L-edge XANES, and S 2p XPS of an electrode structure according to Experimental Example 1 were measured according to charging/discharging of a secondary battery according to Experimental Example 1.

As can be understood from FIG. 54, a reversible conversion of Cu K-edges may be confirmed in the state of being charged from 1.7V to 2.2V and discharging from 2.2V to 0.0V.

In addition, as can be understood from (a) of FIG. 55, upon reaching a state of charge in the SK-edge spectra, the strength of the pre-edge was increased, and the broad-edge was increased about 2.9 eV.

An increase in the strength of the pre-edge may mean that an unoccupied state of sulfur higher than a Fermi level is strengthened, which may correspond to a redox reaction compensated by electrons of S 3p and Cu 3d. In addition, a shift of the broad-edge may mean a decrease in electron density from $S^{2-}$ to $S^{y-}(y<2)$.

In addition, as can be understood from FIGS. 56 and 57, two additional peaks for high binding energy of 162.2 to 163.3 eV may confirmed in S 2p XPS after charging, and the S $L_{3,2}$-edge was shifted by 1.5 eV, which means partially oxidized $S''^{-}(n<2)$. It can be seen that two additional peaks disappear in S 2p XPS after discharging and S $L_{3,2}$-edge returns to a pre-charge state, and thus it can be confirmed that a redox reaction of sulfur may be reversibly performed.

As can be understood from (b) of FIG. 55 and FIG. 58, a reversible redox reaction of phosphorus in the charging and discharging process may be confirmed. The pre-edge and the broad-edge were shifted about 0.41 eV and 0.32 eV, respectively after charging, and two additional peaks may be confirmed in P 2p XPS, which may confirm the presence of oxidized phosphorus ($P^{2-}$ $P''^{-}$, $2<n<3$). In addition, two additional peaks disappeared in P 2p XPS after discharging and returned to a pre-charge state, and thus it can be confirmed that a reversible redox reaction may be performed.

Figure 59:
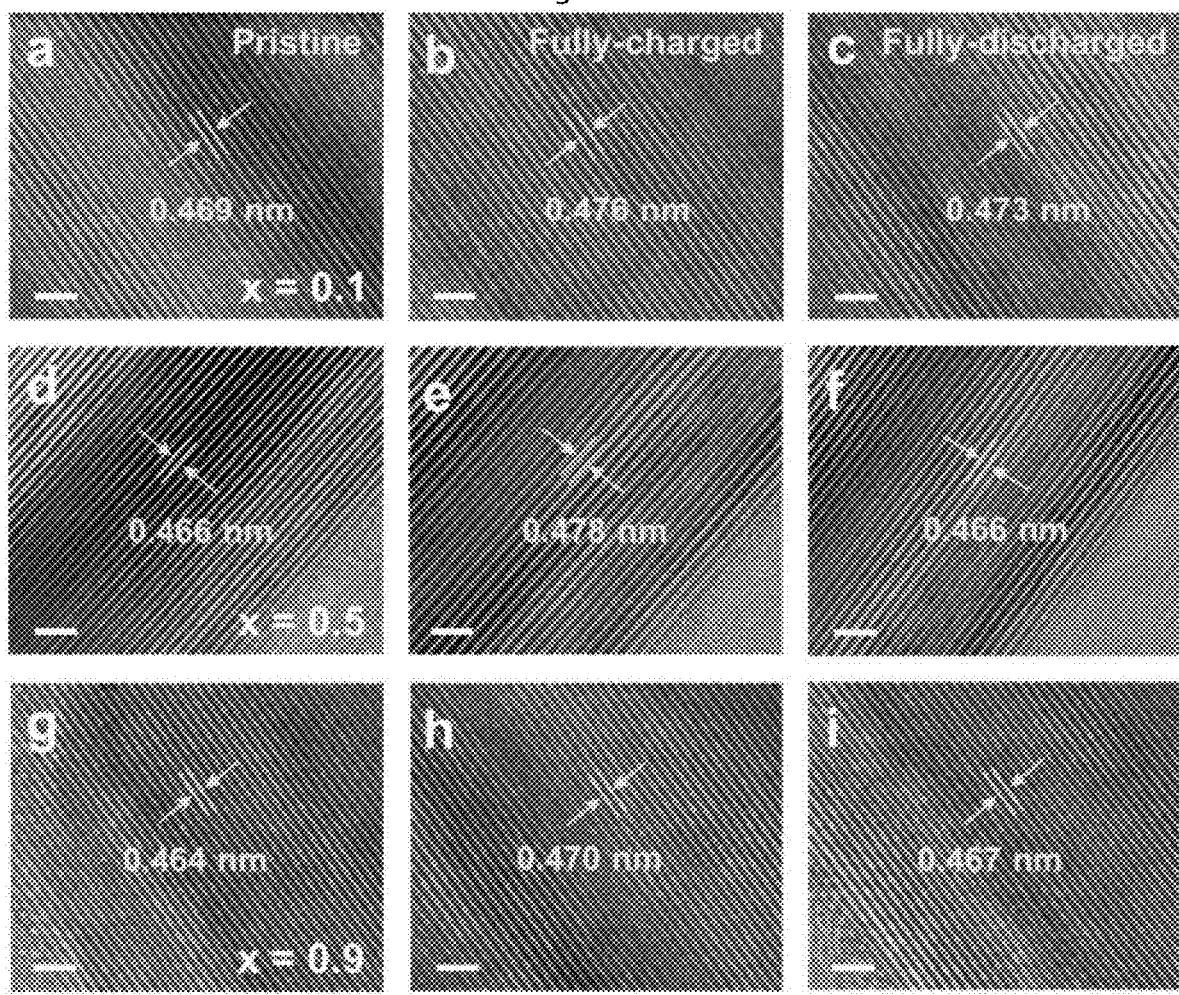
FIG. 59 is an HRTEM picture of an electrode structure according to Experimental Example 1 in a charged/discharged state of a secondary battery according to Experimental Example 1 of the present application.

FIG. 59 is an HRTEM picture of an electrode structure according to Experimental Example 1 in a charged/discharged state of a secondary battery according to Experimental Example 1 of the present application.

Referring to FIG. 59, an HRTEM picture of an electrode structure according to Experimental Example 1 was taken in a charged/discharged state of a secondary battery according to Experimental Example 1. $CuP_{0.1}S_{0.9}$, $CuP_{0.5}S_{0.5}$, and $CuP_{0.9}S_{0.1}$ were used for the electrode structure according to Experimental Example 1. a, b and c of FIG. 59 show an HRTEM picture of $CuP_{0.1}S_{0.9}$, d, e and f of FIG. 59 show an HRTEM picture of $CuP_{0.5}S_{0.5}$, and g, h and i of FIG. 59 show an HRTEM picture of $CuP_{0.9}S_{0.1}$.

As described above, in the case of $CuP_{0.1}S_{0.9}$ and $CuP_{0.9}S_{0.1}$, a redox band of Cu may be positioned to be higher than an S 3p band, and thus the oxidized sulfur may be unstable. Accordingly, as shown in FIG. 59, it can be confirmed that the lattice spacing is not reversibly recovered even when charging and discharging are performed. In contrast, in the case of $CuP_{0.5}S_{0.5}$, it can be confirmed that the lattice spacing before charging is 0.466 nm, the lattice spacing after charging is 0.478 nm, and the lattice spacing after discharging is 0.466 nm, thus suggesting that the lattice spacing is reversibly recovered after charging and discharging.

Figure 60:
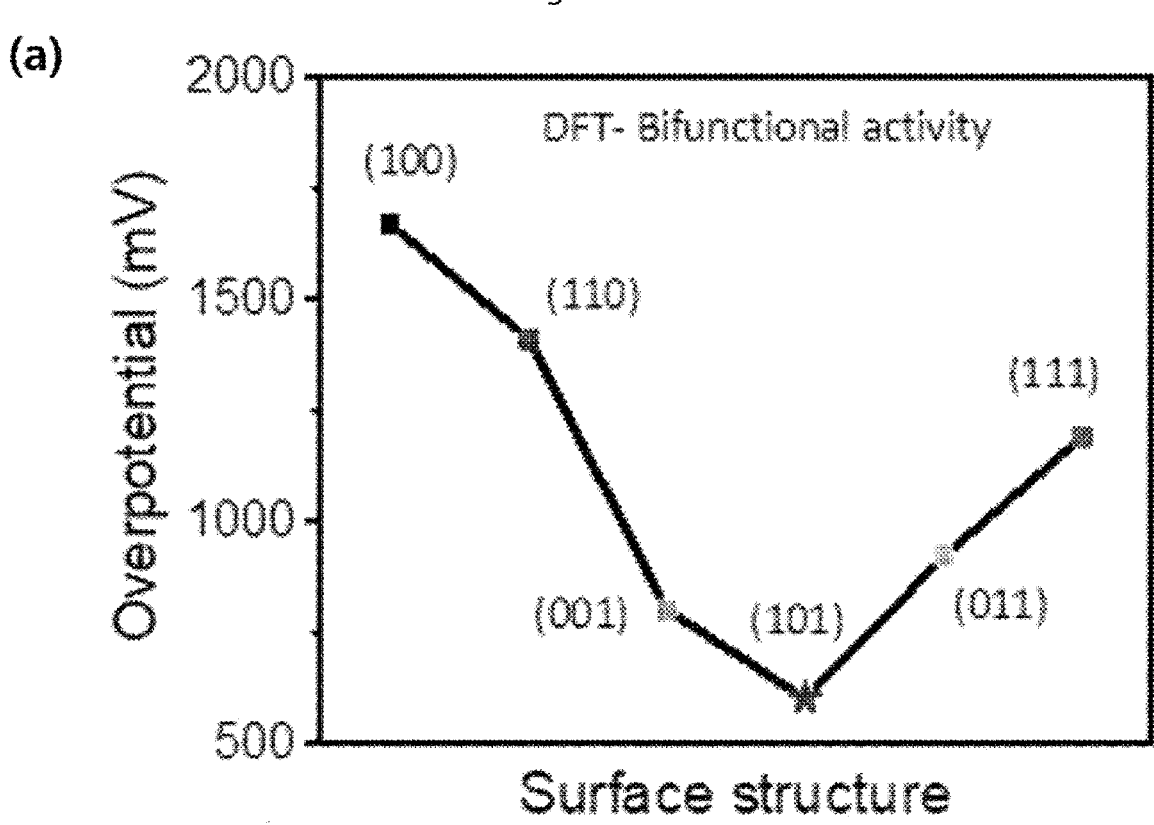
FIG. 60 is a graph showing an evaluation of OER, ORR, and HER properties according to a crystal plane in an electrode structure according to Experimental Example 1 of the present application.
Figure 60:
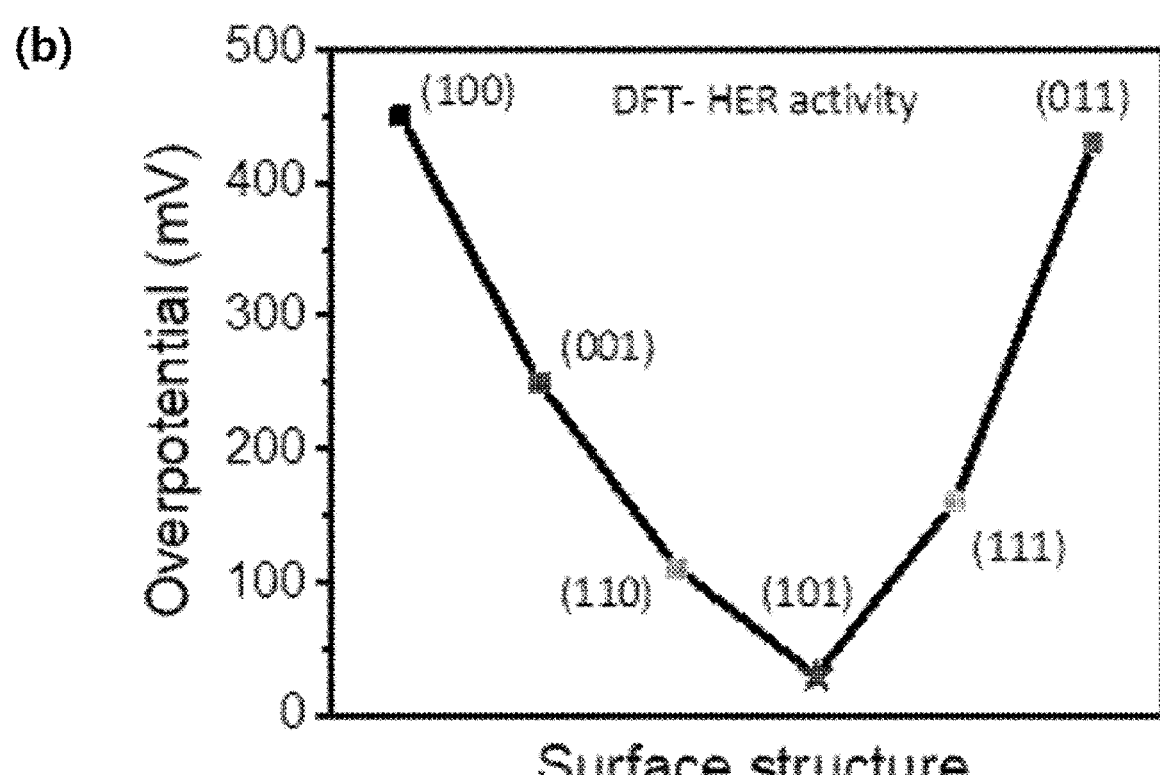

FIG. 60 is a graph showing an evaluation of OER, ORR, and HER properties according to a crystal plane in an electrode structure according to Experimental Example 1 of the present application.

Referring to FIG. 60, according to the crystal plane of the CuPS electrode structure according to Experimental Example 1, overpotentials for OER and ORR reactions (bifunctional activity) and overpotentials for HER reactions were calculated using discrete Fourier transforms.

As can be understood from FIG. 60, it can be confirmed that an overpotential value of the crystal plane 101 is the lowest, and thus ORR, OER and HER properties of the electrode structure in which the crystal plane 101 is developed are improved according to the embodiment of the present application.

In conclusion, it can be seen that fabricating of the electrode structure having a crystal plane 101 developed and using the same as a positive electrode of a metal-air battery is an efficient method for improving the charge/discharge properties of the metal-air battery.

Figure 61:
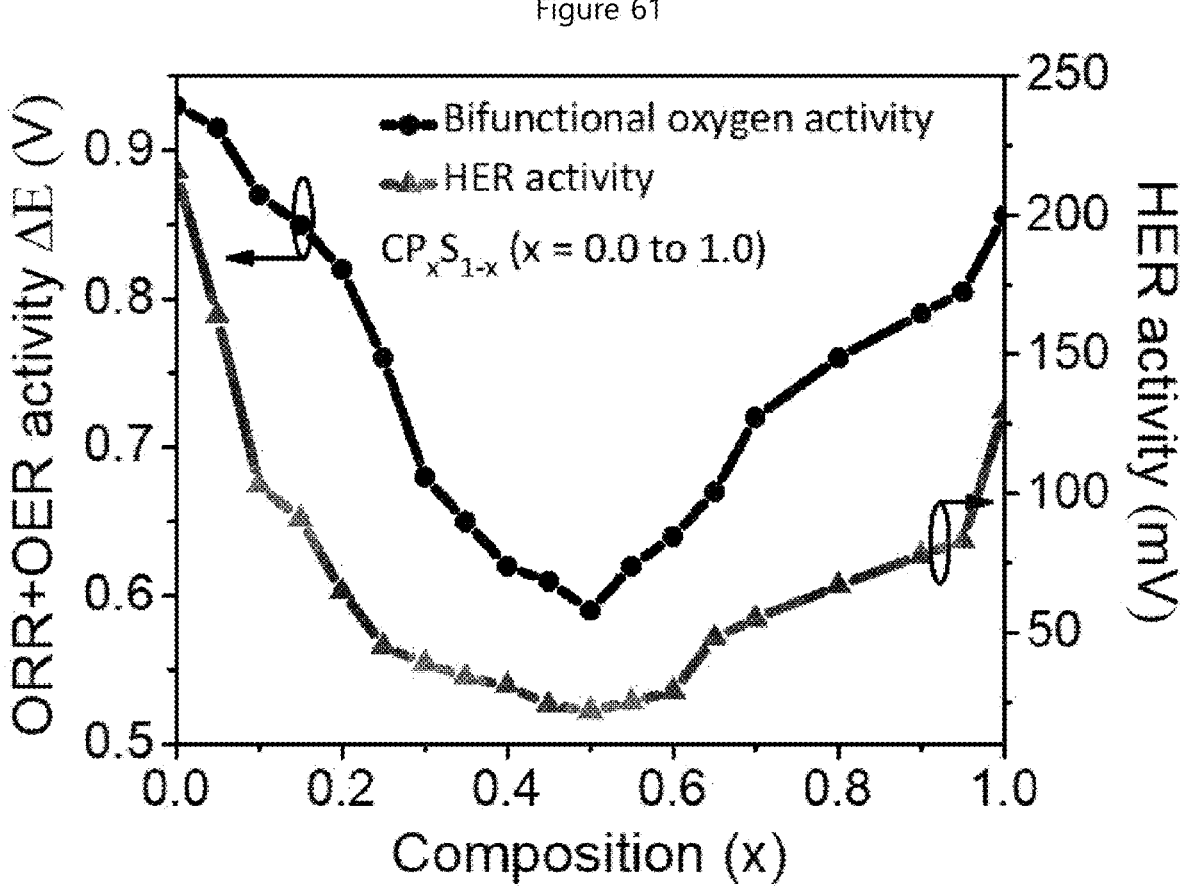
FIG. 61 is a graph showing an evaluation of ORR, OER, and HER properties according to a composition ratio of P and S in an electrode structure according to Experimental Example 1 of the present application.

FIG. 61 is a graph showing an evaluation of ORR, OER, and HER properties according to a composition ratio of P and S in an electrode structure according to Experimental Example 1 of the present application.

Referring to FIG. 61, the ORR, OER, and HER properties according to a composition ratio of P and S were measured and shown with regard to the CuPS electrode structure according to Experimental Example 1.

As can be understood from FIG. 61, it can be confirmed for the CuPS electrode structure that ORR, OER and HER properties are excellent when a composition ratio of P is more than 0.3 and less than 0.7 and a composition ratio of S is less than 0.7 and more than 0.3. In other words, it can be confirmed for the CuPS electrode structure that controlling of the composition ratio of P to be more than 0.3 and less than 0.7 and the composition ratio of S to be less than 0.7 and more than 0.3 is an efficient method capable of improving ORR, OER and HER properties.

Figure 62:
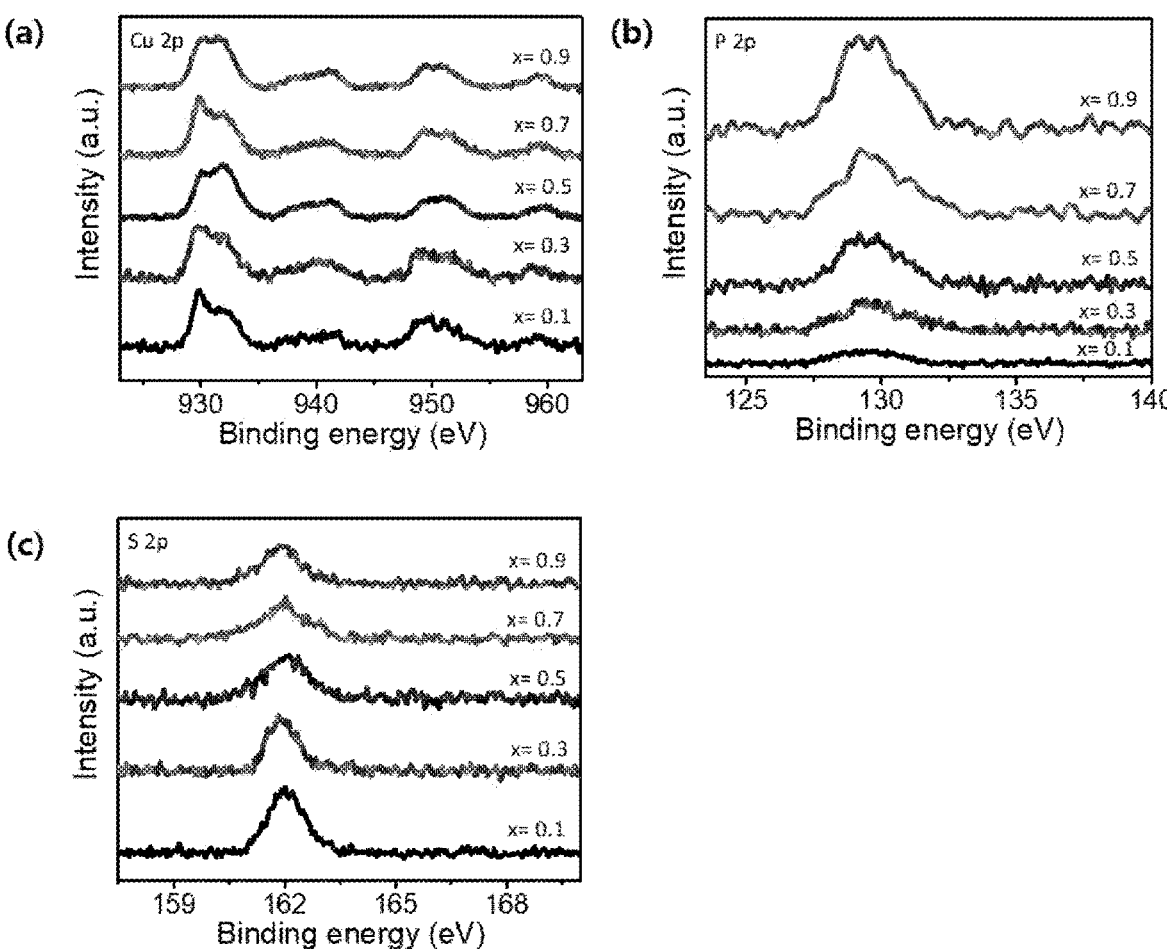
FIG. 62 is Cu 2p, P 2p, and S 2p XPS spectra according to a composition ratio of P and S in an electrode structure according to Experimental Example 1 of the present application.

FIG. 62 is Cu 2p, P 2p, and S 2p XPS spectra according to a composition ratio of P and S in an electrode structure according to Experimental Example 1 of the present application.

Referring to FIG. 62, Cu 2p, P 2p, and S 2p XPS according to a composition ratio of P and S were measured for the CuPS electrode structure according to Experimental Example 1, and a ratio of ingredients are calculated as shown in <Table 4> below.

TABLE 4

| x value at $CP_xS_{1-x}$ | Cu (at. %) | P (at. %) | S (at. %) |
|---|---|---|---|
| 0.1 | 49.56 | 10.21 | 40.23 |
| 0.3 | 49.19 | 19.93 | 30.88 |
| 0.5 | 48.92 | 24.89 | 26.19 |
| 0.7 | 49.16 | 30.48 | 20.36 |
| 0.9 | 48.86 | 40.99 | 10.15 |

Figure 63:
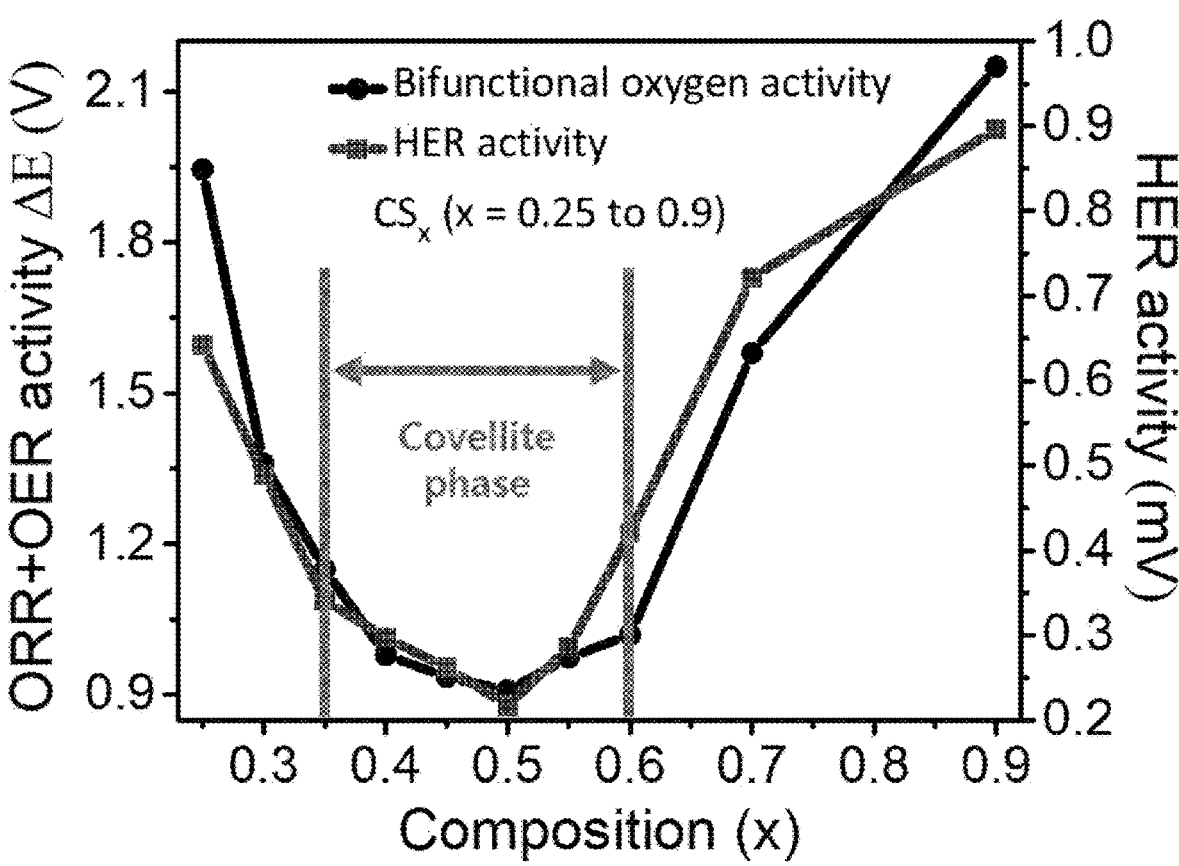
FIG. 63 is a graph showing an evaluation of ORR, OER, and HER properties according to a composition ratio of Cu and S in an electrode structure according to Experimental Example 3 of the present application.
Figure 64:
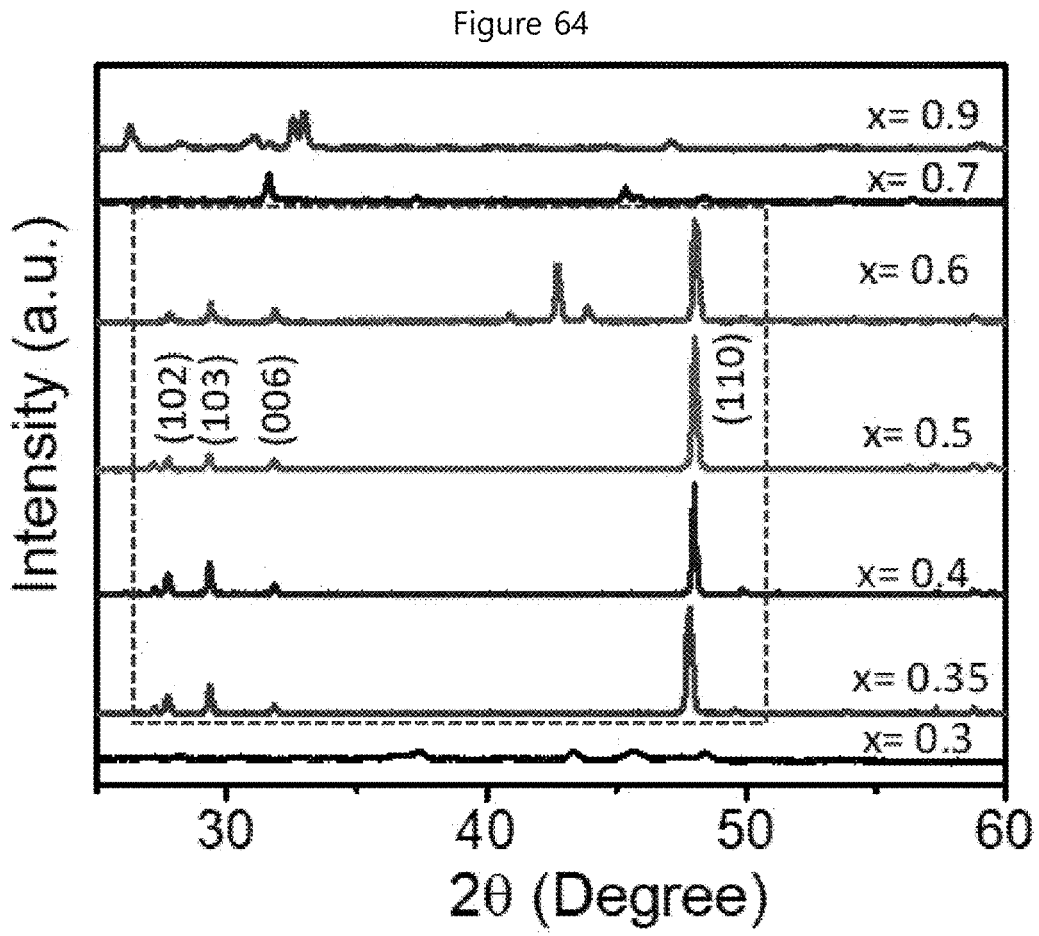
FIG. 64 is an XRD graph according to a composition ratio of Cu and S in an electrode structure according to Experimental Example 3 of the present application.
Figure 65:
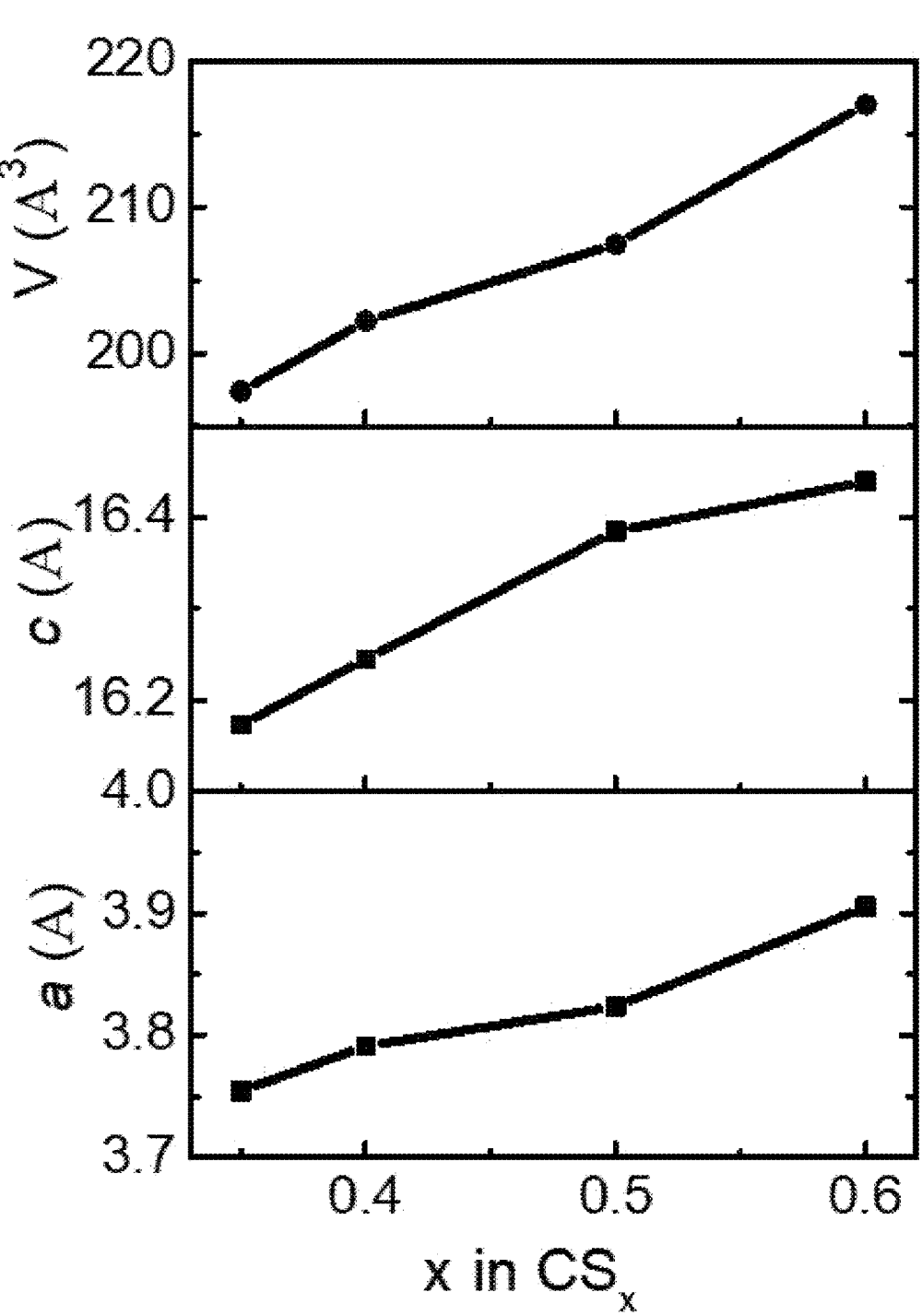
FIG. 65 is a graph showing lattice parameters according to a composition ratio of Cu and S in an electrode structure according to Experimental Example 3 of the present application.

FIG. 63 is a graph showing an evaluation of ORR, OER, and HER properties according to a composition ratio of Cu and S in an electrode structure according to Experimental Example 3 of the present application, FIG. 64 is an XRD graph according to a composition ratio of Cu and S in an electrode structure according to Experimental Example 3 of the present application, and FIG. 65 is a graph showing lattice parameters according to a composition ratio of Cu and S in an electrode structure according to Experimental Example 3 of the present application.

Referring to FIGS. 63 and 64, the ORR, OER, and HER properties according to a composition ratio of Cu and S were measured, an XRD was measured, and lattice parameters were calculated with regard to the CuS electrode structure according to Experimental Example 3.

As can be understood from FIGS. 63 and 64, in the case of the CuS electrode structure according to Experimental Example 3, it can be confirmed that the CuS electrode structure has a covellite crystal phase, and improved ORR, OER, and HER properties when the composition ratio of S is 0.35 or more and 0.6 or less. In addition, it can be confirmed that phases such as CuS, $Cu_2S$, remaining S, $CuS_2$ and the like are mixed and observed when the composition ratio of S exceeds 0.6, and $Cu_2S$ and chalcocite phases appear when the composition ratio of S is less than 0.35.

In addition, as can be understood from FIG. 65, it can be confirmed that the lattice parameter of the unit cell of the electrode structure of Experimental Example 3 increases when the composition ratio of S increases, thereby increasing a volume of the unit cell, and thus a peak value is shifted as shown in FIG. 49.

Figure 66:
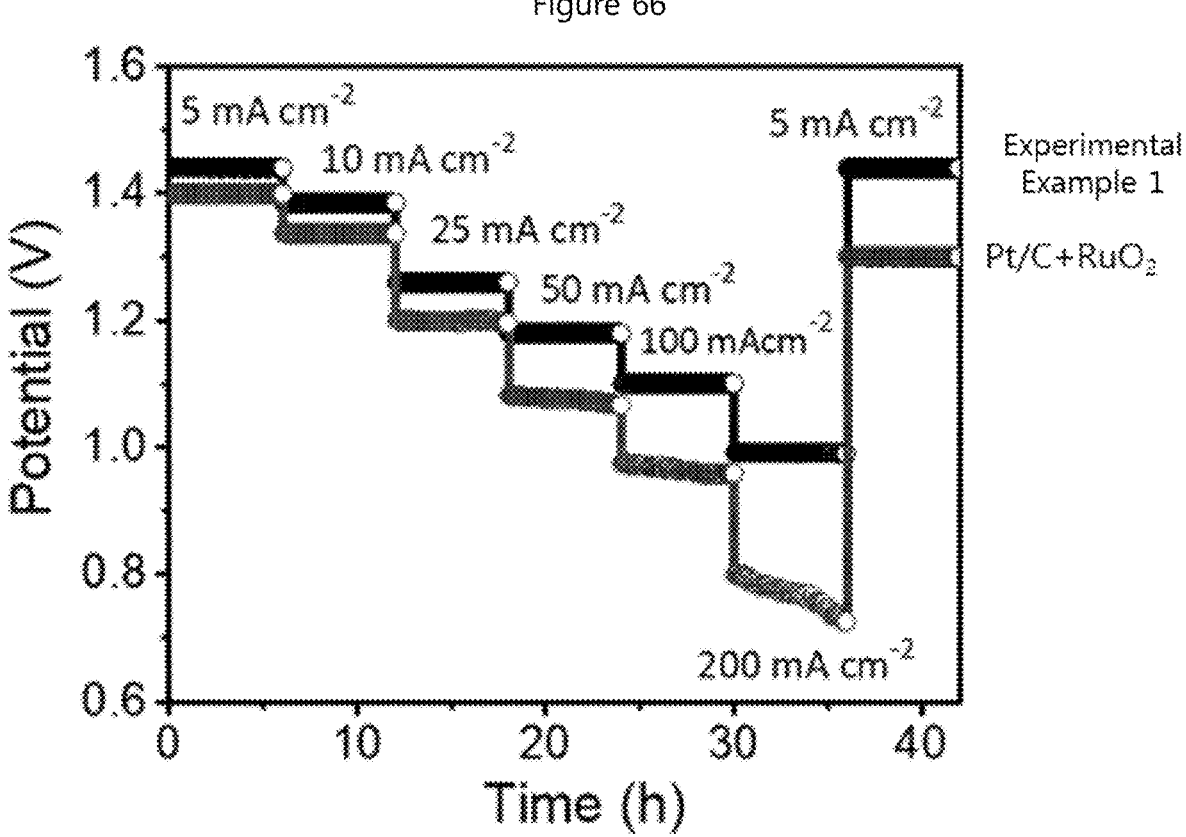
FIG. 66 is a graph showing a comparison of discharge voltage according to a current density of a zinc-air battery including an electrode structure according to Experimental Example 1 of the present application.

FIG. 66 is a graph showing a comparison of discharge voltage according to a current density of a zinc-air battery including an electrode structure according to Experimental Example 1 of the present application.

Referring to FIG. 66, a zinc-air battery according to Comparative Example was fabricated by using Pt/C and $RuO_2$ positive electrode, A201 (Tokuyama) electrolyte, and zinc negative electrode, and a discharge voltage according to 5-200 $mAcm^{-2}$ current density as well as a zinc-air battery including the electrode structure according to Experimental Example 1 was measured.

As can be understood from FIG. 66, it can be confirmed that the zinc-air battery including the CuPS electrode structure according to Experimental Example 1 has a remarkably high discharge voltage and, in particular, the zinc-air battery including Pt/C and $RuO_2$ positive electrode according to Comparative Example has a remarkably deteriorating discharge voltage as the current density increases. In contrast, it can be confirmed that the zinc-air battery including the CuPS electrode structure according to Experimental Example 1 does not have a significantly deteriorating discharge voltage compared to the zinc-air battery according to Comparative Example even under a high current density condition.

Figure 67:
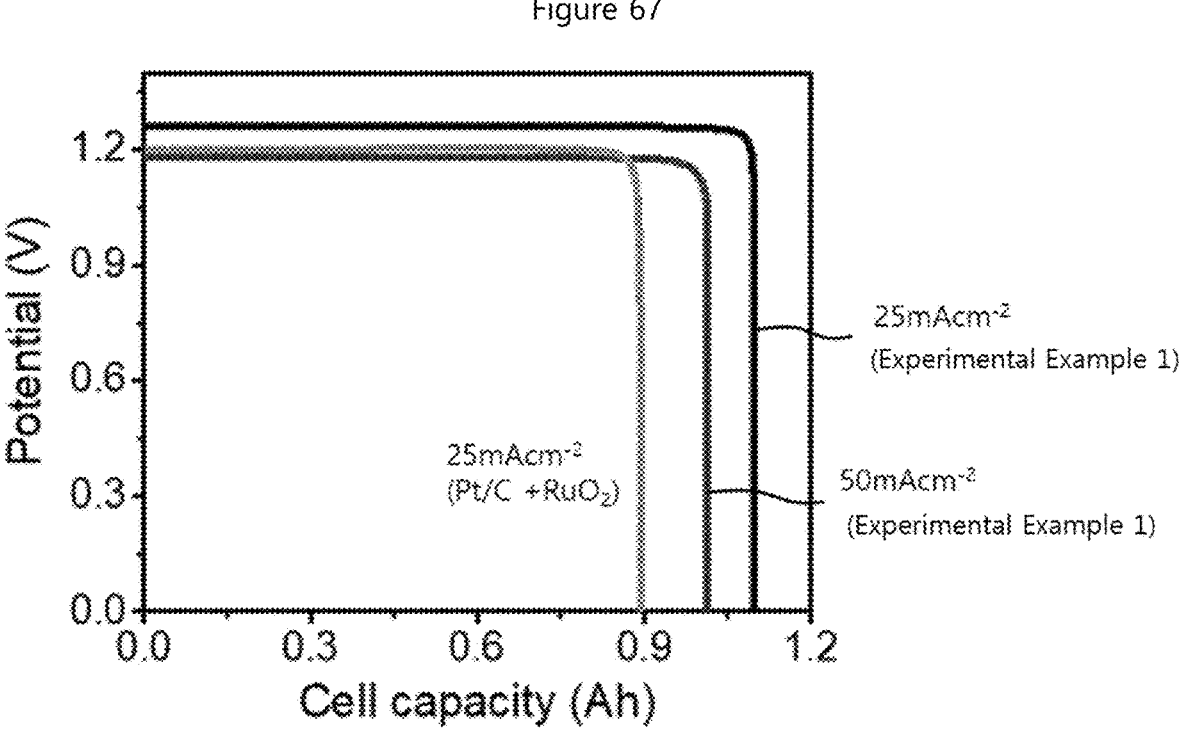
FIG. 67 is a graph for explaining a charge/discharge capacity of a zinc-air battery according to Experimental Example 1 of the present application.

FIG. 67 is a graph for explaining a charge/discharge capacity of a zinc-air battery according to Experimental Example 1 of the present application.

Referring to FIG. 67, a capacity according to a current density of the zinc-air battery according to Comparative Example described above and the zinc-air battery according to Experimental Example 1 was measured.

As can be understood from FIG. 67, it can be confirmed that the zinc-air battery according to Experimental Example 1 including the CuPS electrode structure has a higher capacity value not only under the 25 $mAcm^{-2}$ condition, but also under the 50 $mAcm^{-2}$ condition, as well as compared with the 25 $mAcm^{-2}$ condition of the zinc-air battery according to Comparative Example using Pt/C and $RuO_2$ as a positive electrode.

Figure 68:
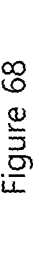
FIG. 68 is a graph showing a measurement of a voltage value according to the number of charges/discharges of a zinc-air battery according to Experimental Example 1 of the present application.
Figure 68:
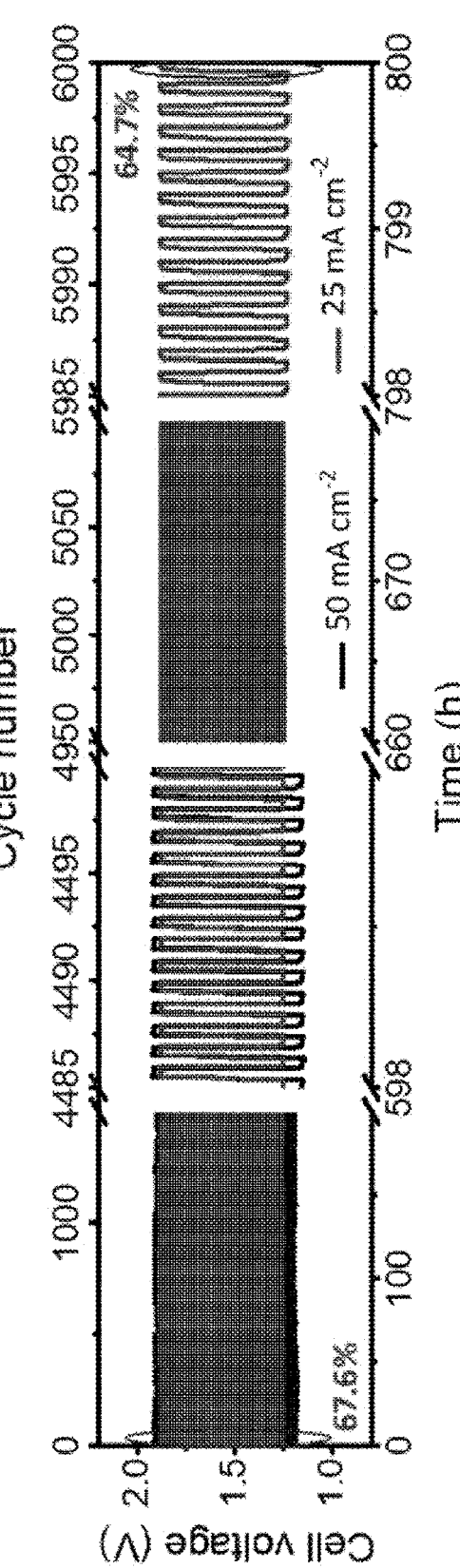

FIG. 68 is a graph showing a measurement of a voltage value according to the number of charges/discharges of a zinc-air battery according to Experimental Example 1 of the present application.

Referring to FIG. 68, a voltage value according to the number of times of charging and discharging was measured under the 50 $mAcm^{-2}$ condition and under the 25 $mA^{-2}$ conditions with regard to the zinc-air battery according to Experimental Example 1.

As can be understood from FIG. 68, it can be confirmed that the battery is stably driven for about 600 times of charging and discharging. In other words, it can be confirmed that the CuPS electrode structure prepared according to the above-described embodiment of the present application can be stably used as a positive electrode together with a solid electrolyte.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

An electrode structure according to an exemplary embodiment of the present application may be used in various industrial fields such as electrochemical elements, etc., such as a secondary battery, an energy storage device, a battery for an electric automobile, a water electrolysis cell, and a fuel cell.

What is claimed is:

1. An electrode structure, comprising:
a membrane formed of a plurality of fibers, the membrane comprising a compound of copper, phosphorus, and sulfur, wherein the compound has an orthorhombic crystal structure with a crystal plane (101), and wherein a peak value corresponding to the crystal plane (101) of the compound has a maximum value compared with a peak value corresponding to another crystal plane of the compound, as determined by XRD analysis.

2. The electrode structure of claim 1, wherein the peak value corresponding to the crystal plane (101) is observed in a range of $2\theta$ values of 19° to 21°.

3. A metal-air battery, comprising:
a positive electrode including the electrode structure of claim 1 and using oxygen as a positive electrode active material;
a negative electrode on the positive electrode; and
an electrolyte between the positive electrode and the negative electrode.

4. The metal-air battery of claim 3, wherein a lattice spacing is 0.466 nm as determined by HRTEM analysis of the membrane of the electrode structure in a discharged state of the metal-air battery.

5. The metal-air battery of claim 3, wherein a lattice spacing is 0.478 nm as determined by HRTEM analysis of the membrane of the electrode structure in a charged state of the metal-air battery.

6. The metal-air battery of claim 3, wherein a reference peak is observed in a range of $2\theta$ values of 18.5° to 19.5° as determined by XRD analysis of the membrane of the electrode structure, and $2\theta$ value at which the reference peak is observed is gradually decreased in a range of $2\theta$ values of 19° to 21° as the metal-air battery is charged from a discharged state.

7. The metal-air battery of claim 6, wherein the reference peak is divided into two as the metal-air battery is charged from the discharged state.

8. The metal-air battery of claim 3, wherein the phosphorus has an oxidation number of $2^-$ in a discharged state of the metal-air battery, and the phosphorus has an oxidation number of $2^-$ and $n^-$ ($2<n<3$) in a charged state of the metal-air battery.

* * * * *